(12) United States Patent
Kannenberg

(10) Patent No.: US 7,631,299 B2
(45) Date of Patent: Dec. 8, 2009

(54) SYSTEM FOR MODIFYING SOFTWARE USING REUSABLE SOFTWARE COMPONENTS

(75) Inventor: Robert Kannenberg, Austin, TX (US)

(73) Assignee: Computer Sciences Corporation, El Segundo, CA (US)

( * ) Notice: Subject to any disclaimer, the term of this patent is extended or adjusted under 35 U.S.C. 154(b) by 1567 days.

(21) Appl. No.: 10/337,951

(22) Filed: Jan. 7, 2003

(65) Prior Publication Data

US 2003/0158760 A1  Aug. 21, 2003

Related U.S. Application Data

(60) Provisional application No. 60/351,710, filed on Jan. 24, 2002, provisional application No. 60/351,709, filed on Jan. 24, 2002, provisional application No. 60/351,435, filed on Jan. 24, 2002.

(51) Int. Cl.
G06F 9/44 (2006.01)
G06F 9/45 (2006.01)
G06Q 40/00 (2006.01)

(52) U.S. Cl. .............. 717/121; 717/145; 717/159; 705/4

(58) Field of Classification Search ............... None
See application file for complete search history.

(56) References Cited

U.S. PATENT DOCUMENTS

| | | | |
|---|---|---|---|
| 4,831,526 A | | 5/1989 | Luchs et al. |
| 5,159,687 A | * | 10/1992 | Richburg ............ 717/106 |
| 5,182,705 A | | 1/1993 | Barr et al. |
| 5,253,164 A | | 10/1993 | Holloway et al. |
| 5,276,816 A | | 1/1994 | Cavendish et al. |
| 5,517,644 A | | 5/1996 | Murdock |
| 5,550,976 A | | 8/1996 | Henderson et al. |
| 5,557,515 A | | 9/1996 | Abbruzzese et al. |
| 5,564,043 A | | 10/1996 | Siefert |
| 5,717,747 A | | 2/1998 | Boyle et al. |

(Continued)

FOREIGN PATENT DOCUMENTS

WO  02/15079  2/2002

OTHER PUBLICATIONS

Continuum Connections, vol. I, No. 1, The Continuum Company, Inc., Nov. 1991, 16 pages.

(Continued)

*Primary Examiner*—Wei Y Zhen
*Assistant Examiner*—Isaac T Tecklu
(74) *Attorney, Agent, or Firm*—Meyertons, Hood, Kivlin, Kowert & Goetzel, P.C.; Eric B. Meyertons

(57) ABSTRACT

A system, method for modifying insurance transaction processing software are provided. A library of code packets may be stored in a database. One or more code packets may implement at least one business requirement of an insurance organization. If the organization changes one of the business requirements or develops a new business requirement, a user may modify an insurance transaction processing program to reflect the change via a rules engine. The rules engine may be operable to generate program code assembly instructions based on user input. The assembly instructions may be used by a code assembler to form program code for an insurance transaction processing program software module. The insurance transaction processing program may be changed by adding a formed software module.

21 Claims, 32 Drawing Sheets

U.S. PATENT DOCUMENTS

| | | | |
|---|---|---|---|
| 5,745,901 | A | 4/1998 | Entner et al. |
| 5,768,506 | A | 6/1998 | Randell |
| 5,815,152 | A | 9/1998 | Collier et al. |
| 5,819,263 | A | 10/1998 | Bromley et al. |
| 5,864,875 | A | 1/1999 | Van Huben et al. |
| 5,870,711 | A | 2/1999 | Huffman |
| 5,909,683 | A | 6/1999 | Miginiac et al. |
| 5,950,169 | A | 9/1999 | Borghesi et al. |
| 5,960,404 | A | 9/1999 | Chaar et al. |
| 5,974,392 | A | 10/1999 | Endo |
| 5,991,733 | A | 11/1999 | Aleia et al. |
| 5,995,939 | A | 11/1999 | Berman et al. |
| 6,016,477 | A | 1/2000 | Ehnebuske et al. |
| 6,100,891 | A | 8/2000 | Thorne |
| 6,112,209 | A | 8/2000 | Gusack |
| 6,115,693 | A | 9/2000 | McDonough et al. |
| 6,134,530 | A | 10/2000 | Bunting et al. |
| 6,134,582 | A | 10/2000 | Kennedy |
| 6,223,165 | B1 | 4/2001 | Lauffer |
| 6,223,343 | B1 | 4/2001 | Hopwood et al. |
| 6,272,482 | B1 | 8/2001 | McKee et al. |
| 6,295,526 | B1 | 9/2001 | Kreiner et al. |
| 6,314,562 | B1 * | 11/2001 | Biggerstaff ................. 717/156 |
| 6,330,551 | B1 | 12/2001 | Burchetta et al. |
| 6,389,400 | B1 | 5/2002 | Bushey et al. |
| 6,405,364 | B1 | 6/2002 | Bowman-Amuah |
| 6,408,277 | B1 | 6/2002 | Nelken |
| 6,430,538 | B1 | 8/2002 | Bacon et al. |
| 6,442,533 | B1 | 8/2002 | Hinkle |
| 6,460,036 | B1 | 10/2002 | Herz |
| 6,473,748 | B1 * | 10/2002 | Archer ........................ 706/45 |
| 6,502,096 | B1 | 12/2002 | Siefert |
| 6,578,007 | B1 | 6/2003 | Howes et al. |
| 6,591,272 | B1 | 7/2003 | Williams |
| 6,618,730 | B1 | 9/2003 | Poulter et al. |
| 6,632,251 | B1 | 10/2003 | Rutten et al. |
| 6,714,914 | B1 | 3/2004 | Peters et al. |
| 6,868,413 | B1 * | 3/2005 | Grindrod et al. .............. 706/59 |
| 7,003,482 | B1 | 2/2006 | Margoscin et al. |
| 7,152,053 | B2 * | 12/2006 | Serrano-Morales et al. ... 706/47 |
| 2002/0156814 | A1 * | 10/2002 | Ho ............................. 707/514 |
| 2003/0158759 | A1 | 8/2003 | Kannenberg |
| 2003/0172367 | A1 | 9/2003 | Kannenberg |
| 2005/0223025 | A1 * | 10/2005 | Bennett ....................... 707/102 |

OTHER PUBLICATIONS

Continuum Connections, vol. I, No. 2, The Continuum Company, Inc., Jan./Feb. 1992, 17 pages.
Continuum Connections, vol. I, No. 3, The Continuum Company, Inc., Mar./Apr. 1992, 16 pages.
Continuum Connections, vol. I, No. 4, The Continuum Company, Inc., Jul./Aug. 1992, 15 pages.
Continuum Connections, vol. II, No. 1, The Continuum Company, Inc., Oct./Nov. 1992, 16 pages.
Continuum Connections, vol. II, No. 2, The Continuum Company, Inc., Dec./Jan. 1993, 24 pages.
Continuum Connections, vol. II, No. 3, The Continuum Company, Inc., Mar./Apr. 1993, 16 pages.
Continuum Connections, vol. II, No. 4, The Continuum Company, Inc., Jul./Aug. 1993, 16 pages.
Continuum Connections, vol. II, No. 5, The Continuum Company, Inc., Nov./Dec. 1993, 20 pages.
Continuum Connections, vol. II, No. 6, The Continuum Company, Inc., Jan./Feb. 1994, 19 pages.
Continuum Connections, vol. III, No. 1, The Continuum Company, Inc., Mar./Apr. 1994, 24 pages.
Continuum Connections, vol. III, No. 2, The Continuum Company, Inc., Nov./Dec. 1994, 20 pages.
Continuum Connections, vol. III, No. 3, The Continuum Company, Inc., Mar./Apr. 1995, 16 pages.
Continuum Connections to the Americas, vol. 1, No. 1, The Continuum Company, Inc., Sep. 1995, 49 pages.
Continuum Connections, vol. III, No. 4, The Continuum Company, Inc., Oct./Nov. 1995, 24 pages.
Continuum Connections to the Americas, vol. 2, No. 1, The Continuum Company, Inc., Jan. 1996, 59 pages.
Continuum Connections to the Americas, vol. 2, No. 2, The Continuum Company, Inc., Mar. 1996, 59 pages.
Continuum Connections to the Americas, vol. 2, No. 3, The Continuum Company, Inc., May 1996, 51 pages.
Continuum Connections to the Americas, vol. 2, No. 4, The Continuum Company, Inc., Jul. 1996, 55 pages.
Continuum Connections to the Americas, vol. 2, No. 5, The Continuum Company, Inc., Sep. 1996, 59 pages.
Connections to the Americas, vol. 3, No. 1, CSC Continuum, Jan. 1997, 55 pages.
Connections to the Americas, vol. 3, No. 2, CSC Continuum, Feb. 1997, 55 pages.
Connections to the Americas, vol. 3, No. 3, CSC Continuum, Mar. 1997, 48 pages.
Connections to the Americas, vol. 3, No. 4, CSC Continuum, Apr. 1997, 40 pages.
Connections to the Americas, vol. 3, No. 5, Computer Sciences Corporation, May/Jun. 1997, 66 pages.
Connections to the Americas, vol. 3, No. 6, Computer Sciences Corporation, Jul./Aug. 1997, 56 pages.
Connections to the Americas, vol. 3, No. 7, Computer Sciences Corporation, Sep./Oct. 1997, 76 pages.
Connections to the Americas, vol. 4, No. 1, Computer Sciences Corporation, Jan. 1998, 64 pages.
Connections to the Americas, vol. 4, No. 2, Computer Sciences Corporation, Feb./Mar. 1998, 50 pages.
Connections to the Americas, vol. 4, No. 3, Computer Sciences Corporation, May/Jun. 1998, 48 pages.
Connections to the Americas, vol. 4, No. 4, Computer Sciences Corporation, Sep./Oct. 1998, 62 pages.
Insurance Connections, Computer Sciences Corporation, Feb./Mar. 1999, 52 pages.
Banking Connections, Computer Sciences Corporation, Apr./May 1999, 44 pages.
Insurance Connections, Computer Sciences Corporation, Jun./Jul. 1999, 56 pages.
Banking Connections, Computer Sciences Corporation, Aug./Sep. 1999, 52 pages.
Insurance Connections, Computer Sciences Corporation, Oct./Nov. 1999, 56 pages.
Cost Containment: Products and Solutions for the Property and Casualty Insurance Industry, Computer Sciences Corporation, Oct. 1999, 40 pages.
Banking Connections, Computer Sciences Corporation, Dec. 1999, 48 pages.
Insurance Connections, Computer Sciences Corporation, Feb./Mar. 2000, 60 pages.
Banking Connections, Computer Sciences Corporation, Apr./May 2000, 48 pages.
Insurance Connections, Computer Sciences Corporation, Jun./Jul. 2000, 43 pages.
Insurance Connections, Computer Sciences Corporation, Sep./Oct. 2000, 43 pages.
Banking Connections, Computer Sciences Corporation, Nov./Dec. 2000, 48 pages.
Connections, Computer Sciences Corporation, Mar./Apr. 2001, 58 pages.
Connections, Computer Sciences Corporation, Jun. 2001, 44 pages.
Connections, Computer Sciences Corporation, Oct. 2001, 39 pages.
Connections, Computer Sciences Corporation, Dec. 2001, 39 pages.
Connections, Computer Sciences Corporation, Apr. 2002, 35 pages.
CSC's Property and Casualty Claims Solutions, Computer Sciences Corporation, Nov. 2002, 2 pages.
Straight Through Processing, Computer Sciences Corporation, Feb. 2003, 6 pages.
CSC's Property and Casualty Solutions, Computer Sciences Corporation, Aug. 2003, 2 pages.

Borland, Russel, "Running Microsoft Outlook 97," Microsoft Press, 1997.

Shah, Ashish; World Wide Web and Object Technology, Chapter 19, 1996.

Jobling, Tom, "DST Implements imaging for mutual fund industry," Business Wire, New York, Dec. 18, 1989, Sec. 1 p. 1. (Y1) (2 pages).

"Eliminating the paper chase," Best's Review, Oldwick, Mar. 1992, vol. 92, iss. 11; pp. 54-57 (Y2) (3 pages).

"DST to market workflow system," Insurance systems bulletin, London, Nov. 1994, vol. 10, issue 5, p. 5 (Y3) (2 pages).

West, Diane, "New world in claims, customer admin. systems," National Underwriter, Erlanger, Sep. 16, 1996, vol. 100, iss. 38, pp. 20-22. (Y4) (2 pages).

Graver, Matt, "USAA implements automated work distributor (AWD)," Inform, Silver Spring, May 1998, vol. 12, Iss. 5, pp. 54-59. (Y5) (3 pages).

"Osborn Laboratories chooses CSC system to enhance service to customers," PR Newswire, New York, Jun. 17, 1998, p. 1 (Y6) (2 pages).

"DST systems integrates workflow management software into computer associates Unicenter TNG," PR Newswire, New York, Sep. 23, 1998, p. 1 (Y7) (2 pages).

Hill, Stephen, "Continuous Improvement," Work Process Improvement Today, Boston, Dec. 1998, vol. 20, iss. 5, pp. 10-12 (Y8) (3 pages).

Persistence Software Announces One of Industry's First Open Java Application Servers With Full Enterprise JavaBeans Support, Business Wire, Mar. 24, 1998 (Y9).

U.S. Patent and Trademark Office, "Communication" for U.S. Appl. No. 10/337,923 mailed Jun. 23, 2008, available in PAIR.

U.S. Patent and Trademark Office, "Communication" for U.S. Appl. No. 10/337,923 mailed Oct. 29, 2008, available in PAIR.

U.S. Patent and Trademark Office, "Communication" for U.S. Appl. No. 10/337,923 mailed May 12, 2009, available in PAIR.

U.S. Patent and Trademark Office, "Communication" for U.S. Appl. No. 10/337,951 mailed Feb. 6, 2009, available in PAIR.

U.S. Patent and Trademark Office, "Communication" for U.S. Appl. No. 10/337,950 mailed Feb. 12, 2009, available in PAIR.

* cited by examiner

FIG. 17

SYSTEM FOR MODIFYING SOFTWARE USING REUSABLE SOFTWARE COMPONENTS

PRIORITY CLAIM

This application claims the benefit of U.S. Provisional Patent Application Ser. No. 60/351,710 to Robert Kannenberg entitled "SYSTEM, METHOD, AND MEDIUM FOR MODIFYING SOFTWARE BY DEFINING BUSINESS RULES" filed Jan. 24, 2002; Ser. No. 60/351,709 to Robert Kannenberg entitled "SYSTEM, METHOD, AND MEDIUM FOR MODIFYING SOFTWARE USING REUSABLE SOFTWARE COMPONENTS" filed Jan. 24, 2002; and Ser. No. 60/351,435 to Robert Kannenberg entitled "SYSTEM, METHOD, AND MEDIUM FOR MODIFYING SOFTWARE OVER THE INTERNET" filed Jan. 24, 2002.

BACKGROUND OF THE INVENTION

1. Field of the Invention

The present invention generally relates to computer software programs, and more particularly, the invention relates to software modifications for capturing business requirements.

2. Description of the Related Art

Financial Service Organization (FSOs) such as banks, credit unions, insurance companies, mutual fund companies, credit card companies, brokerage houses, etc., market many types of financial products and services to their customers, such as savings accounts, brokerage accounts, commercial loans, mortgage loans, auto loans, personal loans, insurance policies, and credit cards. Many FSOs have come to rely on computer systems to help operate their businesses. The computer systems may include software program(s) that process and store data associated with FSO transactions.

An FSO such as an insurance company (IC) may offer several insurance products and services to its clients. For example, an insurance company may offer its clients an insurance policy to manage risks in a variety of areas such as automobiles, property, healthcare, life, long-term disability, professional liability, accidental death, and other suitable areas.

Insurance companies typically process insurance transactions such as determining policy premiums, processing applications for a new policy, and settling insurance claims. Many transactions, such as the task of evaluating, analyzing or determining the amount of an automobile insurance premium or the damage associated with an insurance claim, can be very complex. Complexity in the evaluation process often arises out of the fact that concurrent expertise in legal, medical and insurance fields is often required to arrive at a particular decision involving an insurance claim and/or a premium calculation.

Several factors can affect the amount of premium associated with the policy of a particular applicant. Every automobile operator is unique. Each operator may have a different driving record and may be rated differently by different insurance companies. Factors such as type of insurance coverage desired, type of automobile insured, and geographic area may play a large role in arriving at a determined amount of premium. Thus, it may be desirable to arrive at a unique, customized evaluation of an insurance premium for each individual. Applying across-the-board standards to arrive at a premium amount may tend to result in an inequitable and/or undesirable solution for one or more parties involved. In processing injury-related insurance claims, for example, external environmental factors, such as the experience level of a claims adjuster, record of accomplishment of the legal professionals, post-injury quality of life for the injured party, etc., all can affect the valuation of a claim.

As a result, many insurance companies have been using computer-based and knowledge-based transaction processing systems to process, evaluate, analyze and determine insurance premiums and insurance claims in an individualized manner. A knowledge-based transaction processing system may include an expert system which utilizes and builds a knowledge base to assist the user in decision-making. It may allow the insurance companies to define new business rules and/or use previously defined rules in real-time. Business rules are statements that determine or describe the way a company conducts its business. Each company may develop its own set of uniquely defined business rules which are consistent with the company's business requirements. Business rules may describe constraints, limitations and/or policies associated with a company or a particular product offered by the company. The business rules are generally written by industry experts to evaluate legal, medical, and insurance conditions before arriving at an insurance-related business decision such as determining a policy premium or the valuation of a claim.

There are several drawbacks with some knowledge-based insurance systems. For example, the software development process to develop new insurance transaction processing software is often lengthy, error prone, and costly. In many insurance organizations, there is a disconnection between the key parties involved in the development of new software. For example, two key parties involved in the development of new software may include the insurance system provider, e.g., technical specialists, and the insurance system user, e.g., insurance or business specialists. Very often, users and providers do not communicate with a common vocabulary. For example, the users often outline the business requirements in a word processor document. The technology providers may then read the word processor document describing the business requirement and interpret the requirements to identify specific software programs which may need to be changed to implement the desired business requirement. Not being conversant with the business terminology, the software development staff may often misinterpret critical business requirements. Software may very often be re-invented and re-tested, resulting in a loss of efficiency and productivity.

Writing software code to provide the required functionality may typically require technical professionals (e.g., programmers, software developers) who are familiar with the business requirements, and who are also familiar with the specific computing environment. For example, a technical professional may write one or more business rules in a computer programming language to execute a business requirement. The business rules are often "hard-coded" by the developer of the insurance software. For example, the rules may be written directly in the body of the program as program source code. When there is a new business requirement, it may be necessary to change the source code. Changing the source code may require lengthy program compiling processes and/or validation processes. In some cases, this inflexibility results in delaying the incorporation of the new business rules until the next system release date. Thus, the insurance software is unable to adapt quickly to changing business conditions. This tends to reduce the users' and therefore the insurance companies' flexibility to respond to changing business conditions in processing insurance transactions.

Certain users may have special or unique requirements which may require the standard business rules to be modified (i.e., customized) to meet the requirements of a specific application. The hard-coding method may not easily permit the customization of the business rules in a cost-effective and time-effective manner.

SUMMARY OF THE INVENTION

In an embodiment, an insurance transaction process program may be modified by receiving input defining at least one business rule. One or more code packets may be configured to implement at least one business rule. One or more configured code packets may be assembled to form program code for a software module of an insurance transaction processing program.

In an embodiment, a transaction processing program may be formed after at least one business requirement of a company has been determined. One or more business rules may be defined. The business rule(s) may be configured to implement at least one business requirement. A code packet may be formed based on at least one business rule. Additionally, assembly directions for assembling program code for a software module using at least one code packet may be generated. Program code for the software module may be assembled based on the assembly directions. The software module may be configured to interface with an insurance transaction processing program to implement at least one defined business rule.

Embodiments may also relate to modifying an exiting insurance transaction processing program. For example, a first insurance transaction processing program may be provided. The first insurance transaction processing program may include a first code packet configured to implement a first business rule. A least a portion of the first business rule may be displayed in a graphical display. The first business rule may be altered via the graphical display to form a second business rule. A second insurance transaction processing program may be formed which includes a second code packet. The second code packet may be configured to implement the second business rule.

In an embodiment, a rules engine may be used to modify or form a software module of an insurance transaction processing program. A rules engine may access a plurality of code packets. At least one code packet may be configured to at least partially implement at least one business requirement. One or more of the code packets may be modified. Software module assembly instructions may be generated which direct assembly of one or more code packets to form one or more software modules. A code assembler may assemble one or more code packets to form a software module.

Embodiments relate to providing at least one rules engine. A rules engine may be executable to generate assembly instructions for at least one software module. Embodiments may further relate to providing at least one code assembler. At least one code assembler may be executable to assemble two or more code packets according to assembly directions to form at least one software module.

A method may include providing a plurality of code packets in a memory coupled to a computer system. At least one code packet may be configured to implement at least one business requirement of an insurance organization. Additionally, at least one rules engine may be provided in a memory coupled to the computer system. At least one rules engine may be executable to modify one or more code packets. At least one code assembler may also be provided in a memory coupled to the computer system. The code assembler may be executable to combine two or more code packets to form an software module of an insurance transaction processing program. A customer may be allowed to interact with at least one rules engine to modify at least one code packet. An insurance transaction processing program may be formed which includes at least one modified code packet. The customer may be charged a fee for interacting with at least one rules engine.

In another embodiment, a user may interact with a computer program to configure at least one insurance transaction processing program. The program may access a plurality of code packets in a memory. Program code assembly instructions for an insurance transaction process program may be generated. Two or more code packets may be assembled based on code assembly instructions to form program code. At least one insurance transaction processing program may be formed based on the user's configuration.

Embodiments may also relate to carrier media including program code executable to form or modify an insurance transaction processing program. Further embodiments may relate to systems configured to form or modify an insurance transaction processing program.

BRIEF DESCRIPTION OF THE DRAWINGS

FIG. 17 depicts an example of a screen display for maintaining a product and/or template according to one embodiment;

Figure 1:
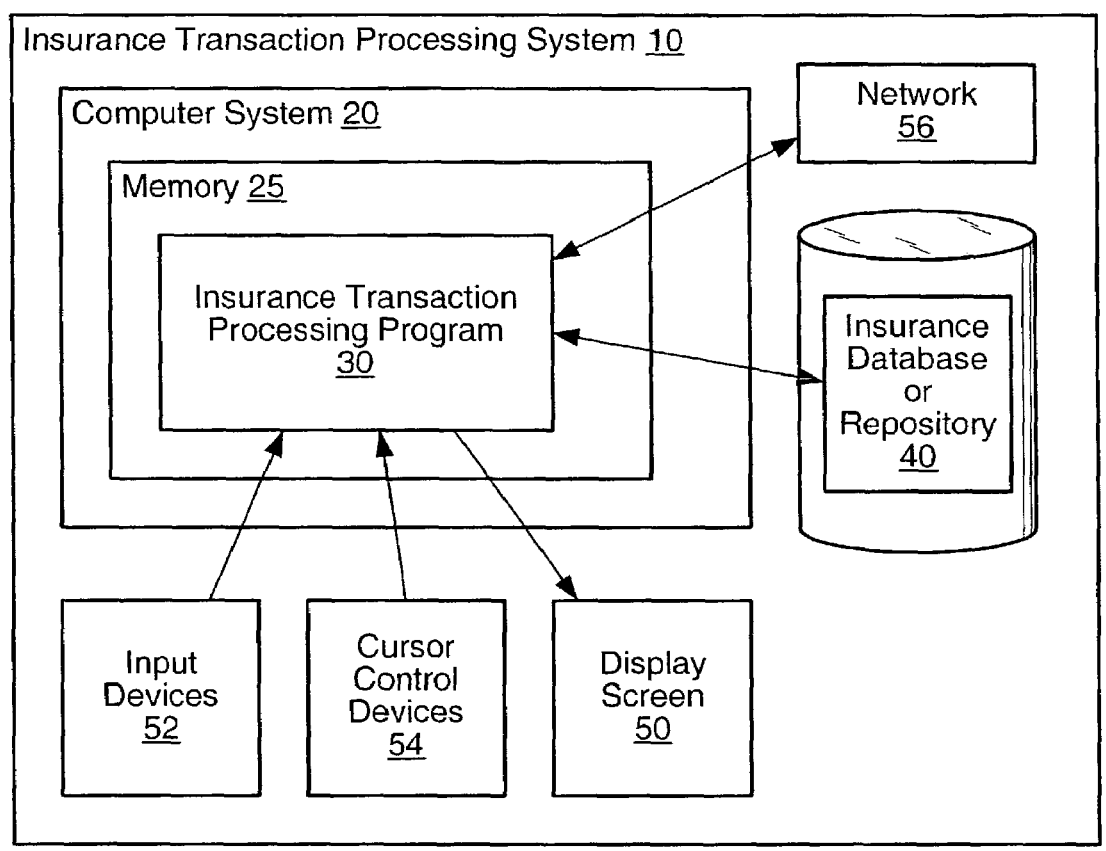
FIG. 1 is an illustration of a computer system for insurance transaction processing which is suitable for implementing various embodiments.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF THE PREFERRED EMBODIMENTS

FIG. 1 is an illustration of an embodiment of a computer system for insurance transaction processing. An insurance transaction processing system 10 may include a computer system 20. The term "computer system" as used herein generally includes the hardware and software components that in combination allow the execution of computer programs. The computer programs may be implemented in software, hardware, firmware, or any combination thereof. A computer system's hardware generally includes a processor, memory medium 25, and Input/Output (I/O) devices such as input devices 52. As used herein, the term "processor" generally describes the logic circuitry that responds to and processes the basic instructions that operate a computer system.

The term "memory" is used synonymously with "memory medium" herein. The term "memory medium" is intended to include an installation medium, e.g., a CD-ROM or floppy disks; a volatile computer system memory such as DRAM, SRAM, EDO RAM, Rambus RAM, etc.; or a non-volatile memory such as optical storage or a magnetic medium, e.g., a hard drive. The memory medium may include other types of memory as well, or combinations thereof. In addition, the memory medium may be located in a first computer in which the programs are executed, or may be located in a second different computer that connects to the first computer over a network 56. In the latter instance, the second computer may provide program instructions to the first computer for execution. In addition, the computer system may take various forms, including a personal computer system, mainframe computer system, workstation, network appliance, Internet appliance, personal digital assistant (PDA), television system or other device. In general, a computer system may include any device having a processor that executes instructions from a memory medium.

The memory medium may store a software program or programs 30 for processing insurance transactions as described herein. The software program(s) may be implemented in any of various ways, including procedure-based techniques, component-based techniques, and/or object-oriented techniques, among others. The software program(s) may also include applications written in a source code, such as COBOL. Such applications may be compiled into one or more computer-executable programs (e.g., executable code). In various other embodiments, the software program may be implemented using other technologies, languages, or methodologies, as desired. A CPU executing code and data from the memory medium may include a means for creating and executing the software program or programs according to the methods, flowcharts, and/or block diagrams described below.

In an embodiment, the software programs may be implemented using a rule-based development tool. For example, a rule-based development tool such as the ILOG Rules product from ILOG, Inc. of Mountain View, Calif. may be used. A rule-based development tool may combine business rule and object-oriented technologies to create and maintain complex, knowledge-intensive applications. Software developed with rule-based development tools may employ specialized programming languages for automation of processes. The processes may use hundreds or thousands of business rules from a knowledge base.

A computer system's software generally includes at least one operating system such as Windows NT, which is available from Microsoft Corporation of Redmond, Wash. The operating system is a specialized software program that manages and provides services to other software programs on the computer system. Software may also include one or more programs to perform various tasks on the computer system and various forms of data to be used by the operating system or other programs on the computer system. The data may include but are not limited to databases, data tables, text files, and graphics files. A computer system's software generally is stored in non-volatile memory or on an installation medium. A program 30 may be copied into a volatile memory when running on the computer system 20. Data may be read into volatile memory as required by a program.

A server may be defined as a computer program that, when executed, provides services to other computer programs executing in the same or other computer systems. The computer system on which a server program is executing may also be referred to as a server, though it may contain a number of server and client programs. In the client/server model, a server is a program that awaits and fulfills requests from client programs in the same or other computer systems. In one embodiment, a server that may be used to process insurance transactions is the COGEN system available from Computer Sciences Corporation of El Segundo, Calif.

As used herein, the term "channel" generally describes any device or system for gathering and or sending data to a computer system. For example, a channel may include a pathway that allows a user to interface with a computer system. Channels may include, but are not limited to: main office entry systems, branch office entry systems, kiosks, call centers, Internet systems, and electronic data interchange (EDI) systems. A channel may include a computer system. For example, a channel may include the computer system 20 shown in FIG. 1 used as an insurance office data entry system, a branch office entry system, a client computer system with a web browser, or a component of the system used in a call center channel. A channel may be coupled to a computer system via a network.

Each type of channel may require a different implementation system. For example, a kiosk entry system may use a touch-oriented visual screen. Special programming implementations may be needed to transfer data from the kiosk to the computer system. A channel may be implemented so that the channel may only be used for selected types of business transactions. For example, a kiosk system may be set up to only process certain business transactions, such as providing pricing quotes for specified insurance coverage situations. An office data entry system may use a monitor, keyboard and pointing device (e.g., a mouse) to allow for data entry into a computer system. A call center typically involves the oral communication of data to a person who enters the data into a computer system through a keyboard and/or pointing device. Electronic data entry systems may transfer data from one computer system to another.

The insurance transaction processing system 10 may further include a display screen 50 connected to the computer system 20 and an insurance database 40 residing on an internal or external storage. The database 40 may also be referred to as a repository. As used herein, a "database" may include a collection of information from which a computer program 30 may select a desired piece of data. As used herein, an "insurance database" is used as a synonym for a "database" when included in or coupled to an insurance transaction processing system 10. System 20 includes memory 25 configured to store computer programs 30 for execution on system 20, and a central processing unit configured to execute instructions of computer programs residing in system 10. Transaction processing program 30 may be stored in memory 25. As used herein, an "insurance transaction processing program" 30 may include a software program which is configured to process insurance transactions, such as, for example, determining the value of an insurance premium.

The insurance transaction processing system 10 may be used by an Insurance Company (IC) for various embodiments of a system and method for implementing business requirements. As used herein, an IC includes a business organization that provides insurance products and/or services to customers. An IC may perform a variety of insurance transactions or business transactions for its customers. For example, on incurring property damage, a customer may file an insurance claim with an IC to cover loss of property and other loss-related expenses. An IC may utilize a computer-based insurance transaction processing system to process the insurance claim. In another example, an insurance transaction may include determining the amount of an insurance premium for a particular policy and set of circumstances.

As used herein, an IC insurance transaction may be defined as a service or activity of an IC. Examples of IC insurance transactions may include, but are not limited to: filing of insurance claims, application for additional insurance coverage, payment of premiums, application for new insurance coverage, customized benefits, adding or deleting clients, tracking payables and receivables, establishing new policies, renewing policies, changing policies, canceling policies, providing pricing quotes for policies, and processing claims based on policies. Business transactions may also include services and/or activities related to customers, insurance providers, employers, insurance agents, investigators, regulatory agencies, etc.

In one embodiment, insurance transaction processing system 10 may utilize object-oriented technology to process insurance transactions. In another embodiment, processing of insurance transactions may utilize traditional programming languages and databases to achieve the same result. Insurance objects may be defined to represent or model real-world business features of insurance products and services. Examples of insurance objects may include; but are not limited to, objects representing: an insurance claim; an accident report; a settlement; IC service facilities, customers, and employees; a business process such as a new insurance application or calculation of a premium; an interface to an external insurance organization; a work task such as a calculation, decision, or assignment; a temporal object such as a calendar, a scheduler, or a timer; and elemental data necessary to accomplish work tasks such as medical costs, risk factors, automobile repair costs, etc.

In one embodiment, an insurance object may be represented on a computer screen by a graphical icon or by a display listing the properties of the insurance object in graphic and/or alphanumeric format. In one embodiment, an insurance transaction object may be configured to gather and evaluate data for processing an insurance transaction and to automatically make determinations regarding the insurance transaction based on one or more business rules. One or more steps associated with processing an insurance transaction may be configured as processing step objects. In one embodiment, a display screen object on a display screen may be associated with a processing step. In an embodiment, a display screen object may include a property to point to a previous display and another property to point to a next display screen.

In one embodiment, upon startup, insurance transaction processing program 30 may provide a graphical user interface (GUI) to display transaction processing related information on display screen 50. Insurance transaction processing program 30 may collect user inputs, such as those entered by using user input devices 52, associated with an insurance transaction. Insurance transaction processing program 30 may process the user inputs. In an embodiment, insurance transaction processing program 30 may access an insurance database 40, and use data from database 40 along with the user inputs to complete processing of the transaction. Insurance transaction processing program 30 may also store results of processing a transaction in memory 25 and/or insurance database 40. Insurance transaction processing program 30 may display a result of the insurance transaction processing on display screen 50.

Computer system 20 may include one or more user input devices 52, such as a keyboard, for entering data and commands into the insurance transaction processing program 30. Computer system 20 may also include one or more cursor control devices 54 such as a mouse for using a cursor to modify an insurance claim viewed on display screen 50. In response to processing a transaction, insurance transaction processing program 30 may store the processed transaction in the insurance database 40.

In one embodiment, the insurance transaction processing system 10 may include one or more transaction processing programs, also referred to as software modules. As used herein, a "software module" refers to a portion of program code provided to implement one or more functions within an insurance transaction processing system and/or within another software program. Typically, an insurance transaction processing system may include a plurality of software modules. One or more software modules may implement processing specific to one or more insurance types. Processing specific to an insurance type may include transactions such as premium determination, policy rating, assignment coverages, etc. For example, an insurance transaction processing program may include software modules that implement personal automobile insurance transactions, commercial automobile insurance transactions, residential property insurance transactions, commercial property insurance transactions, life insurance transactions, personal liability insurance transactions, etc. One or more software modules may implement processing common to various insurance types. For example, an insurance transaction processing program may include software modules that implement billing, report generation, maintaining customer contact information, accounting, etc. Additionally, one or more software modules may implement program control functions to direct the execution of other software modules. For example, such a control software module may include or be associated with a user interface. A user may provide input to the user interface. The control software module may interpret the user input and call one or more other software modules to implement functions designated by the user.

Figure 2:
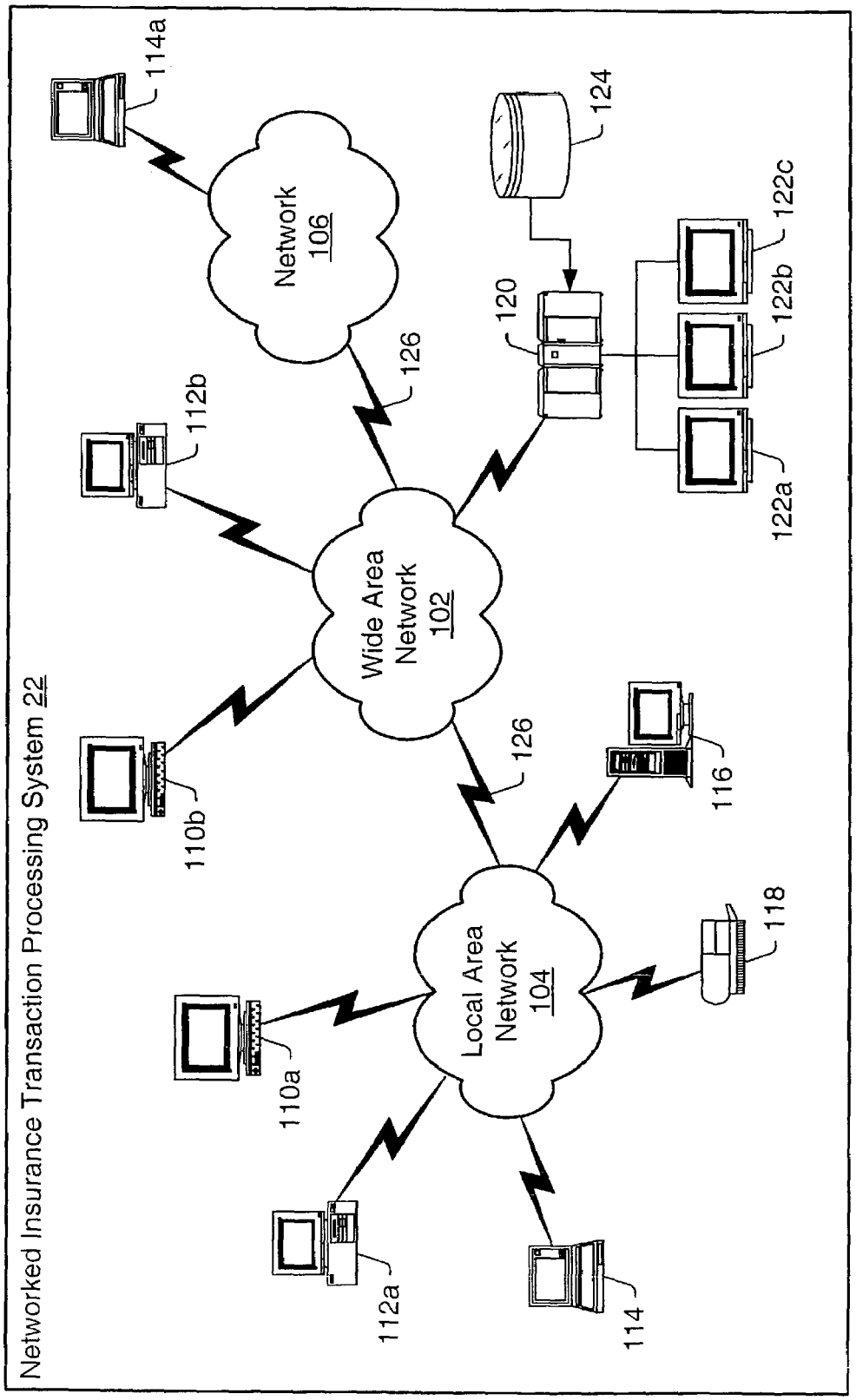
FIG. 2 is an illustration of a networked computer system which is suitable for implementing various embodiments.

FIG. 2 illustrates one embodiment of a networked insurance transaction processing system which may be configured for processing insurance transactions in a distributed environment. The networked system may also be referred to as a distributed computer system 22. In this embodiment, the insurance transaction processing system 10 of FIG. 1 may be implemented as a client/server system with the server systems 120a and client systems 110a, 110b, 114, 114a connected by one or more networks. The networked insurance transaction processing system 22 may be operatively coupled to other external computer systems (not shown). Network 56 may be a local area network 104 or a wide area network 102, and may include communications links including, but not limited to: Ethernet, token ring, Internet 106, satellite, and modem.

One or more local area networks (LANs) 104 may be included in networked insurance transaction processing system 22. A LAN 104 is a network that spans a relatively small area. Typically, a LAN 104 is confined to a single building or group of buildings. Each node (i.e., channel or device) on a LAN 104 may have its own processor that may be used to execute programs. Each node may be able to access data and devices anywhere on LAN 104. LAN 104 allows many users to share devices, such as a network printer 118, as well as data stored on file servers. LAN 104 may be characterized by any of a variety of types of topology (i.e., the geometric arrangement of devices on the network), of protocols (i.e., the rules and encoding specifications for sending data, and whether the network uses a peer-to-peer or client/server architecture), and of media (e.g., twisted-pair wire, coaxial cables, fiber optic cables, radio waves). As illustrated in FIG. 2, the networked insurance transaction processing system 22 may include one LAN 104. However, in alternate configurations the networked insurance transaction processing system 22 may include a plurality of LANs 104, which may be coupled to one another through a wide area network (WAN) 102. A WAN 102 is a network that spans a relatively large geographical area.

One or more mainframe computer systems 120 may be coupled to the networked insurance transaction processing system 22. As shown in FIG. 2, the mainframe computer 120 may be coupled to the networked insurance transaction processing system 22 through the WAN 102. Alternatively, one or more mainframes may be coupled to the networked insurance transaction processing system through one or more LANs 104. As shown, the mainframe 120 may be coupled to a storage device or file server 124 and mainframe terminals 122a, 122b and 122c. Mainframe terminals 122a, 122b and/or 122c may access data stored in the storage device or file server 124 that is coupled to or included in mainframe computer system 120.

Networked insurance transaction processing system 22 may include one or more clients using one or more channels 126 that connect to servers 120a and/or mainframe computer 120 through WAN 104 or LAN 102. In other words, networked insurance transaction processing system 22 may include one or more clients 114a that are not coupled to the networked insurance transaction processing system through a LAN 102 or a WAN 104. For example, networked insurance transaction processing system 22 may include channels that are geographically remote from mainframe 120 or servers 120a and connect to networked insurance transaction processing system 22 through the Internet 106.

Insurance transaction processing system software 30 and insurance database 40 may be distributed among one or more servers 120, 120a to provide a distributed processing system for insurance transactions. In other words, an insurance transaction being processed by networked insurance transaction processing system 22 may be routed to a server based upon the workload distribution among available servers at the time of the transaction. Insurance transaction processing system servers 120, 120a may be located on a local area network or may be geographically dispersed in a wide area network, including the Internet 106.

One or more client systems 110a, 110b, 114, 114a may also be connected to network 56. Client systems 110a, 110b, 114, 114a may reside at one or more transaction processing units within the insurance company. In a wide area network, client systems 110a, 110b, 114, 114a may be geographically dispersed. Client systems 110a, 110b, 114, 114a may be used to access insurance transaction processing system servers 120a, insurance database 40 and/or a help database. An insurance transaction processing employee may use a client system 114a and the Internet 106 to access the networked insurance transaction processing system 22 to execute insurance transactions, enter inputs, display results, etc. One or more networked printers 118 may also be connected to network 56 for printing documents associated with insurance transactions.

In an embodiment, an insurance transaction processing program may be configured and/or modified using a rules engine. As used herein, a "rules engine" may include a system which is operable to produce program code (e.g., source code and/or executable code) that implements procedures specified in one or more business rules. For example, a rules engine may determine, combine, assemble, configure and/or compile code to implement one or more business rules on a computer system. A rules engine, in one embodiment, may generate an expert computer system. An expert computer system may utilize and build a knowledge base developed in the form of business rules and/or algorithms to assist the user in decision-making. In one embodiment, the rules engine may be operable to generate insurance transaction processing program code. In one embodiment, the rules engine may be operable to generate assembly instructions for forming a software module of an insurance transaction processing program. In various embodiments, a rules engine may translate business rules into executable code at runtime or create executable code to be executed later. Generally, runtime translation of business rules may provide increased flexibility; whereas creation of code may provide a fast, less resource intense execution of the business rules.

In one embodiment, a rules engine may be used to define rules associated with insurance transaction processing. In various embodiments, the rules engine may be implemented and executed on various computing platforms such as, but not limited to: a personal computers, a mainframe computer, a distributed computing environment (e.g., a LAN or WAN), etc. The rules engine may include one or more rules engine executable files on these platforms. Additionally, one or more data table files may be associated with the rules engine. For example, data used by the rules engine for preparing an insurance transaction processing program may be stored in data files. In one embodiment, the rules engine may be developed using a commercial rule-based development tool such as ILOG Rules. In one embodiment, the rules may be customizable to meet the requirements of various financial services organizations.

In an embodiment, business rules may be stored in and retrieved from a database 40. The type of information stored and/or retrieved may include, but not be limited to, business objects, tables, rules, software source code, executable software, etc. In one embodiment, the database may include a relational database. In one embodiment, the database 40 may include an object-oriented database.

The insurance transaction processing program may, in one embodiment, be implemented using object-oriented technology. Object-oriented technology may include, but is not limited to: object-oriented analysis and design, an object-oriented program language, and/or an object-oriented database. In an embodiment, the insurance transaction processing program may be implemented by using both object-oriented technology and a traditional programming language, such as COBOL. The object-oriented programs may interact with traditional programming language code, and vice versa, to process insurance transactions. In one embodiment, an object-oriented program may generate a new software module written in a traditional programming language. In one embodiment, the commercially available Netron Fusion™ product from Netron, Inc. may be used to assemble COBOL code or Java™ objects. The traditional programming language may be compiled and integrated with other program code to generate executable program instructions for processing insurance transactions. In an embodiment, program code generated in a traditional programming language may be integrated with legacy code (e.g., pre-existing code).

In a traditional software development process, a business professional may write a description of a business requirement to be implemented in an insurance transaction processing system. For example, the business requirements may be written in a text document on a word processor. A technical professional (e.g., a programmer) may read the description of the business requirement and try to determine specific software program(s), etc. which may need to be changed to implement the business requirement. In some cases, the technical professional may not be conversant with certain business terminology used by the business professional. Thus, the technical professional may misinterpret critical business requirements. The technical professional may assess the impact on a legacy system of implementing the business requirement. Eventually, the technical professional may develop new software, compatible with the legacy system, to meet the business professional's needs. Depending on the complexity of the business requirements, several thousand lines of program code may have to be written and integrated with the legacy code. The technical professional and the business professional may participate in an extensive testing and validation of the new software. If any errors or bugs are discovered, the process may be largely repeated. After verifying that the required business functionality is implemented by the new software code the business professional may complete the software development process by accepting the newly developed software.

In an embodiment, a software development process may allow a business user to create or modify portions of program code without the assistance of a technical professional. In such an embodiment, the business professional may interface with a rules engine to prepare business rules. The rules engine may automatically validate the business rules. Additionally, the rules engine may allow the business professional to test the functionality of code packets formed to implement the business rules without the need to test other portions of the software code (e.g., the insurance transaction processing program). Such embodiments may use software reuse and encapsulation techniques to enable a code packet formed to implement a business rule to interact with other portions of the software code. For example, the business professional may be encouraged to reuse existing business rules where the existing rules can be modified to meet the business professional's needs. As used herein, "encapsulation" refers to a programming technique wherein a portion of software code is relatively independent. For example, when activated, the portion of software code may access data that it needs for execution and execute its program instructions independent of the remainder of the software code. In such cases, the portion of software code may have its own process variables, sub-routines, input and output routines, etc. that allow the portion of software code to execute and, where appropriate, provide output. In some embodiments, technical professionals may assist business professionals in integrating or associating new business rules with an existing program framework.

Business and/or insurance transaction processing software is dynamic and frequently changing to meet new business requirements. It may be desirable for insurance transaction processing software to be adaptable to changing business requirements. It may also be desirable for business requirements to be expressed in business rules in business terms. In order to streamline the software development process used to develop the insurance transaction processing software, it may be desirable to establish a common development framework between all parties involved with the software development process. The rules engine may provide the tools and the processes to be used by all of the parties involved in the software development.

A rules engine may provide tools and utilities for a business professional to define business requirements. In one embodiment, a legacy insurance transaction processing program may already be in place within the IC. In other embodiments, the insurance transaction processing program may be installed in the absence of or as a complete replacement to legacy applications. In an embodiment where an existing insurance transaction processing program is in place, the insurance transaction processing program may be segmented into at least one static portion and one or more dynamic portions. As used herein a "static portion" of code may refer to a portion of a software program code that is expected to change relatively infrequently. For example, the static portion may include the insurance transaction processing program's core functionality. As used herein, a "dynamic portion" of code may refer to a portion of a software program code that is expected to change relatively frequently. For example, a dynamic portion may include one or more business rules. As used herein, portions of the segmented code may be referred to as "code packets." It may be typical for an IC to have a common insurance transaction processing logic which may not change from region-to-region or from one product line to another. Such common processing logic may be included in the static portion. However, the insurance transaction processing logic may also include one or more business rules which may vary across regions and/or product lines. In another example, a particular portion of the transaction processing logic (e.g., a business rule) may be customized by a particular IC. The customized portion of code may be included in a dynamic portion.

Figure 3:
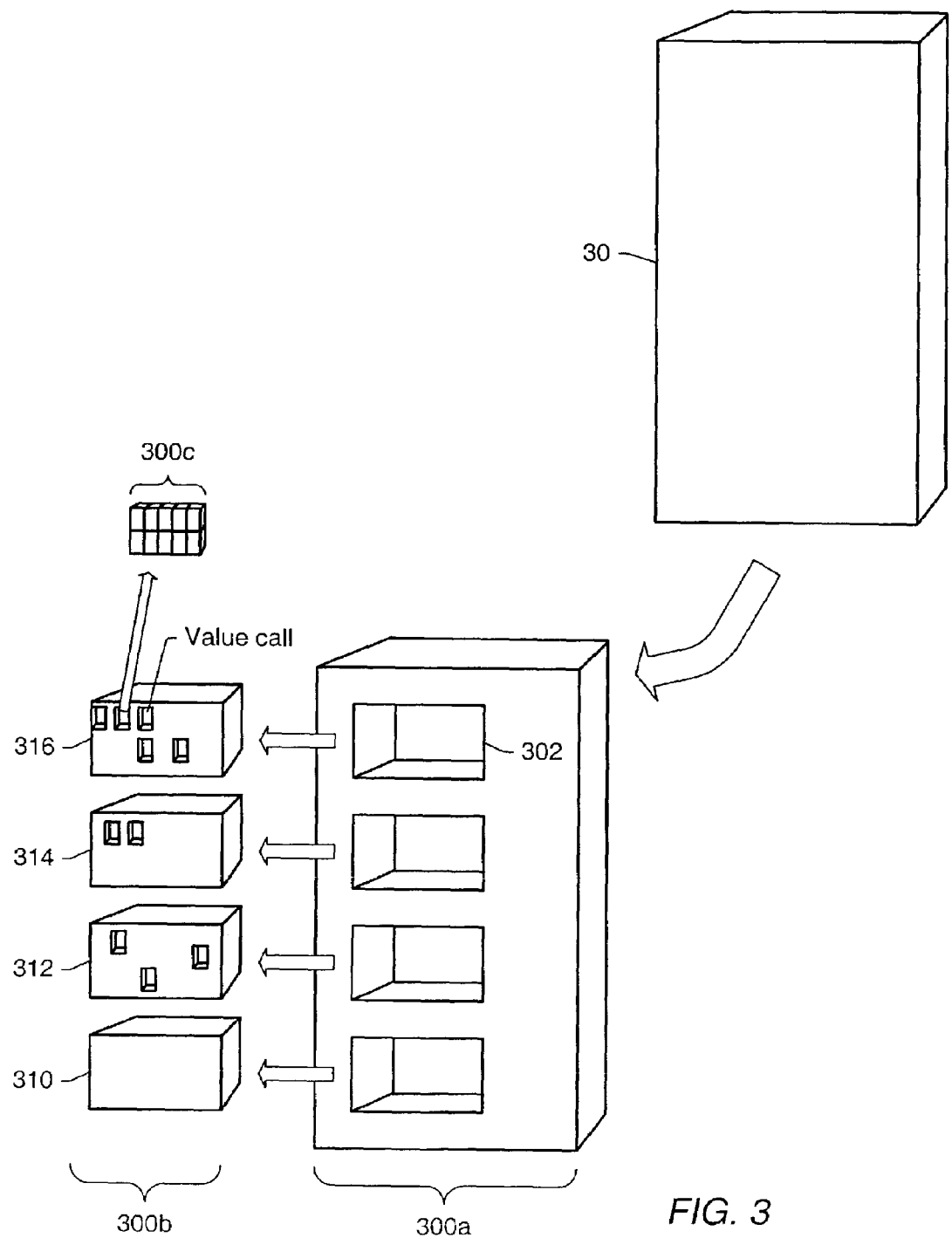
FIG. 3 illustrates a structure of an insurance transaction processing program including static and dynamic portions according to one embodiment.

An embodiment of an insurance transaction processing program divided into static and dynamic portions is depicted in FIG. 3. In FIG. 3 insurance transaction processing program 30 is depicted as a block to illustrate division of the program in to a static portion and a plurality of dynamic code packets. Such an arrangement may allow changes to be made to dynamic code packets 300b without effecting static portion 300a. Additionally, dynamic code packets 300b may be further segmented to remove certain portions of code 300c. For example, dynamic code packets 300b may be segmented further to remove values and/or parameters 300c (collectively referred to herein as "parameters") that are likely to change even more frequently than business rule structure of the insurance transaction processing system to the next. Assembly variables 302 may be incorporated into the insurance transaction processing program's code to reference dynamic portions 300b and/or parameter 300c. Assembly variables 302 may provide locations to plug code packets generated by a rules engine into static portion 300a. Alternately, assembly variables 302 may include references to code packets (e.g., function calls). The separation of the rules-based logic (e.g., dynamic code) from the standard transactional business logic (e.g., static code) may allow the users to construct new business rules by reusing existing business rules executed within the standard transactional business logic.

Figure 4:
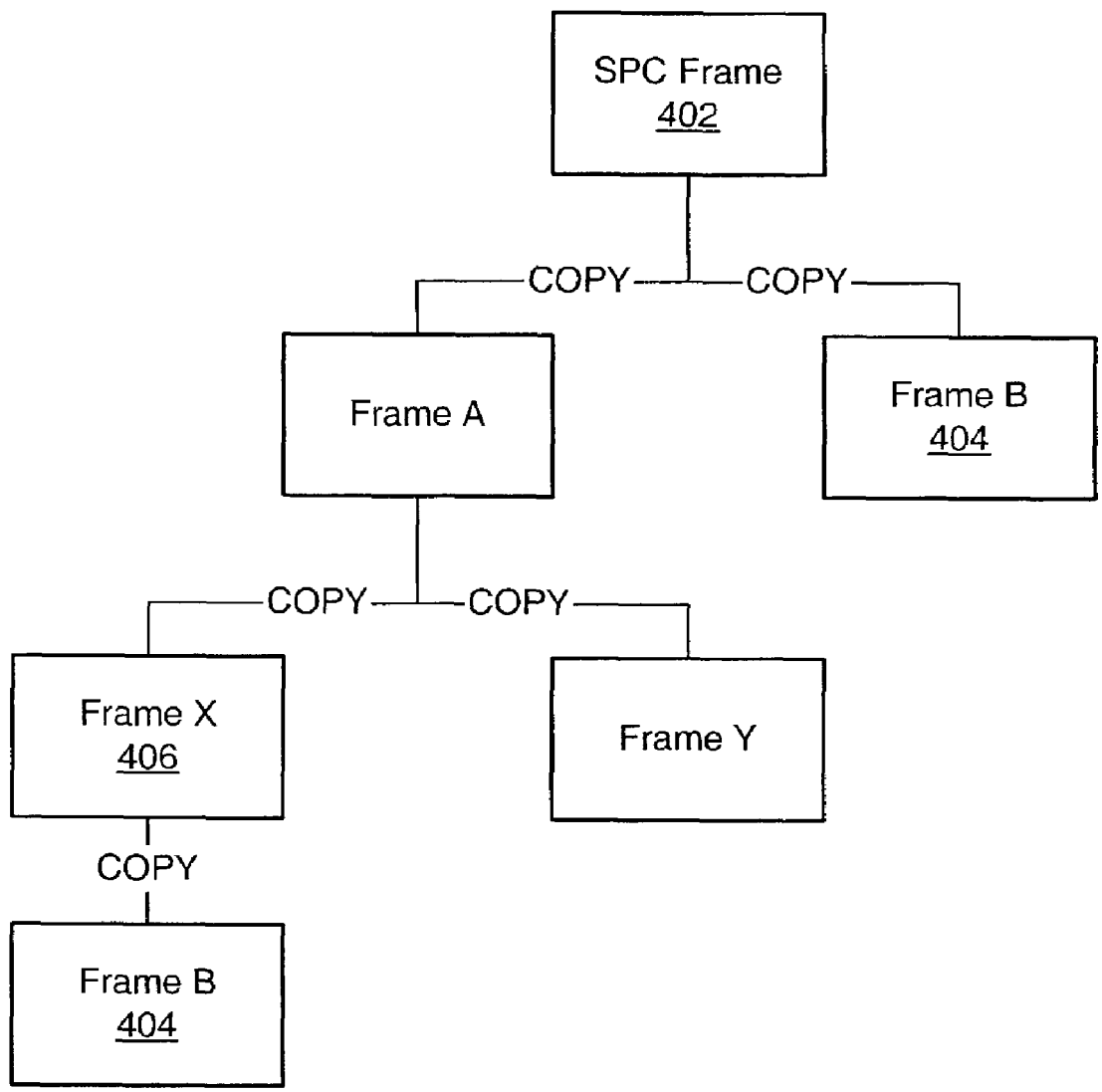
FIG. 4 depicts an embodiment of a code packet hierarchy in a rule editor system.

As used herein, a "code packet hierarchy" refers to an arrangement of a group of code packets involved in the generation and/or assembly of program code. FIG. 4 depicts an exemplary embodiment of a code packet hierarchy. As depicted in FIG. 4, SPC code packet 402 may be thought of as the top level of the code packet hierarchy. SPC code packet 402 may include references to one or more other code packets in the hierarchy. For example, the references to other code packets may include commands that direct the assembly of program code by a code assembler. Such commands may include commands to copy other code packets, to replace all or part of other code packets, etc. As depicted in FIG. 4 one code packet may copy another code packet at a desired location. For example, Code packet X 406 references Code packet B 404, as depicted by the "COPY" command linking the two code packets. Additionally, a code packet may be referenced by more than one other code packet. For example, Code packet B 404 is depicted as copied by SPC code packet 402 as well as by Code packet X 406.

A code assembler may access a specifications code packet (SPC) to produce a complete program code. Commands in the SPC may be used to tell the code assembler how to assemble the code from the various referenced code packets.

An SPC may be used as input to a code assembler. As used herein, a "code assembler" refers to a program that, upon execution, assembles program code based on directions from a program code configuration file. In an embodiment, Netron Processor, available from Netron, Inc. may be used as a code assembler. A specification code packet may include an Environmental/Configuration code packet(s) and a Program Control code packet (PCP). In an embodiment, a PCP containing COPY commands to copy code packets from the hierarchy may be generated automatically by a rules engine, in a process referred to herein as "code generation". The code assembler may process each assembly command it encounters in a code packet. The lines of code output by the code assembler may be written to a file along with a sort code. At the end of code assembly, the program code may be sorted according to the sort codes to create a complete version of the program code (e.g., source code). In an embodiment, each line of code contained in the assembled program code may originate from either the SPC or one of the code packets below it in the hierarchy.

An environment/configuration code packet sets up the environment for the code assembler to assemble a single instance of program code. Generally, an environment/configuration code packet does not produce code to the final program. Rather, it may define program and system architecture data that is needed for code placement in the final program. In general, the information contained in the environment/configuration code packet relates directly to the needs of the underlying code packets. For example, an environment/configuration code packet may define aliases for the standard code packet names. As used herein, an "assembly variable" refers to a variable that is used as a reference point for code assembly. For example, assembly variables may be replaced during program code assembly. Assembly variables may represent program code names, data values, etc. Some assembly variables may be used to store values to control later portions of code assembly. Certain assembly variables may be replaced by code from code packets during program code assembly. Such assembly variables may be referred to herein as implementation points. Additionally, certain assembly variables may act as placeholders for insertion of code within a driver code packet, PCP and/or SPC.

An environment/configuration code packet may access a concatenation file to specify the concatenation of files. As used herein, a "concatenation file" refers to a file including a list of locations (e.g., folders) that the code assembler may search when looking for a code packet requested in the assembly process. In an embodiment, the locations may be searched in the order in which they are listed in the concatenation file. The order that the locations are specified in may be important when there are multiple versions of the same code packet. For example, one version may be in a test folder and one version may be in a production folder.

The environment/configuration code packet may also reference a data manager code packet and initialize the data management tables used by other code packets. The environment/configuration code packet may set assembly variables that are used when constructing section labels in other code packets. An environment/configuration code packet may also set up working storage groups. Assembly variables defined in the environment/configuration code packet may define to which working storage group each code packet's logic is to go.

In an embodiment, a rules engine may generate a PCP. In such embodiments, the PCP may include access information for other code packets and program assembly directions. For example, the PCP may include instructions to copy a particular code packet to a specific implementation point. The PCP may also contain values that are used for code assembly.

In an embodiment, a driver code packet includes the framework for the final program. In particular, the driver code packet may specify the implementation points where generated code is to be included.

In some embodiments, program code contained in the driver code packet is generic. That is, there are no lines of code that are specific to an individual product line in the driver code packet. Rather, product line specific logic may be included in other code packets associated with the model. In this way, multiple models may use the same driver code packet. As used herein, a "model" refers to a configuration in a rules engine that may be assembled to form one or more software modules. For example, a particular set of configuration elements of a rules engine may form a first model. The first model may be assembled to form a first software module. Similarly, a second model may be assembled to form a second software module. The second software module may be assembled using the same driver code packet as the first software module. The first and second software modules may be directed to the same product or to different products. Additionally, the first and second software modules may be combined in an insurance transaction processing program. For example, the first software module may implement an Annual Premium Calculation and the second software module may implement a Driver Vehicle Assignment. The Annual Premium Calculation software module and the Driver Vehicle Assignment software module together may form portions of personal automobile insurance product. The personal automobile insurance product may be only a portion of an overall insurance transaction processing program.

As used herein, a "data code packet" refers to a code packet that assists in moving of information. For example, when mapping data from one source to another, a data code packet may be used to facilitate the data transfer. In an embodiment, using data code packets to assist with data transfer may limit the need to hard code the data movements into other code packets.

A technical code packet is one that is used to perform a non-business function. For example, a technical code packet may be used to retrieve data from memory or update memory. Technical code packets are typically model specific within a product line. In an embodiment, a technical code packet may be created for each generic record (e.g., a record applicable to multiple product lines) to be copied from a datastream or database record to a memory record. A technical code packet may also be created for each subsidiary record of a product line to be copied from either a datastream or a database record to a memory record.

In an embodiment, a business rule code packet may include program code and references needed to implement at least one business rule. For example, a business rule code packet may include computer commands, logical instructions, algorithms, variables, parameters, etc. to achieve or implement a certain function (e.g., a business requirement). For example, in an embodiment, an IC may desire to implement a particular business function. One or more business rules consistent with the particular business function may be developed. In an embodiment, a business rule may include a number of business rule specifications. A business rule specification may include a plurality of program instructions (e.g., conditions, algorithms, commands, etc.). A business rule specification may be used to form a business rule code packet.

Two or more business rules may relate to one another. For example, a business rule may be used to assign a value to an attribute used by another business rule. Such an example may include an instance where a business rule determines the appropriate start and stop date for a data table reference look up, or sets an attribute value equal to a value stored in the business rule repository.

Additionally, a business rule may relate to other portions of the insurance transaction processing program (e.g., parameters, static code, etc.). For example, in one embodiment, a business rule may state, "If applicant possesses a red sports automobile then the risk factor should be classified as high." In such a case, "Does the applicant possesses a red sports automobile?" may be viewed as a condition to evaluate. If the evaluated condition is found to be true, then a program command may be executed to "set the risk factor to high." In this example, the "risk factor" may refer to a parameter of the evaluated business rule. Alternately, "risk factor" may refer to an input variable of a second business rule. In such a case, setting the "risk factor" to high may include executing the second business rule. Similarly, the term "high" may refer to a specific value (e.g., 1.3). When the example business rule is used to form program code for the insurance transaction processing program, the term "high" may be replaced by the specific value. Alternately, the term "high" may be replaced with a placeholder that references a parameters data table. In such an embodiment, a user may alter the specific value associated with the term "high" without recompiling the code of the insurance transaction processing program.

A generic code packet is one that is not associated with any specific product line, subsystem, etc. Generic code packets may be used to perform common functions, such as, but not limited to: providing the ability to generate programming language constructs or record retrieval by key.

Typically, a generic code packet may be technical in nature (e.g., may not contain any business rule code). However, in certain instances, a business rule code packet may be a generic. For example, if the code packet is usable without any restrictions as to product line or subsystem. In another example, a particular set of program instructions to may appear several times within a portion of program code or in multiple portions of program code. These sets of program instructions may be put into generic code packets in order to provide maximum re-usability and minimize maintenance to the program code. Some examples of when using a generic code packet may be appropriate include, but are not limited to: retrieving records from memory, copying a record from memory to a processing module, or building a re-usable language construct (e.g., building a working storage table in a COBOL module).

Figure 5:
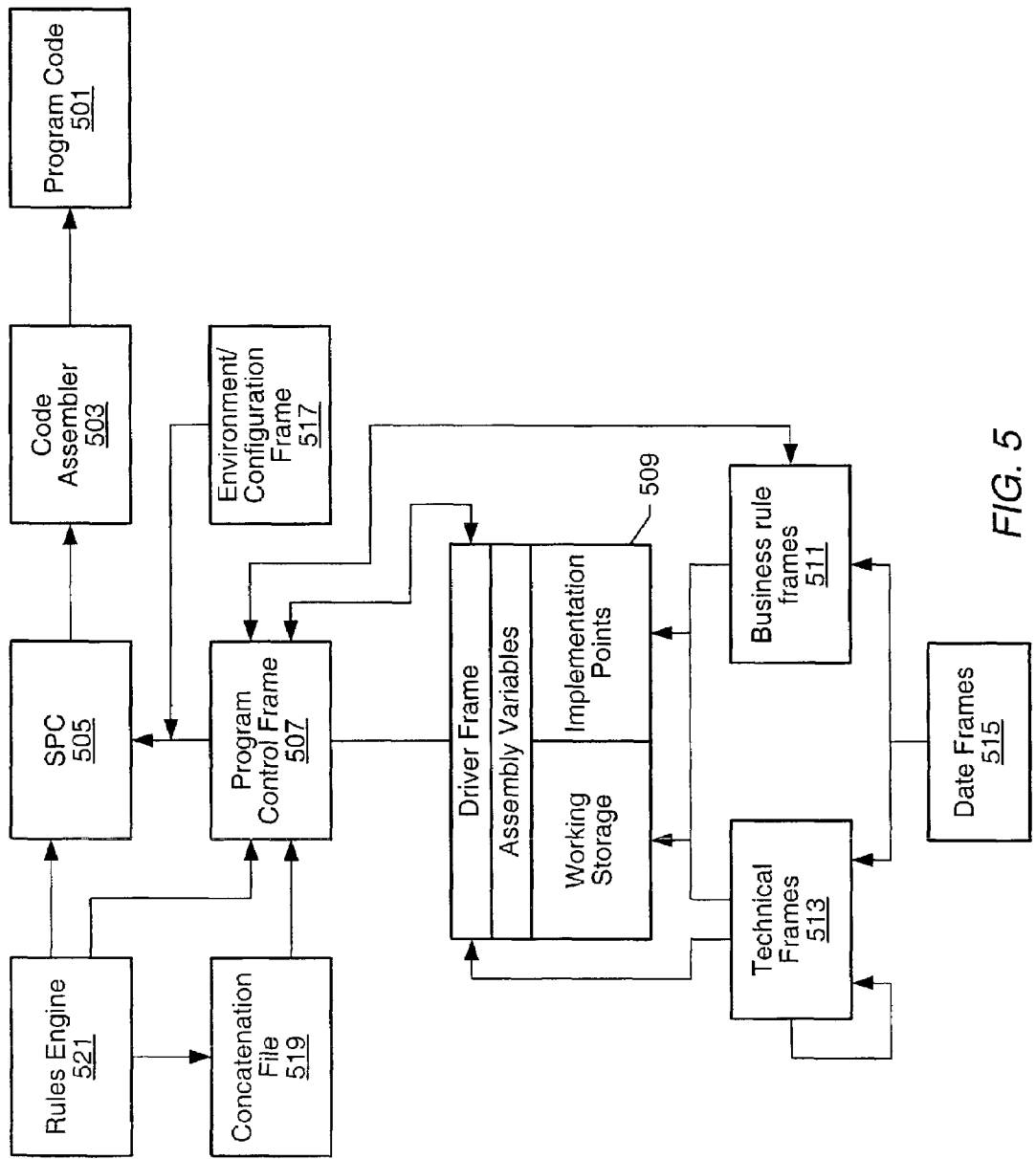
FIG. 5 depicts an embodiment of a code generation and assembly process flow diagram.

FIG. 5 depicts a flowchart of an embodiment of various code packets involved in production of program code 501. Program code 501 may include source code or script in any computer language. Code assembler 503 may assemble program code from code packets written in a target computer language (e.g., the computer language of program code 501). The code packets may be stored in a database. SPC 505 may be used as input to code assembler 503. SPC 505 may be formed from PCP 507 and environmental/configuration code packet 517.

Rules engine 521 may form PCP 507. PCP 507 may include commands and program code copied from driver code packet 509, business rule code packets 511, technical code packets 513 and/or data code packets 515. In an embodiment, more than one version of a particular code packet may exist in a library of code packets. A concatenation file 519 may direct PCP 507 to the appropriate business code packets. For example, an insurance transaction processing program may be customized for use by a particular insurance company. The insurance company may, for example, customize the appearance of various user interface screens. The insurance company may also customize various business rules of the insurance transaction processing program. Such customizations may be stored in code packets. If a new version of the insurance transaction processing program is released, the insurance company may desire to upgrade to the new version of the program without loosing customized features. Concatenation file 519 may include information to direct PCP 507 to code packets containing customized features or other features as desired by the user.

In an embodiment, the rules engine processes driver code packet 507 before business rule code packets 511 or technical code packets 513 are processed. In such embodiments, the rules engine may determine the basic structure of the program before business rules code packets 511 or technical code packets 513 are processed.

Data code packets 515 may be used to generate working storage and/or supply needed values for code packets. Other code packets may also generate working storage.

In an embodiment, a legacy insurance transaction processing program may be segmented into static and dynamic portions. Segmenting a legacy program may allow portions of the legacy program to be updated and/or customized individually. For example, such embodiments may allow an IC to install a newer version of an insurance transaction processing program without loosing customized portions of the older version of the program. Additionally, an IC may be able to select portions of the insurance transaction processing program to implement without customization and portions to customize. For example, a release of an insurance transaction processing program may include standard code packets for various functions. An IC may replace some or all of the standard code packets with customized code packets. The insurance transaction processing program may be formed using customized code packets where they exist (e.g., via proper configuration of the concatenation file), and standard code packets where customized code packets do not exist. Additionally, customized code packets may be retained between versions of the insurance transaction processing program. Thus, if a customer provides one or more customized code packets, the customized code packets may be migrated to the new version of the insurance transaction processing program.

In one embodiment, a code assembler may generate program code based on configuration information provided via a rules engine. For example, the code assembler may create program code in a language determined by the configuration information. In an embodiment, program code in a traditional business programming language (e.g., COBOL) may be generated. A compiler may convert the program code into executable program code to form an insurance transaction processing program. In an embodiment, business rules may be compiled to generate executable code. In one embodiment, a business rule may be represented in a rules engine as a business rule object. The business rule object may have methods and properties associated with it. The business rule object may be translated into a traditional programming language and/or executable code for inclusion in an insurance transaction processing program.

In an embodiment, the insurance transaction processing program may be modified by modifying one or more code packets. For example, new business requirements may be used to form one or more new business rules. The new business rules may be implemented in code packets which may be incorporated into one or more software modules of the insurance transaction processing program. Such embodiments may allow changes to be made to business logic without changing the static portion of the code or other code packets.

Thus, changes to and verification of the static portion and/or other code packets may be avoided. This may allow business rules to be designed, implemented, and/or tested independent of one another, as discussed further below.

Figure 6:
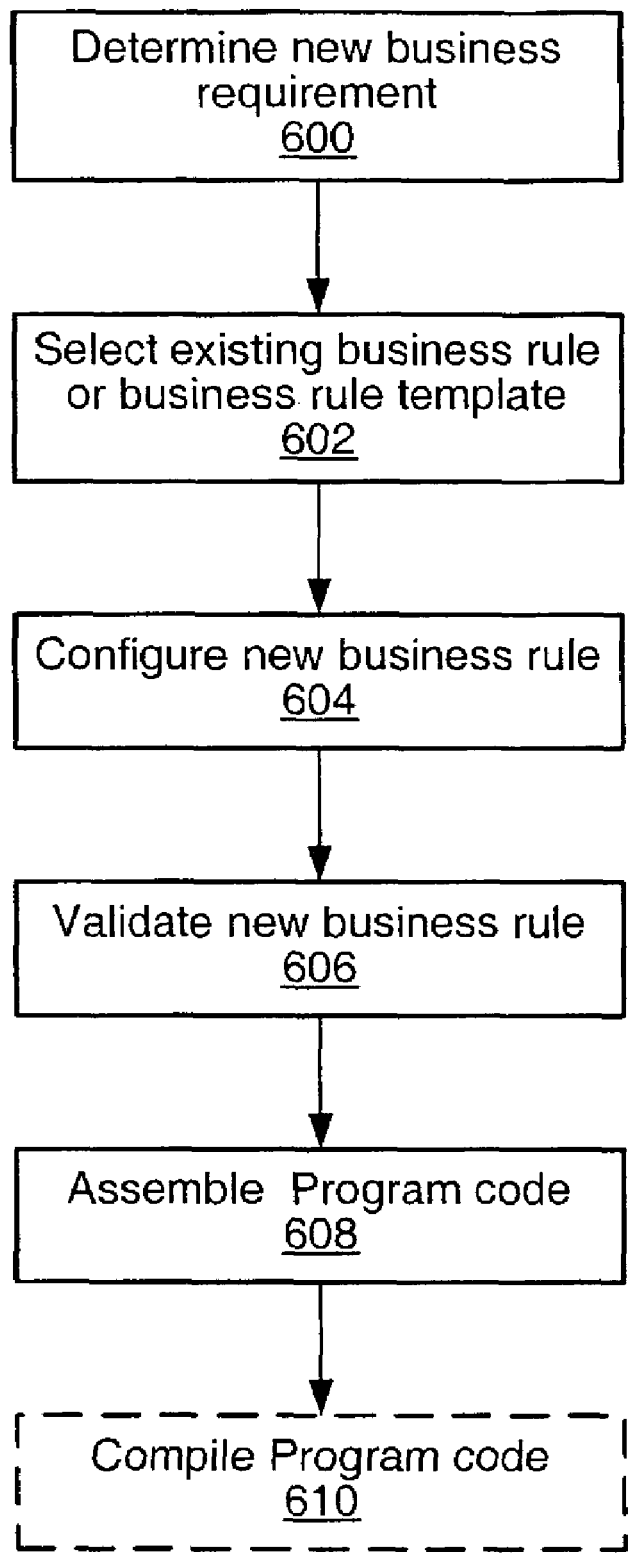
FIG. 6 is a flowchart illustrating a method for developing a business software program according to one embodiment.

FIG. 6 is a flowchart illustrating one embodiment of a method for using a rules engine to develop software. The rules engine may provide tools to select or configure business rules consistent with the business requirements, and generate program code to integrate the configured business rules with an insurance transaction processing program. At box 600, a business professional may determine a new (or changed) business requirement. The business professional may determine an existing business rule or a business rule template that may be used to implement the new business requirement at box 602. An advantage of selecting an existing business rule or business rule template may be that information defining the interface between the business rule or template may already be specified in a technical code packet. Thus, there may be no need for a technical professional (e.g., a programmer) to review, modify, or test the interface between the newly configured business rule and the rest of the program. The business professional may configure the selected business rule or business rule template to implement the new business requirement at box 604.

After the user has configured the new business rule, the new business rule may be validated as shown in box 606. The validation process may include, but is not limited to: ensuring that operators and attributes are compatible, ensuring that comparisons between attributes are logical, ensuring that expiration dates are not earlier than effective dates, etc. Validation required to implement a new business requirement may vary depending on how the business requirement is implemented. For example, the level of validation may be proportional to the amount of reusable code (e.g., code templates and/or code packets) used to implement the new business requirement. If the new business requirement is implemented exclusively by reusing existing software code, then the testing and validation effort may be minimized and/or eliminated. However, if the new business requirement is implemented by the development of one or more new code packets, then the level of testing and validation may be more significant. The code packet(s) implementing the new business requirement may require validation. The functionality of the new code packet(s) may also be tested. Additionally, integration of the code packet(s) with the static portion of the code may require validation and/or testing.

At box 608, one or more code packets implementing the configured business rules may be combined with other code packets to form program code for a software module of an insurance transaction processing program. In some embodiments, after the program code is formed, it may need to be compiled before execution, as depicted in box 610. In some embodiments, the business professional may be able to execute the program including the newly configured business rule immediately upon compiling the program to implement the business function specified in the business requirements. In an alternate embodiment, the business rule may be available for execution after a predetermine time. For example, changes to the insurance transaction processing program may be saved for implementation at regular intervals (e.g., during low usage times, etc.).

In certain embodiments, a business professional may be able to create a new business rule or business rule template at box 604 without selecting an existing business rule or business rule template at box 602. In such embodiments, the newly created business rule may not be associated with a technical code packet to define its interface with the rest of the program. The rules engine may route the newly defined business rule or template to a technical professional for creation or selection of a suitable technical code packet. The technical professional may map the business rule or template to an existing technical code packet, or may create a new technical code packet for the business rule or template. If a new technical code packet is created, it may be added to a repository of code packets in a database for possible reuse with other business rules and/or business rule templates. Creation of new code packets is further described below.

In configuring a business rule, a business professional may determine that a new factor is required. For example, the new business requirement may include a parameter not considered in a previous version of the business rule. Thus, no interface to the new factor may be present in code packets associated with the business rule. The business professional may be able to configure a new business rule by starting with the old business rule and adding the new factor (and appropriate other program instructions as desired). For example, the business professional may select the new factor from a list of existing factors. In an embodiment, the rules engine may support the new business rule by adding appropriate interface information to one or more code packets associated with the business rule. If the rules engine is not able to automatically include appropriate interface information, then the new business rule may be routed to a technical professional for creation of one or more new code packets. In an alternate embodiment, the new business rule may always be routed to a technical professional.

Generation of a new business rule may begin with identifying a business requirement. It may be desirable for business requirements to be reduced to their lowest level of information. In an embodiment, business requirements may be stored in a database in association with one or more business rules that implement the business requirements. In such embodiments, business professionals may enter the business requirements as part of configuring a business rule. The business professional may configure a business rule to implement a business requirement. Since business rules may guide the behavior of a business, it may be desirable for business rules to be written such that their interpretation is constrained. For example, a business rule may be written so that there is only one way to interpret its meaning. To assist in constraining interpretation of business rules, an IC may establish language and/or syntax guidelines to assist business professionals in specifying business rules and requirements. For example, syntax guidelines may require that a written business requirement include clear and unambiguous language. Similarly, a business rule may be required to include only one condition and/or one consequence per business rule specification and a business rule specification may produce one result. As used herein a "business rule specification" refers to an individual instruction within a business rule. Language guidelines may include a dictionary of terms and their accepted meaning in the IC. The definition of terms relative to certain context(s) may also be provided (e.g., in billing versus in claim processing). Preparing the business requirements from pre-defined terms, may encourage the precise interpretation of each term, and therefore of each business requirement. Once a business rule has been configured, it may be stored in a database.

Additionally, an IC may conduct training for both the technical professionals (e.g., providers) and business professionals (e.g., users) to understand and use the dictionary and the syntax guidelines. The contents of the dictionary may be modified or edited. New terminology may be added. Existing terms included in the dictionary may be modified or deleted.

For example, in an embodiment, a business professional may edit contents of the dictionary in the course of preparing a new business rule.

Figure 7:
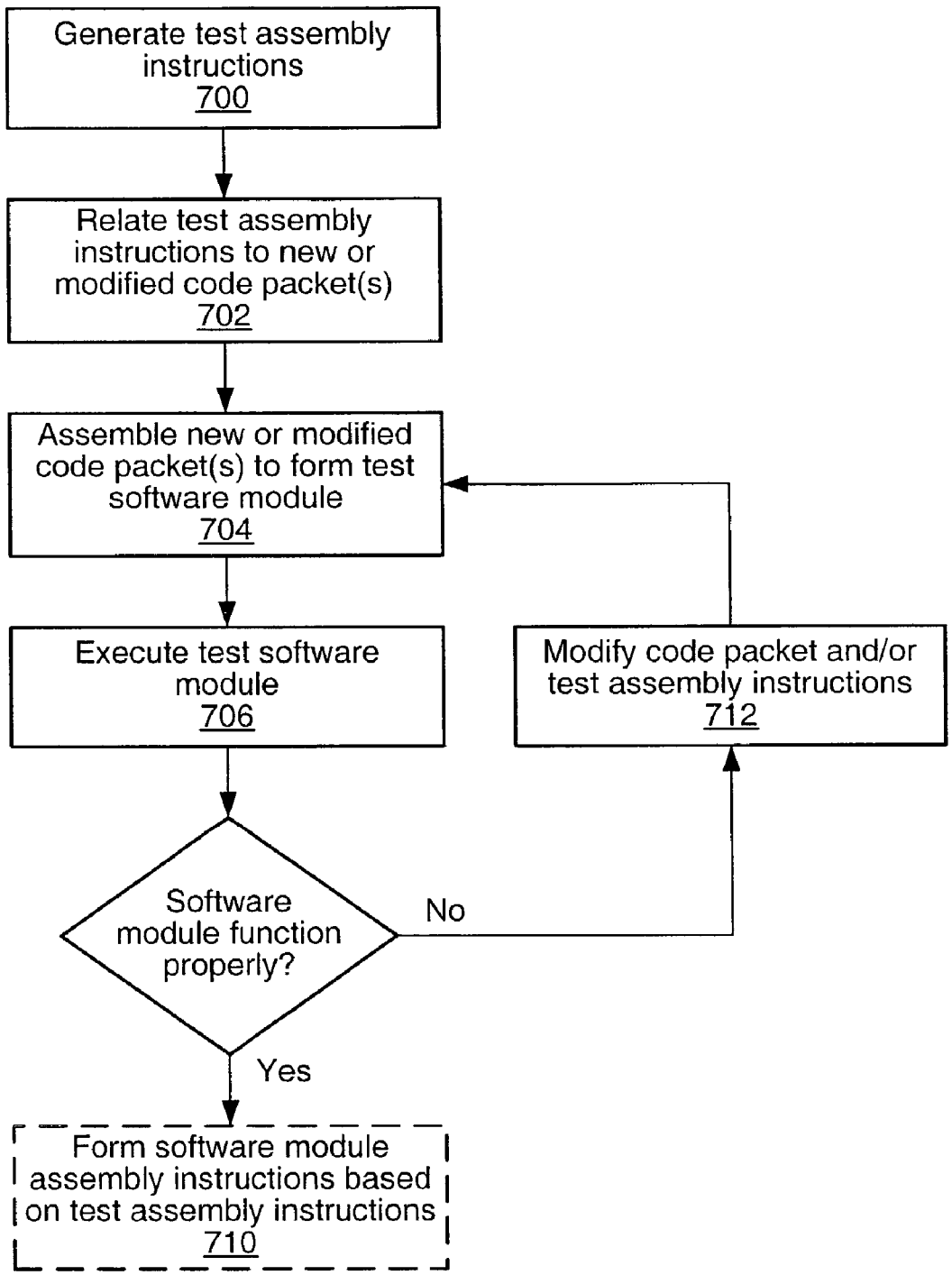
FIG. 7 is a flowchart illustrating a method for testing a new or modified code packet according to one embodiment.

FIG. 7 depicts an embodiment of a method of testing a new or modified code packet. As depicted in box 700, assembly instructions may be generated to form a test software module. The test software module may be configured to allow functionality of a new or modified code packet to be tested. For example, the test software module may include only code from the new or modified code packet and code necessary to support the function of the new or modified code packet.

The new or modified code packet may be related to the test assembly instructions, as shown in box 702. A test software module may be assembled as shown in box 704. The test software module may be assembled using the test assembly instructions. The test software module may be executed to test the functionality of the new or modified code packet and/or the test assembly instructions, as shown in box 706.

If the test software module fails to operate properly, the new or modified code packet being tested may be modified and/or the test assembly instructions may be modified, as shown in box 712. In some embodiments, if the test software module functions properly, the test assembly instructions may be used to form software module assembly instructions, as shown in box 710.

Figure 8:
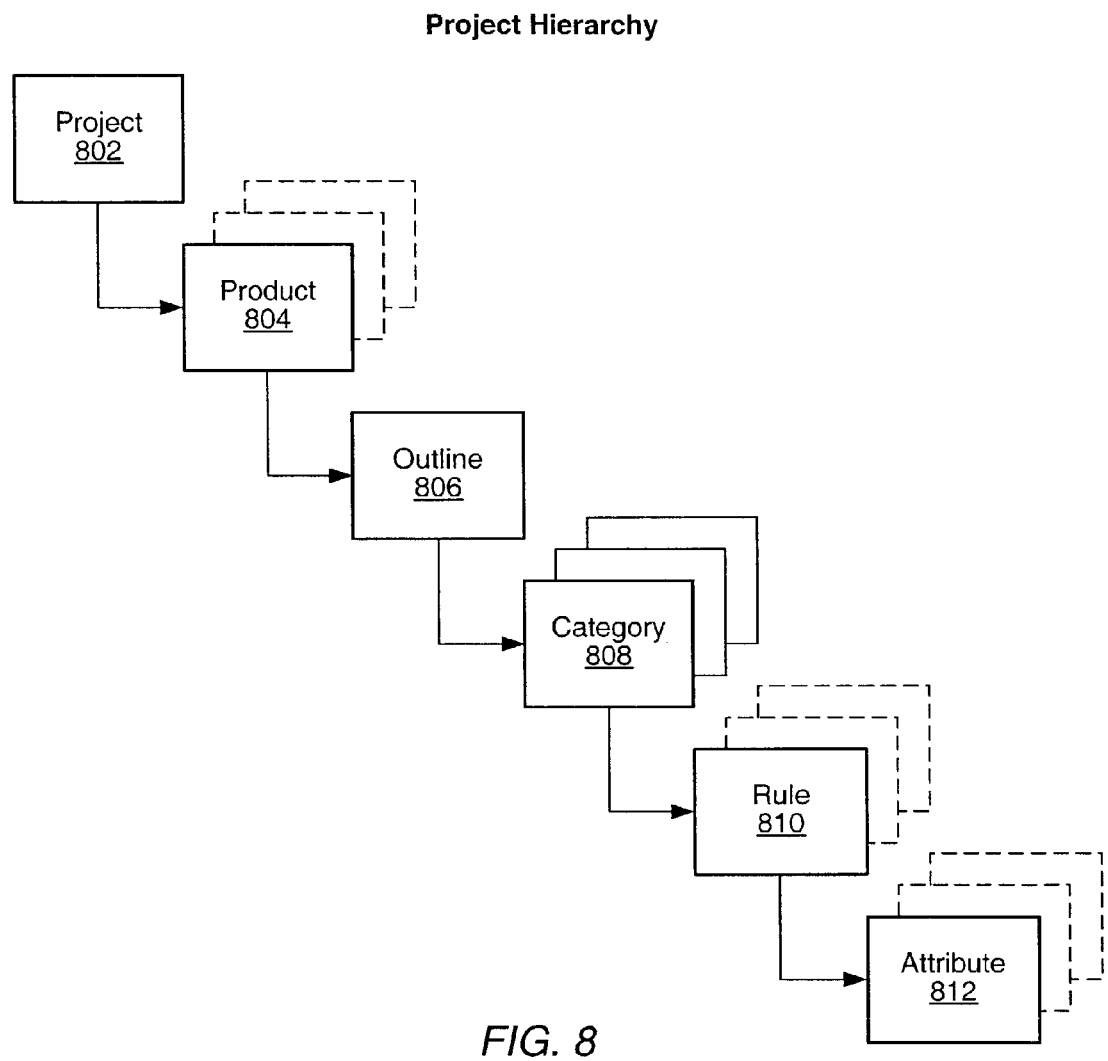
FIG. 8 illustrates the organization of a project hierarchy in a rule editor system according to one embodiment.

In an embodiment, business rules, business rule attributes, etc. may be arranged in a hierarchy. FIG. 8 depicts an exemplary embodiment of such a hierarchy. As depicted in FIG. 8, a project 802 may include one or more products 804 and related business rules 810 and/or attributes 812. Generally, one project may be associated with a particular update version of an insurance transaction processing program. Elements grouped under a project within a hierarchy may each be assigned a version code associated with the project. As such, when program code is generated for a software module associated with the product, only elements having appropriate version codes may be used to generate the program code.

Each product 804 may include a product outline 806. Outline 806 may provide a graphical view of a product. Outline 806 may be helpful to a user in understanding how portions of the product relate to one another and the status of each portion (e.g., complete, incomplete, etc.). Outline 806 may include one or more categories 808. A category may include a grouping of business rules within the hierarchy. Categories 808 may also include sub-categories (e.g., categories within other categories). Categories 808 may provide a way to sort and display business rules 810 associated with a particular product 804. For example, business rules 810 may be grouped according to function, location and/or another suitable grouping to aid a user in locating a desired business rule.

A category 808 may include different types of business rules 810. Types of business rules are described further below. Each business rule 810 may include one or more attributes 812. As used herein, an "attribute" refers to a specific value or variable associated with a business rule. For example, an attribute may include a name of a key that is required to access data in a data table. In another example, an attribute may include a variable whose value is to be supplied by the user via entry through a user interface. In yet another example, an attribute may include a variable whose value is determined via a calculation.

In an embodiment, a rules engine may be utilized to create and maintain business rules. A rules engine may include a number of parts, including, but not limited to: a repository of business requirements and their implementations (e.g., business rules, code packets, etc.); screens for entering, maintaining and/or combining business requirements; screens for entering, maintaining and/or relating business requirements to implementations; a process for constructing business logic based on combinations of business requirements; a process for generating impact analysis reports for determining the impact of a business requirement change; and a methodology for developing business logic using business rules.

In an embodiment, a product outline defines which rules are related to a product and thus to be included when program code is generated. As used herein, "generating" program code refers to forming assembly instructions for a software module. For example, generating a product may include producing a PCP code packet to act as an input file for the code assembler based on user configuration information. In an embodiment, if a particular rule is not attached to the product outline, it will not be generated in the PCP.

Figure 9:
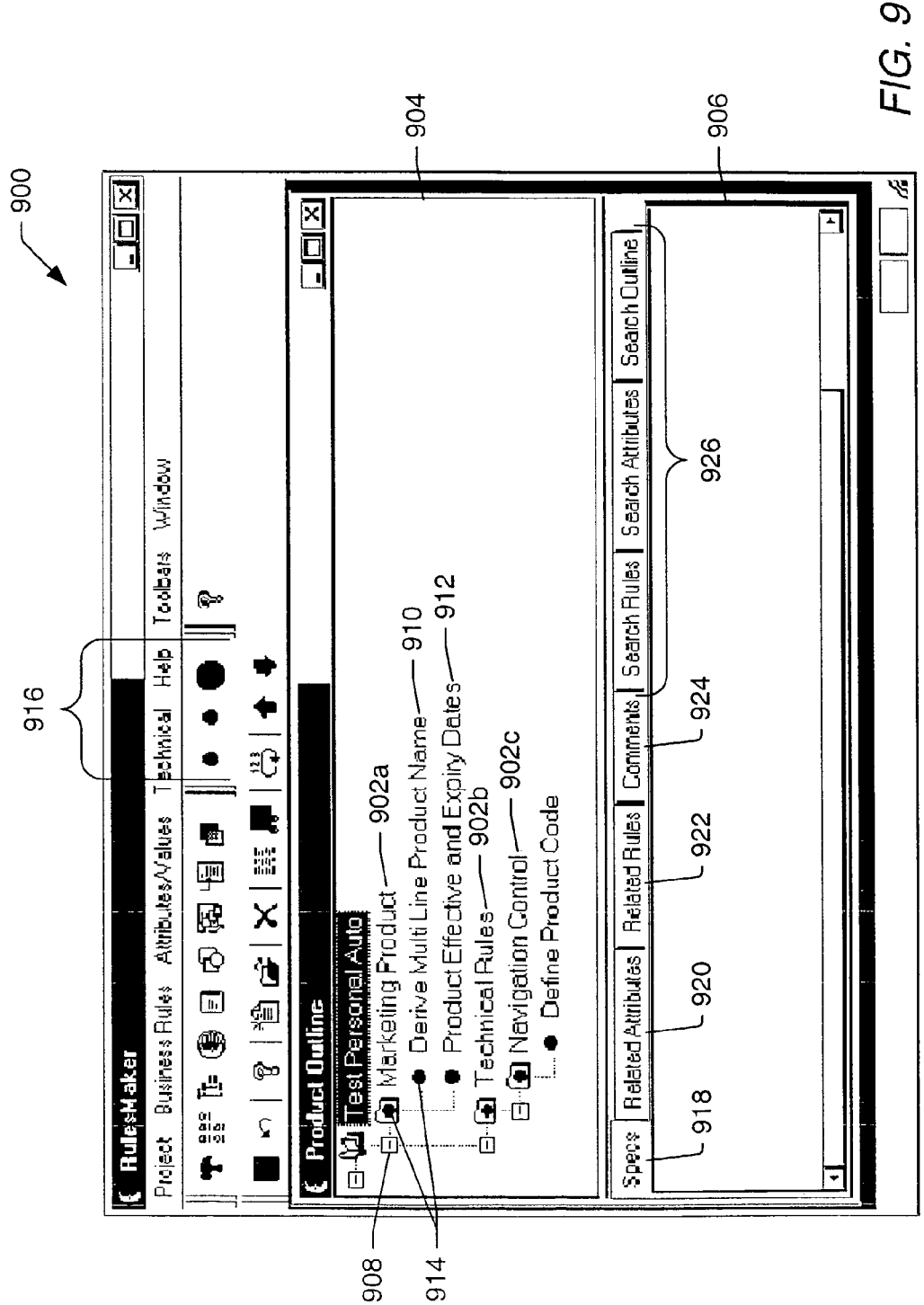
FIG. 9 depicts an example of a screen display that provides a product outline according to one embodiment.

In an embodiment, a rules engine may display all or part of the hierarchy of FIG. 8 in a product outline window 900, as depicted in FIG. 9. Business rules and technical rules within such a hierarchy may be grouped into categories (e.g., categories 902a, 902b, and 902c). Grouping rules into meaningful categories may make finding desired rules easier. The categories in the product outline may be user configurable. For example, categories may be added to, removed from and/or reorder within an outline using icons, pull down menus and/or drag and drop techniques. Likewise, rules may be added to, removed from and/or reordered within an outline or category using similar techniques. When the product outline is initially created one or more categories may be created automatically. For example, categories for marketing products and/or technical rules may be created automatically. Additionally, one or more categories and/or business rules may be mandatory (e.g., they may be required to remain as part of the outline). In an embodiment, designation of automatically created and/or mandatory portions of the product outline may be configurable.

Product outline window 900 may include an outline field 904 and a detail field 906. In an embodiment, outline field 904 may display the product outline as a series of expandable/collapsible category folders 902a, 902b, and 902c. A category folder may be expanded or collapsed by selecting a view selector button adjacent to the folder (e.g., minus box 908). One or more rules may be included under a category within the hierarchy (e.g., rule 910 and rule 912 within Marketing Product category folder 902a).

Figure 24:
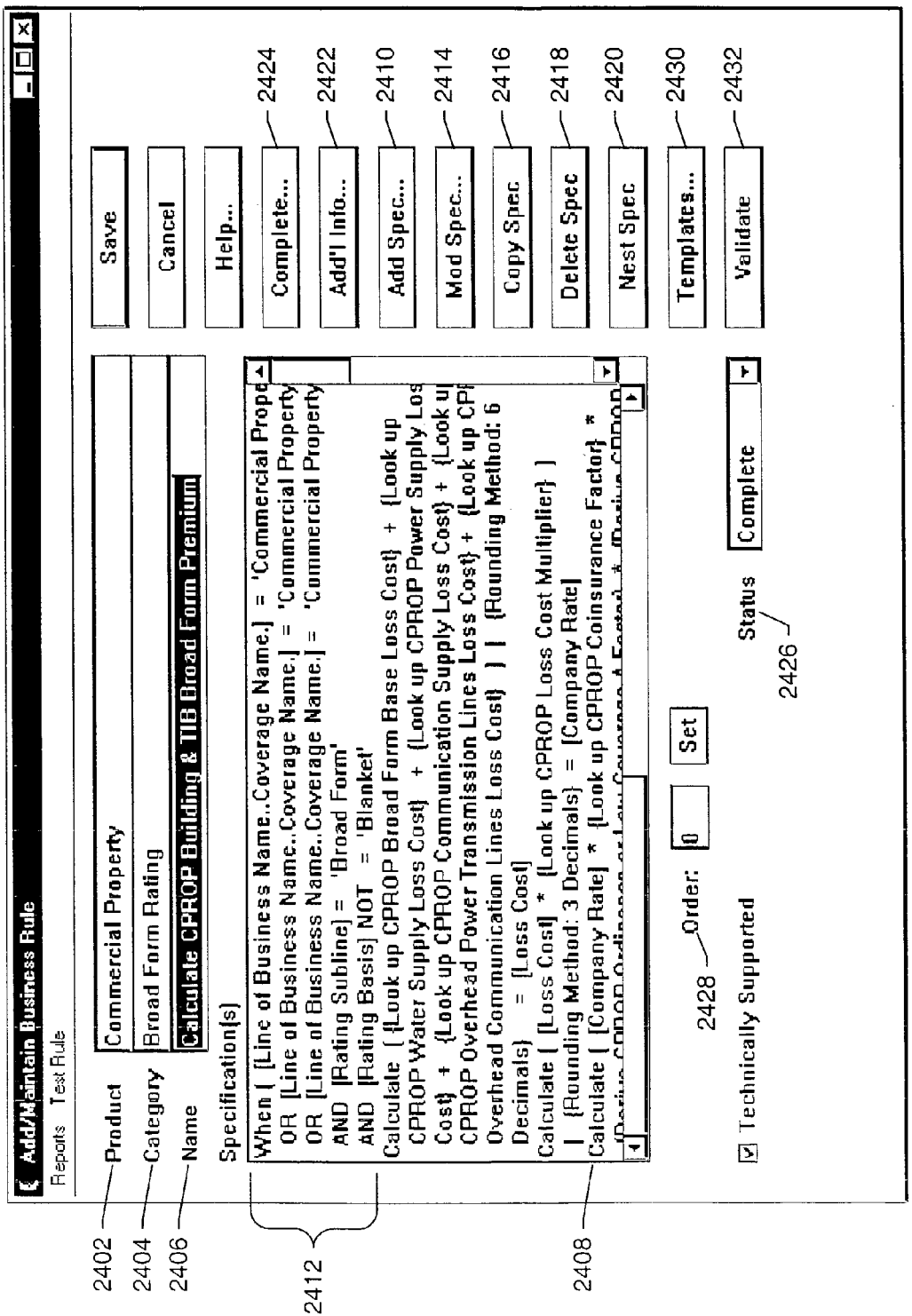
FIG. 24 depicts an example of a screen display for adding and/or maintaining a business rule according to one embodiment.

In an embodiment, a status indicator 914 may be associated with rules and/or categories of the product outline. The visual appearance of status indicator 914 may change to indicate the status of the associated outline element (e.g., category or rule). The status of an outline element may be changed by selecting a status field in a screen associated with the element (e.g., add/maintain business rule window 2400, as depicted in FIG. 24) and/or by a selection available in product outline window 900 (e.g., status icons 916 and/or a pull down menu). The status of an outline element may change depending on whether the element is ready to be included in a software module based on the product outline. Additionally, the status of an outline element may be changed depending on whether the element is desired in the software module. While a rule is being configured, the status of the business rule may be "incomplete." The status may be changed to "complete" when the business rule is ready to be included in a generated software module. However, if the user desires to omit a completed business rule from the software module, the status of the business rule may be changed to "incomplete." Alternately, a third status may be provided to indicate that the business rule is complete, but not to be included in a generated software module. Similarly, a status indicator associated with a category may be shown as complete if all of the rules within that category are complete. Category status may be updated automatically based on the status of the rules within the category. In an embodiment, category status may also be updated manually. For example, in such an embodiment, an entire category of business rules may be omitted from a generated product by manually changing the status of the category to indicate that it is not to be included in the software module.

Detail area 906 may include a plurality of tabs and a display area. Each tab may be associated with a type of information to be displayed in the display area. Thus, the tabs may be used to select data to be detailed regarding an outline elements selected in outline area 904. In various embodiments, the tabs may include, but are not limited to: a specs tab 918, a related attributes tab 920, a related rules tab 922, a comments tab 924, and/or one or more search tabs 926. Selecting specs tab 918 may cause specifications associated with a business rule selected in outline area 904 to be displayed in detail area 906. Similarly, selecting related attributes tab 920, related rules tab 922 or comments tab 924 may cause attributes, rules or comments, respectively, associated with a business rule selected in outline area 904 to be displayed in detail area 906.

Figure 10:
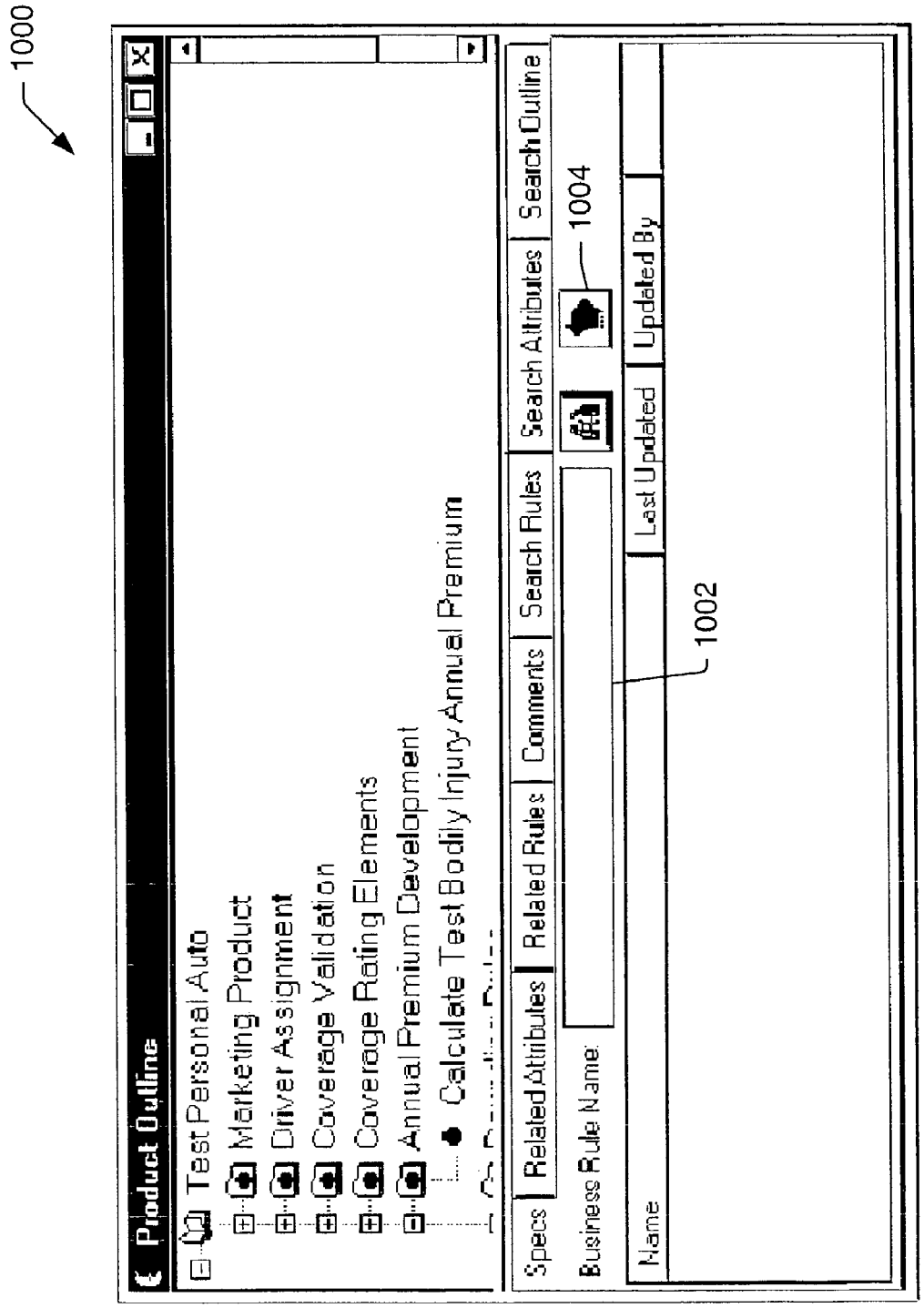
FIG. 10 depicts an example of a screen display including a search function of a product outline according to one embodiment.

Search tabs 926 may allow a user to search the product outline and/or a repository for specified terms. As depicted in FIG. 10, when a search tab is selected, a search term field 1002 may be displayed in details field 906. A user may enter a search term in search term field 1002 to initiate a search for the term. A search tab may allow a user to specify whether a search term is to be sought within attributes, categories, business rules, or some other type of product element (e.g., comment). Alternately, separate search tabs may be provided for attributes, categories, business rules, and/or other types of product elements (e.g., comments).

Besides a search field, other options may be added to details field 906 when a search tab is selected. For example, a browse button may be provided. Additionally, a relate button 1004 may be provided. Relate button 1004 may allow a user to relate a rule or attribute identified in details field 906 to a rule in outline area 904. For example, the user may highlight a rule in outline area 904. The user may then select a rule or attribute in detail area 906 and select relate button 1004.

Rules, attributes, specifications, etc. may be viewed and/or modified via a series of windows accessible from the product outline window 900, as well as other windows. For example, a business rule to be viewed may be highlighted in outline area 904. Details regarding the highlighted business rule may be viewed in detail area 906. To modify a business rule, the user may select a "maintain rule" option in a pull down menu or double-click the business rule. Either technique may open an add/maintain rule window 2400 related to the selected business rule. Similarly, the user may access a maintain attributes window related to a selected attribute and/or specification window related to a selected specification via a pull down menu or double click method.

Figure 11:
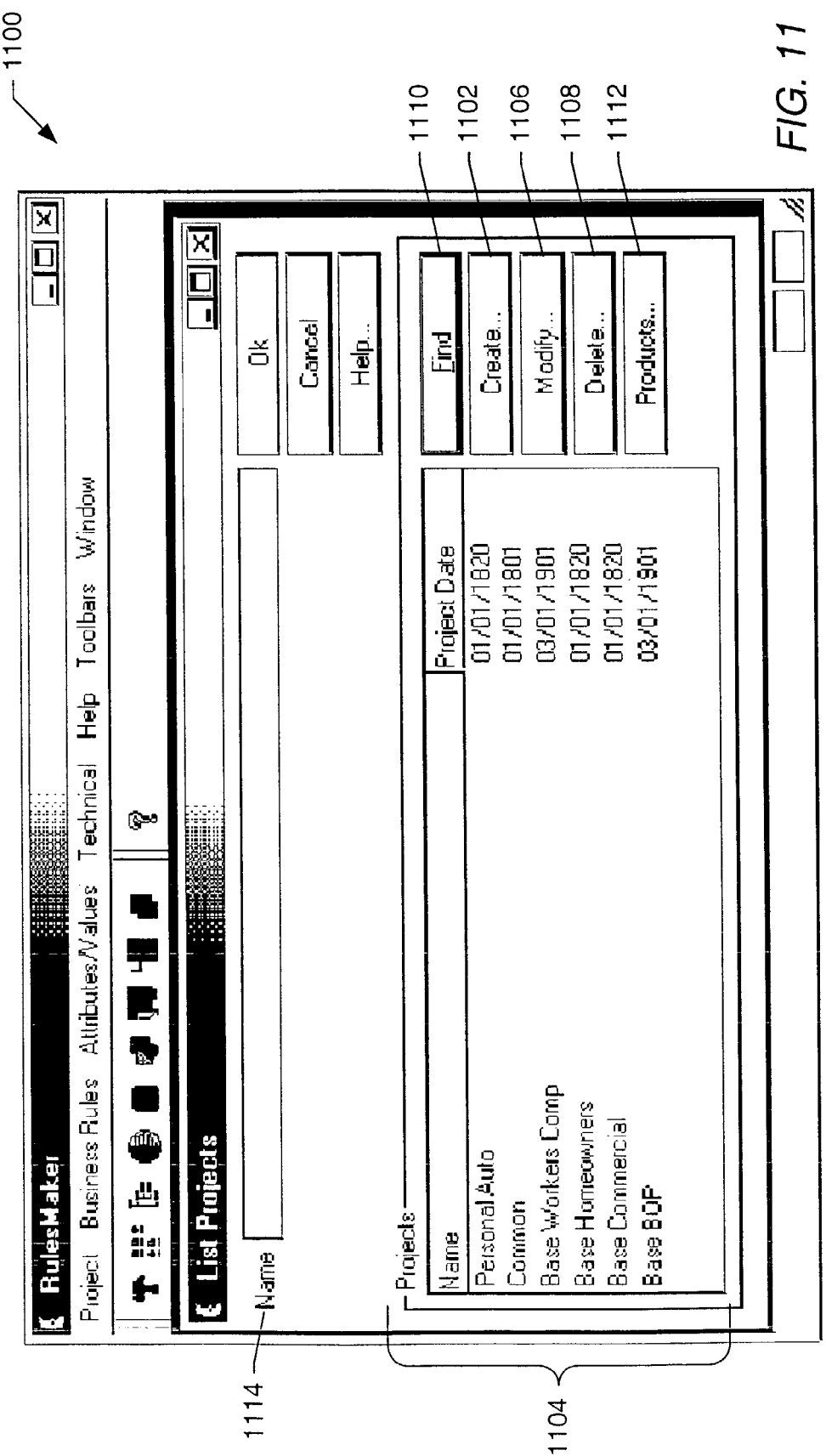
FIG. 11 depicts an example of a screen display listing projects in a rule editor system according to one embodiment.

To access the rules engine a user may be required to log on (e.g., provide a recognized user identification and password). At startup, the rules engine may display a list projects window, as depicted in FIG. 11. The list projects window may provide the user with a list of current projects. The user may view and/or modify existing projects via the list projects window. Additionally, the user may create and/or delete projects. The list projects window may include a plurality of icons and/or pull down menus that allow the user to access various commands and/or functions.

Figure 12:
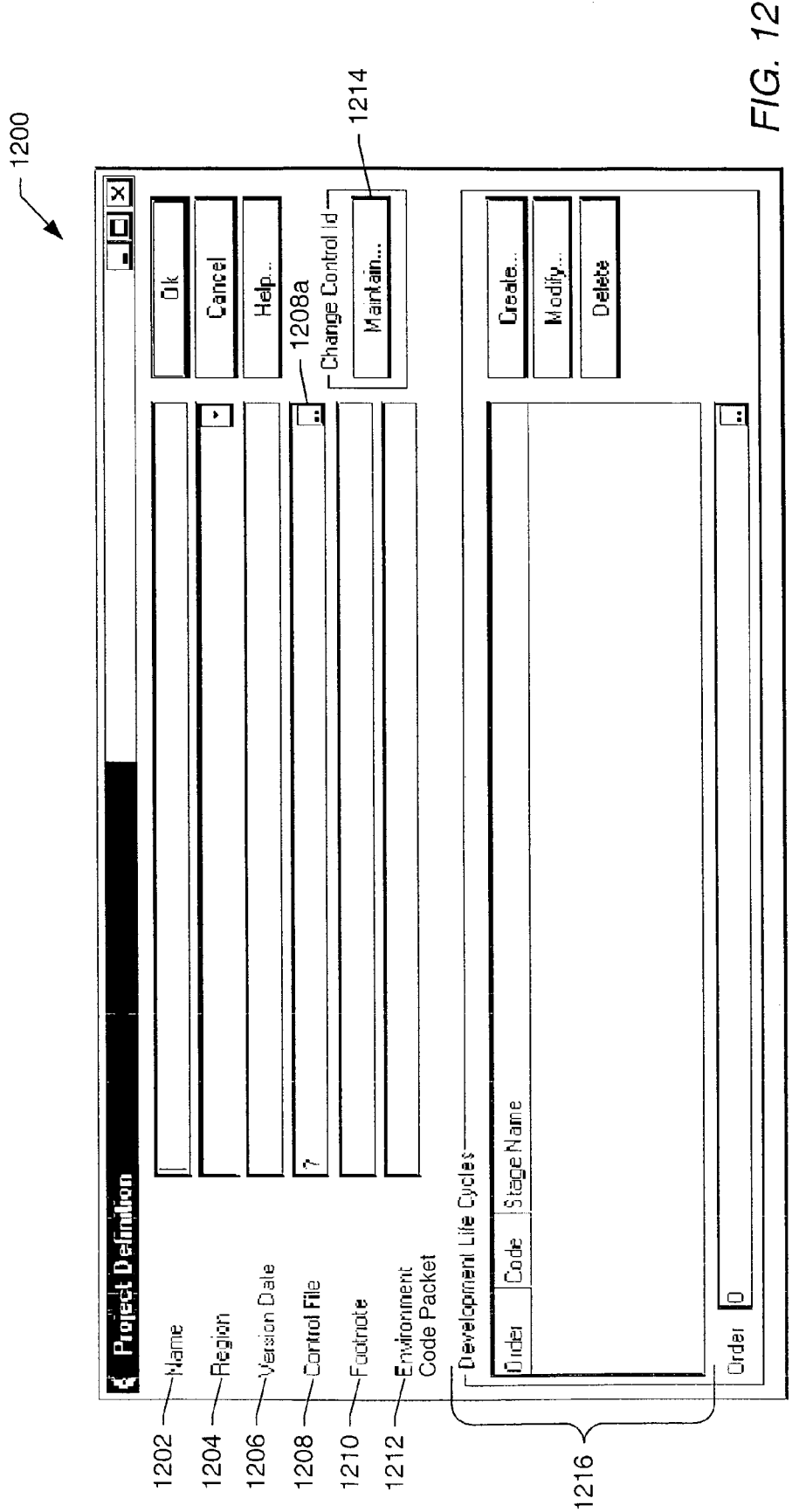
FIG. 12 depicts an example of a screen display for defining a project according to one embodiment.

To create a new project a user may select Create button 1102 in the list projects window 1100. A Project Definition window 1200 may be displayed, as depicted in FIG. 12. Project definition window 1200 may capture information for creating a project. For example, input fields on project definition window 1200 may include, but are not limited to: name field 1202, region field 1204, version date field 1206, control field 1208, footnote field 1210, and environment/configuration code packet id field 1212. Name field 1202 may be used to enter a descriptive name for the project. In some embodiments, the project name may be a unique identifier for the project. Region field 1204 may be used to indicate a region (e.g., location) to which the project applies. For example, the project may be applicable to one or more clients, a geographic area and/or global (e.g., all locations for a client, or all locations for all clients).

Version date field 1206 may be used to enter the target completion date of the project. The target completion date may be used to sequence the changes within the timelines across projects. Version date 1206 may control when certain rules are available for use. For example, in an embodiment, a business rule added to a repository of business rules may be associated with a project. The business rule added to the repository may include the version date and/or a version code of the project. In such a case, the business rule may be available for use by another project if the other project has a version date the same as or after the version date associated with the business rule.

Control file field 1208 may be used to provide all or part of the file path for a location to which code generation and/or assembly reports should be saved. In an embodiment, if the full file path is not known, the user may search for the file by selecting browse button 1208*a*. If the user finds the file, the file path may be automatically populated into control file field 1208.

Footnote field 1210 may be used to enter a footnote that is to be printed at the bottom of each page of reports associated with the project. For example, the company name and/or version information may be added.

Environment/configuration code packet ID field 1212 may be used to identify an environment/configuration code packet to be used in generating code for the project. During code generation, environment/configuration code packet ID field 1212 may be used to define the environment/configuration code packet for the SPC.

Figure 13:
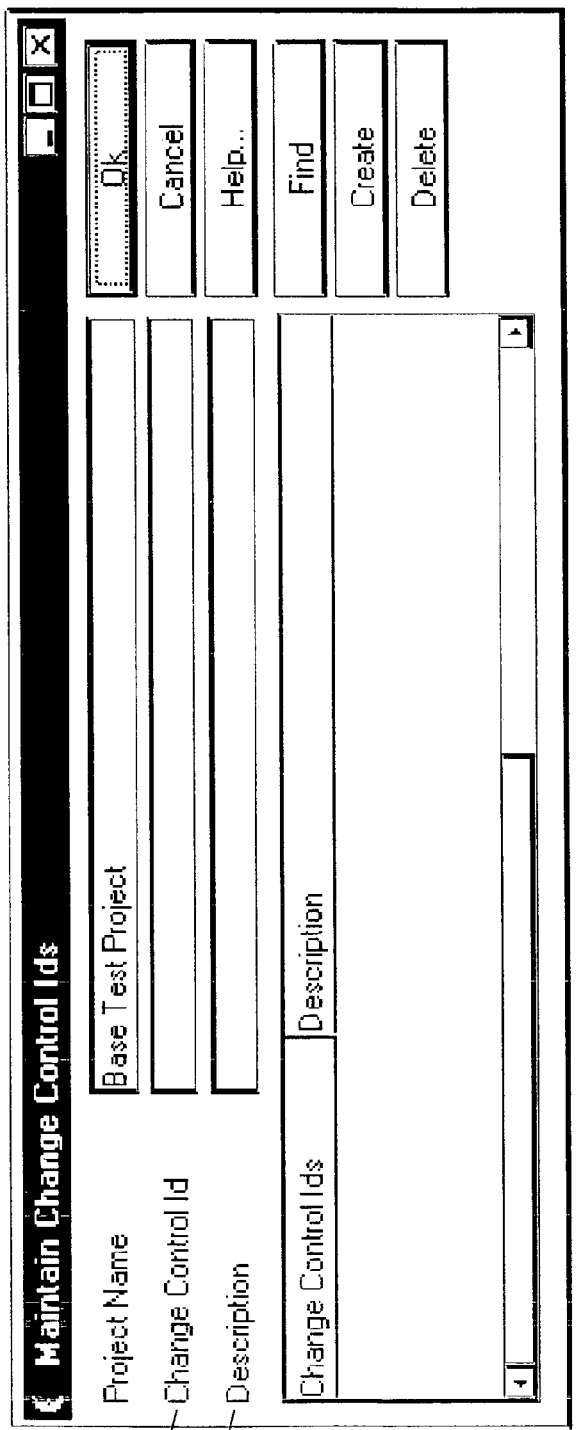
FIG. 13 depicts an example of a screen display for maintaining change control identifications according to one embodiment.

In an embodiment, after completing project definition window 1200, a change control ID may be added to the project. In such an embodiment, the user's particular version of the project may be unique. The change control ID may identify the unique version of the project. In an embodiment, the change control ID may be added automatically by the system (e.g., upon saving changes in project definition window 1200). In an alternate embodiment, a change control ID may be manually added by the user. In such an embodiment, the user may select maintain button 1214. A maintain change control Id window 1300 may be displayed, as depicted in FIG. 13. The user may enter a change control ID number in change control ID field 1302. The user may also enter a description of the project version in description field 1304.

Figure 14:
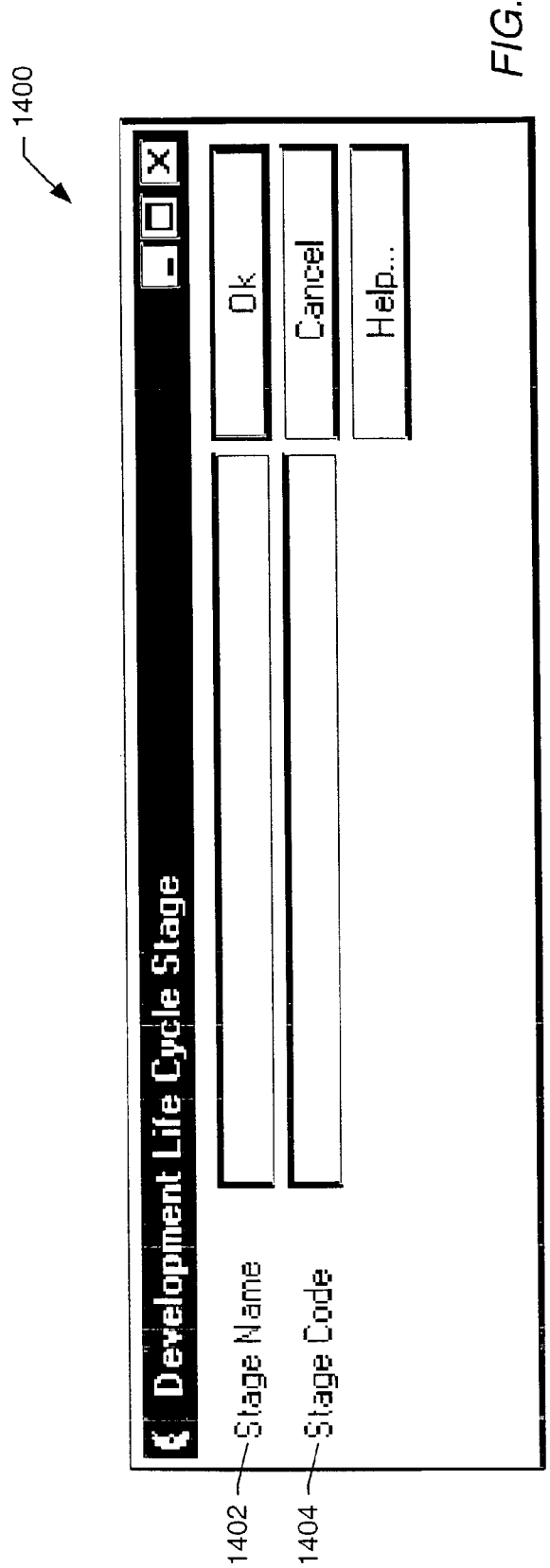
FIG. 14 depicts an example of a screen display for assigning a development life cycle in a rule editor system according to one embodiment.

Development life cycle area 1216 includes a display of development life cycle stages defined for a project. Development life cycle stages may include, but are not limited to: "Development", "System Test" and "Production". In an embodiment, once a record has been marked as in use (e.g., with a development life cycle stage of "Production") it may be inhibited from being deleted. In an embodiment, development life cycle stages may be user definable. For example, a development life cycle window 1400 may be provided, as depicted in FIG. 14. Development life cycle window 1400 may include stage name field 1402 and stage code field 1404.

Referring back to FIG. 11, once a new project has been defined, list projects window 1100 may be updated to include the newly defined project in a listing of projects in project area 1104.

In an embodiment, data defining a project may be subsequently changed. In such an embodiment, all of the previously described fields used to define a project may be available for modification. In an alternate embodiment, one or more fields may not be available for modification after the project is saved. For example, the region and/or version date may not be available for modification after the project is initially defined. To modify an existing project, the user may select the project in project area 1104 and select the modify button 1106. The project definition window associated with the selected project may be opened, allowing the user to modify one or more fields. Similarly, if the user desires to delete an existing project, the user may select the project in project area 1104 and select delete button 1108.

To search for an existing project the user may utilize a search feature. In an embodiment, one or more windows in a rules engine user interface may include a name field (e.g., name field 1114) and a find button (e.g., find button 1110). In such embodiments, the user may enter a search term, such as all or part of a name, in the name field and select the find button to initiate a search based on the search term.

Figure 15:
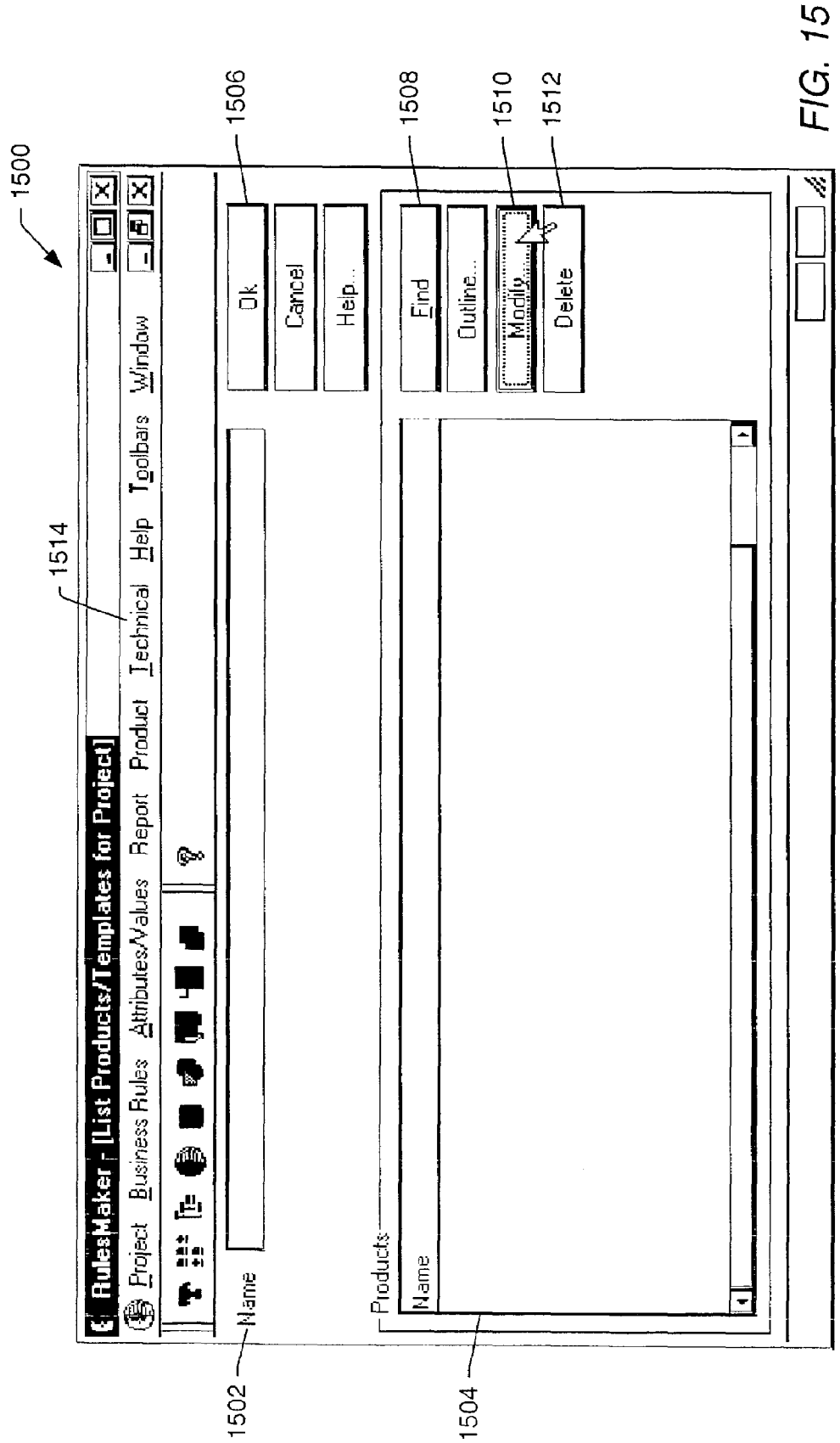
FIG. 15 depicts an example of a screen display that provides a list of products associated with a project according to one embodiment.

In an embodiment, once a project has been created, an associated product may be defined. To create a product associated with a project, the project may be selected in project area 1104. Product button 1112 may be selected. Selecting product button 1112 may bring up a list products window 1500, as depicted in FIG. 15. List products window 1500 may include a name field 1502 and a products area 1504. Products area 1504 may include a listing of all products associated with the selected project.

Figure 17:
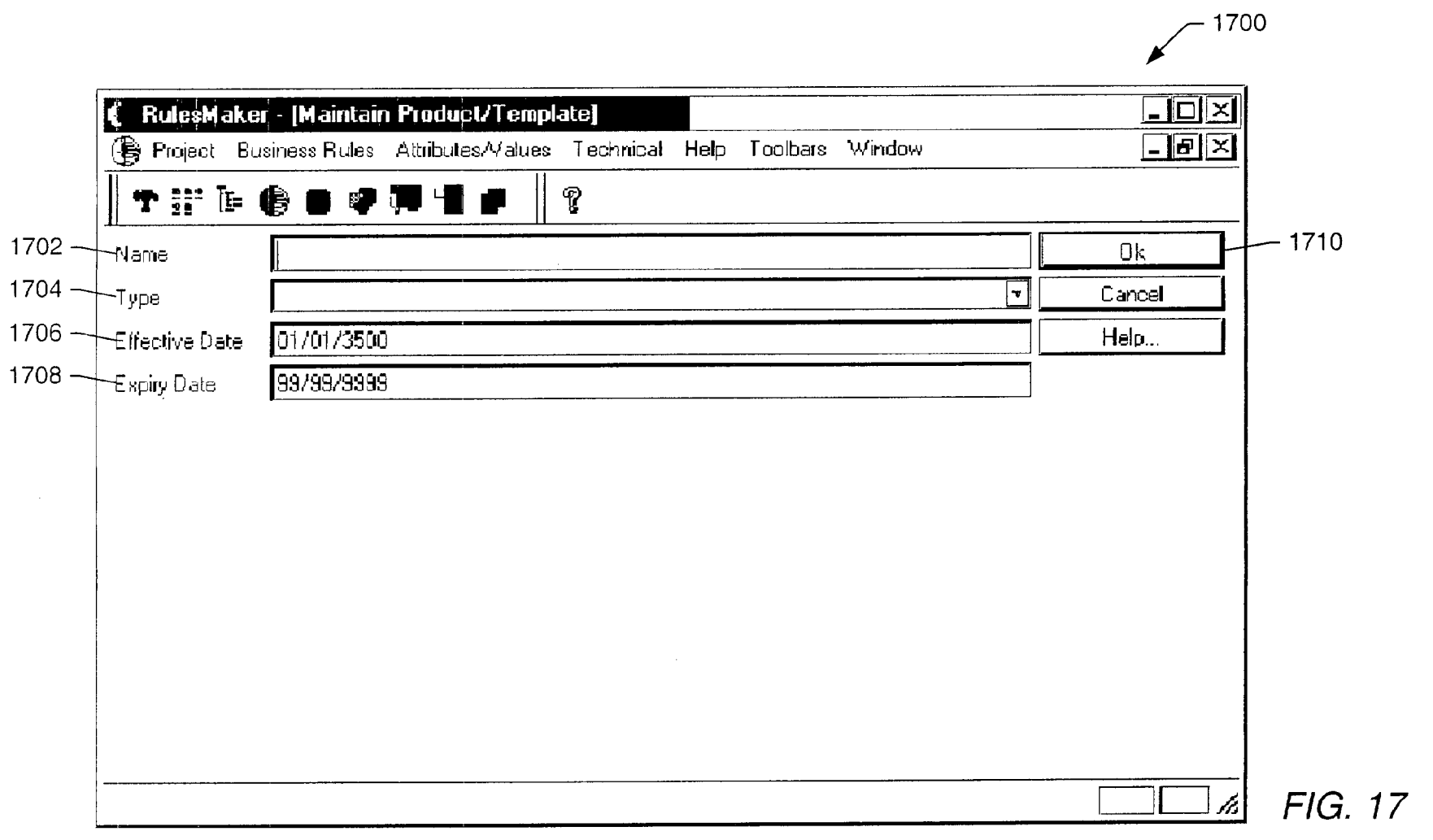

In an embodiment, the user may select modify button 1510 to create a new product. Selecting modify button 1510 may bring up a maintain products window, as depicted in FIG. 17.

Figure 16:
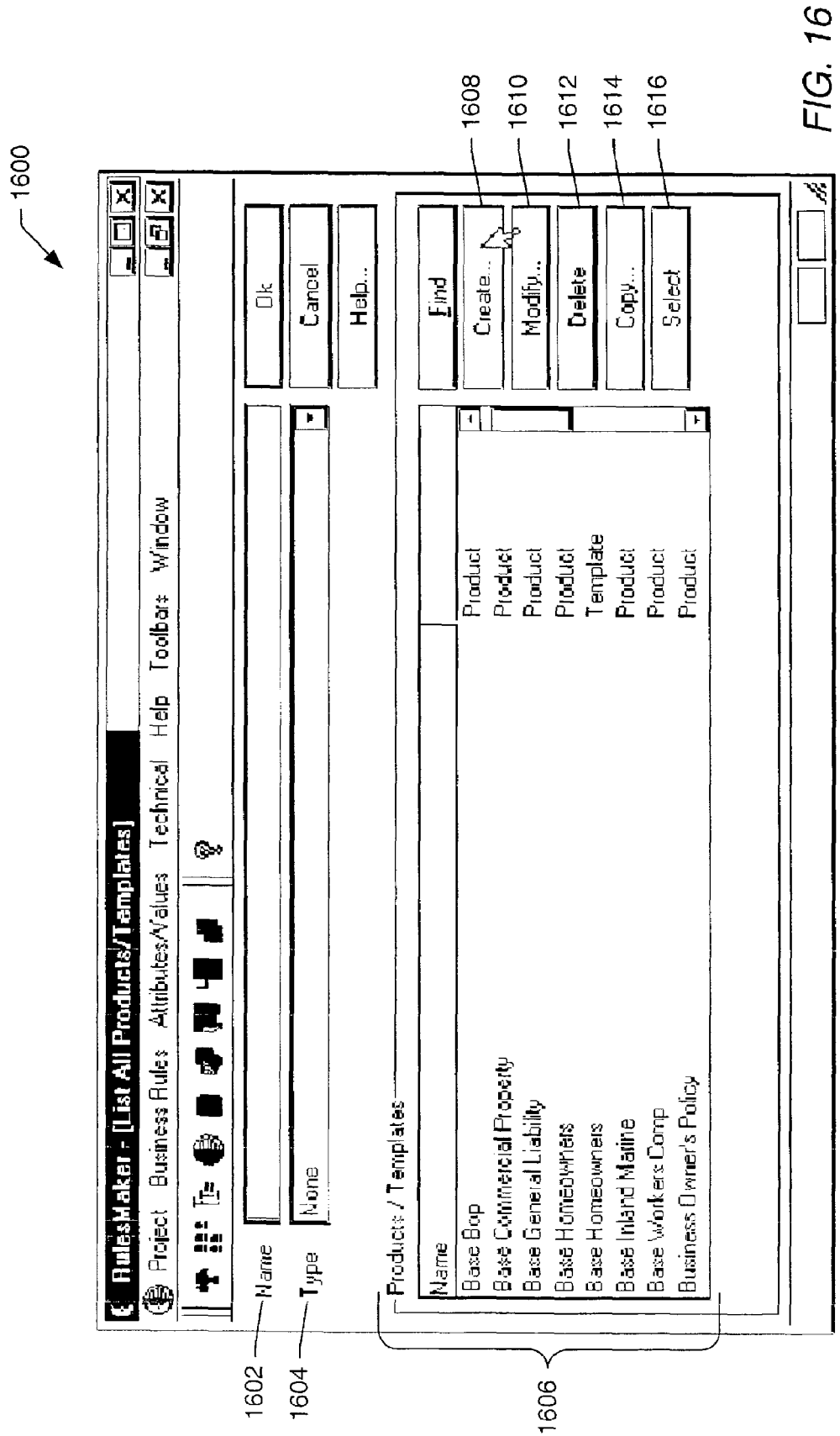
FIG. 16 depicts an example of a screen display that lists available products in a rule editor system according to one embodiment.

A list all products window 1600, as depicted in FIG. 16, may include name field 1602, type field 1604 and product area 1606. Product area 1606 may include a list of all products available within the rules engine. To create a new product, create button 1608 may be selected. Selecting create button 1608 may bring up maintain product window 1700, as depicted in FIG. 17.

Maintain product window 1700 may include name field 1702, type field 1704, effective date field 1706 and expiry field 1708. The product name, type, effective date, and expiration date may be entered into the corresponding fields. OK button 1710 may be selected to save the product described by the entered information.

The user may also reach maintain product window 1700 by selecting modify button 1510 or modify button 1610 window 1500 or 1600, respectively. In either case, maintain product window 1700 may be displayed with information from a selected product already proved. The user may then modify one or more input fields. Similarly, the user may delete a product by selecting the product in product area 1606 and selecting corresponding delete button 1612.

In an embodiment, the user may reuse an existing product by selecting the product to be reused in product area 1606 of list all products window 1600. The user may select copy button 1614. Maintain products window 1700 may be displayed. The user may provide a new name for the copied product an/or other appropriate information (e.g., type, etc.).

In an embodiment, the user may save the changes made by selecting a "Save all pending modification" option from the project pull down menu. Alternately, the user may be given the opportunity to save or cancel pending changes upon closing the program, or at any point after making a modification.

One or more business rules may be developed using data definitions (e.g., terms from a list of terms). Business rules may include declarative statements which lead to one answer. Business rules may contain data called attributes. Attributes include placeholders for specific values that may be operator entered, looked up or calculated. As used herein, attributes are designated by brackets [ ]. For example, the following business rule includes three attributes (i.e., base rate, territorial multiplier, and liability base premium):

[Base Rate]*[Territorial Multiplier]=[Liability Base Premium]

Business rules may also refer to other business rules. As used herein, a business rule referred to in another business rule is designated by braces { } enclosing the referenced business rule's name. For example, in the following business rule the term "Look up PAUTO Liability Base Rate" is a business rule name.

{Look up PAUTO Liability Base Rate}*[Territorial Multiplier]=[Liability Base Premium]

Business rules contain business rule specifications. Several types of specifications may include, but are not limited to: additional information specifications, conditional specifications, simple specifications, data table reference specifications, variable specifications, and algorithm specifications.

Additional information specifications may provide extra details regarding the intent of all or part of a business rule. For example, such information may include comments attached to the rule. In an embodiment, additional information specifications may not effect how a business rule functions.

Conditional specifications include a condition that, if met invokes the next business rule specification. In an embodiment, a conditional specification may include a typical conditional phrasing, such as, but not limited to: "When . . . ," "If . . . , then . . . ," "While . . . ," etc. Specifications associated with a conditional specification may execute when the condition is met.

Conditional specifications may include logic, mathematics and/or Boolean operators. For example, operators such as, but not limited to: AND, OR, NOT, etc. may be used in conditional specifications. Such operators may allow a plurality of conditions to be linked. Additionally, terms in the condition may also be mathematically related to one another within a conditional specification. For example, a condition may include an equality or an inequality.

A simple specification may include a statement of some action that is to occur. If the simple specification is used to determine something, usually the specification may be worded so that the element being determined is the last thing listed in the specification. A simple specification may describe an action that is to occur. For example, a simple specification may be used to assign a value to an attribute, such as in the specification:

[SDIP Class] must be '1B'

In another example, a simple specification may be used to assign a data table key to an attribute, such as in the specification:

The [CABSTD Table ID] to use must be 'U4M0R02'

In another example, a simple specification may be used to define a method of deriving a value of an attribute, such as in the specification:

[Coverage] [Vehicle Type] and [Rating Territory] must be used to determine [Basic Limits Base Premium].

A data table reference specification may be used to direct a look up from a data table file or data table. As used herein, a data table may refer to any file or set of files used for storage of data, including, but not limited to: a relational database, an object-oriented database, a text file, etc. In an embodiment, the rules engine may automatically create the wording of a data table reference specification based on the input and output attributes attached to a rule.

In an embodiment, a data table reference specification may include one or more attributes that act as data table keys. For example, an insurance transaction processing program may be hosted centrally and accessed by more than one company, or more than one division or region of a company. In such cases, a company identifier attribute and/or location attribute may act as a data table key. In an additional example, a data table entry may include an effective date range. In such a case, one or more data attributes may act as data table keys in the data table reference specification.

A variable specification may enable creation of attribute sets that allow definition of variable sets. These variable sets may act as placeholders that may be replaced with values defined by a user. This functionality may allow the specification to be used in different business rules where one or more variables in the specification may have more than one allowable value. For example, consider the following variable business rule and associated allowable values table:

For vehicle type [Vehicle Type] the vehicle must be rated as [Vehicle Class] vehicle.

| Vehicle Type | Vehicle Class |
|---|---|
| AU (Private Passenger Auto) | Standard |
| PU (Pickup) | Standard |
| VN (Van) | Standard |
| MC (Motorcycle) | Miscellaneous |

This business rule defines the [Vehicle Type|Vehicle class] attribute set. Individually, the vehicle class attribute and the vehicle type attribute may have many allowable values. However, by defining the vehicle type|vehicle class attribute, the set of allowable values may be limited for each individual attribute, when the attributes are referenced together (e.g., as a attribute set). For example, if a conditional rule were configured that depended on both vehicle class and vehicle type, rather than nesting the conditions, a single condition directed to the attribute set may be configured. Such an arrangement may speed processing time of the conditional specification. Additionally, in some embodiments, attribute sets may limit the amount of data copied into assembled code by limiting the number of allowable values for the attributes in the attribute set.

Algorithm specifications may be used to perform calculations. In an embodiment, algorithm specifications may begin with "Calculate . . . ". Generally, algorithm specifications may be used in calculate type business rules. A business rule may contain a plurality of algorithm specifications. Algorithm specifications may include a combination of business rules, attributes, constants and mathematical operators to perform a calculation.

Figure 18:
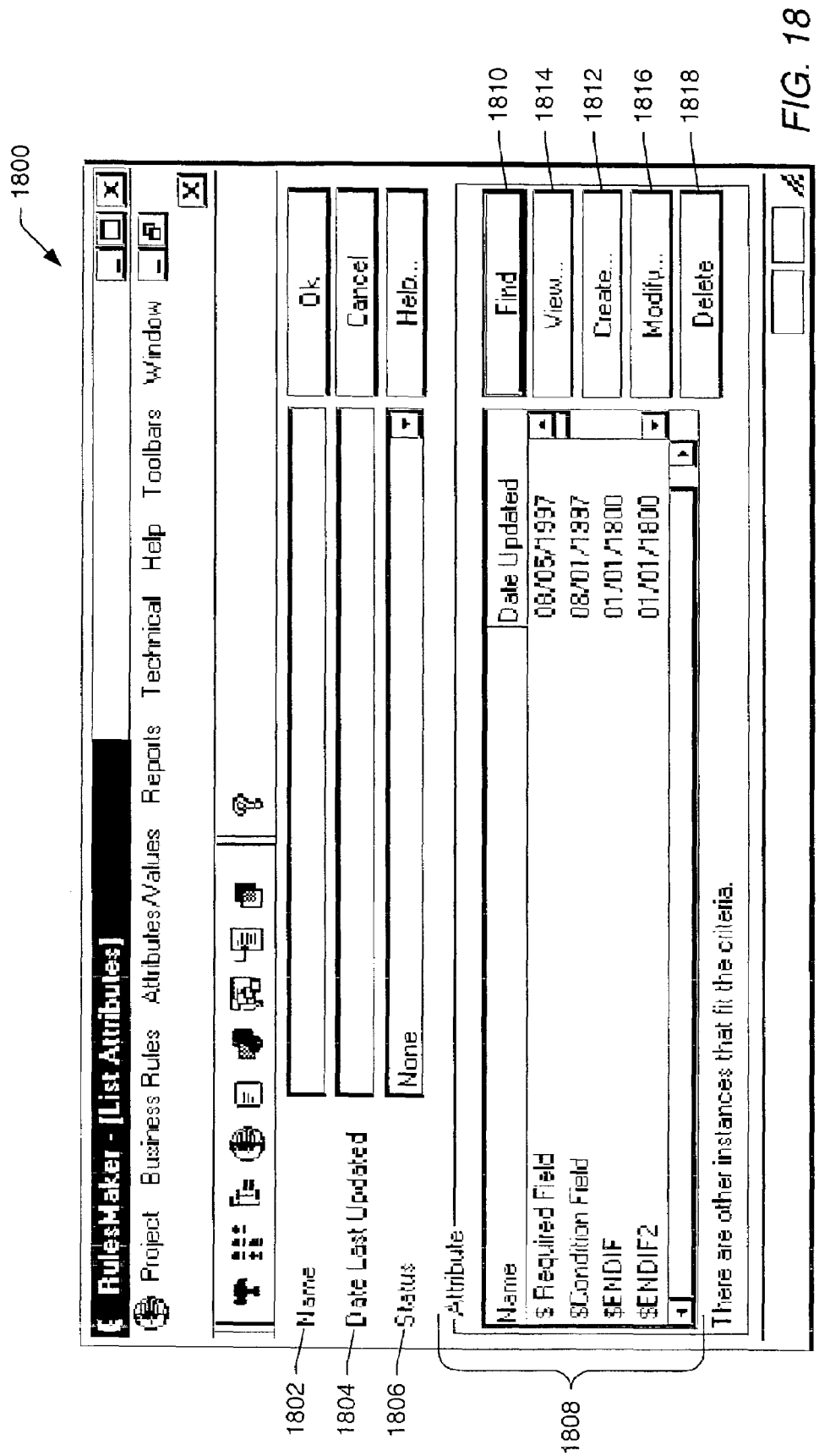
FIG. 18 depicts an example of a screen display that lists available attributes in a rule editor system according to one embodiment.

In an established rule editor, many attributes may be defined and available in a repository. Before a user adds a new attribute, the user may search the repository to see if the attribute already exists. If a match is found, details regarding the definition of the attribute and the available values of that attribute may be reviewed to determine whether the attribute meets the user's needs. If the attribute does not meet the user's needs, a new attribute may be added. For example, in an embodiment, a user may access a list attributes window 1800, as depicted in FIG. 18, by selecting an attributes and values option in list products window 1500.

List attributes window 1800 may include a name field 1802. Additionally, list attributes window 1800 may include a date field 1804, a status field 1806 and an attributes area 1808. Attributes area 1808 may list available attributes meeting specified criteria. For example, a user may enter all or part of an attribute name in name field 1802 and select search button 1810. Attributes matching the search criteria may be displayed in attributes area 1808. Date field 1804 and/or status field 1806 may also be used to specify search criteria.

Figure 19:
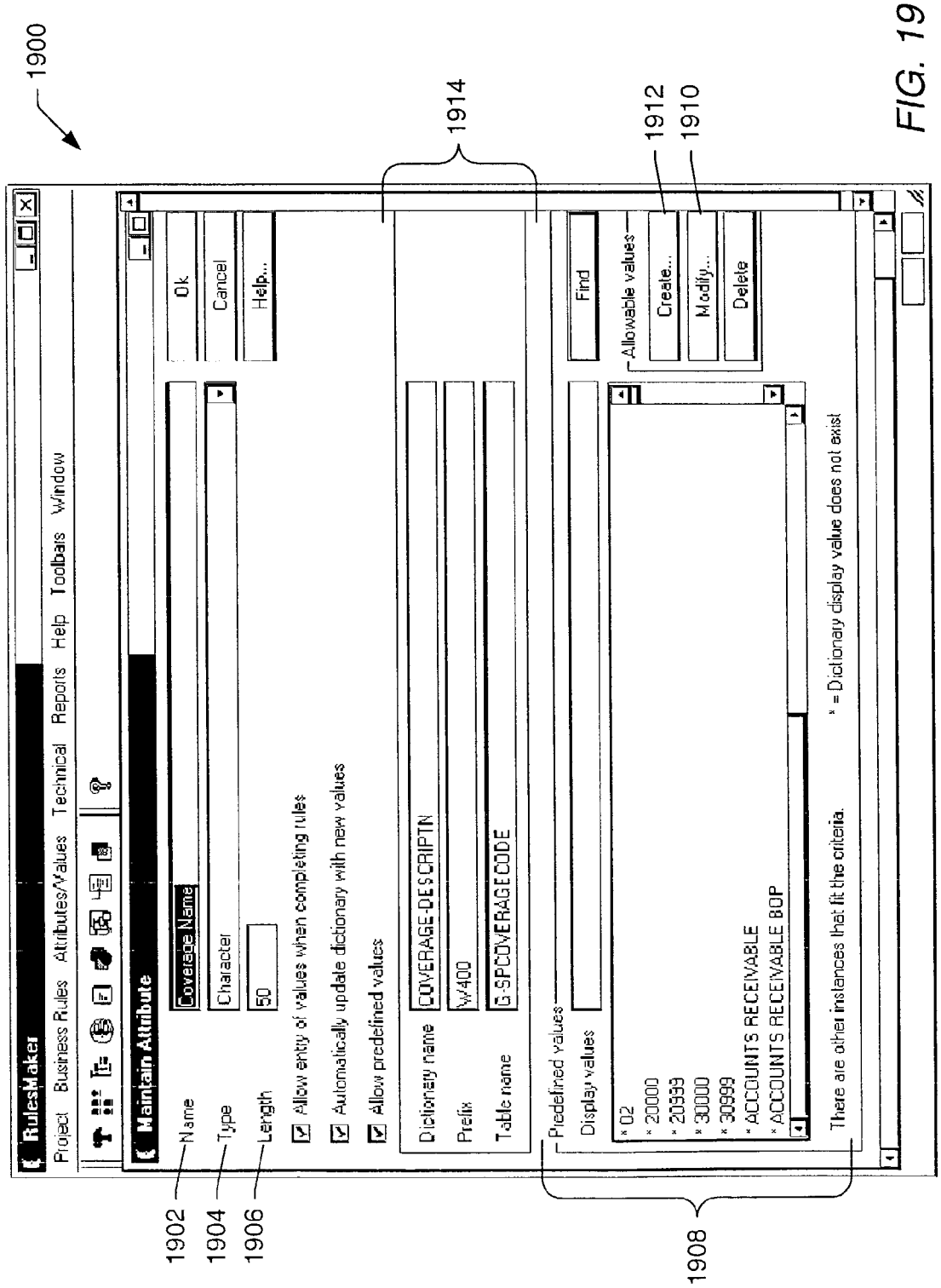
FIG. 19 depicts an example of a screen display for maintaining an attribute in a rule editor system according to one embodiment.

To view details of an attribute, the attribute may be selected in attribute area 1808 and view button 1814 or modify button 1816 may be selected. View button 1814 may allow a user to view the details of the attribute, but not modify the attribute. Modify button 1816 may allow the user to both view and modify the details of the attribute. Selecting create button 1812, view button 1814 or modify button 1816 may bring up maintain attribute window 1900, as depicted in FIG. 19.

Maintain attribute window 1900 may include a name field 1902, a type field 1904 and a length field 1906. If the user has accessed maintain attributes window 1900 by selecting an attribute to view or modify, name field 1902, a type field 1904 and a length field 1906 may include information related to the selected attribute. If the user has accessed maintain attributes window 1900 by selecting create button 1812, name field 1902, a type field 1904 and a length field 1906 may be empty and available for entry of appropriate information. Type field 1904 may include a designation of the attribute type. Attribute types may include, but are not limited to: date, numeric, alphanumeric, etc. Length field 1904 may designate a maximum number of characters allowed for values assigned to the attribute. In an embodiment, numeric attributes may include more than one length designation. A first length designation may define a maximum number of characters to the left of the decimal point. A second length designation may define a maximum number of characters to the right of the decimal point.

Figure 20:
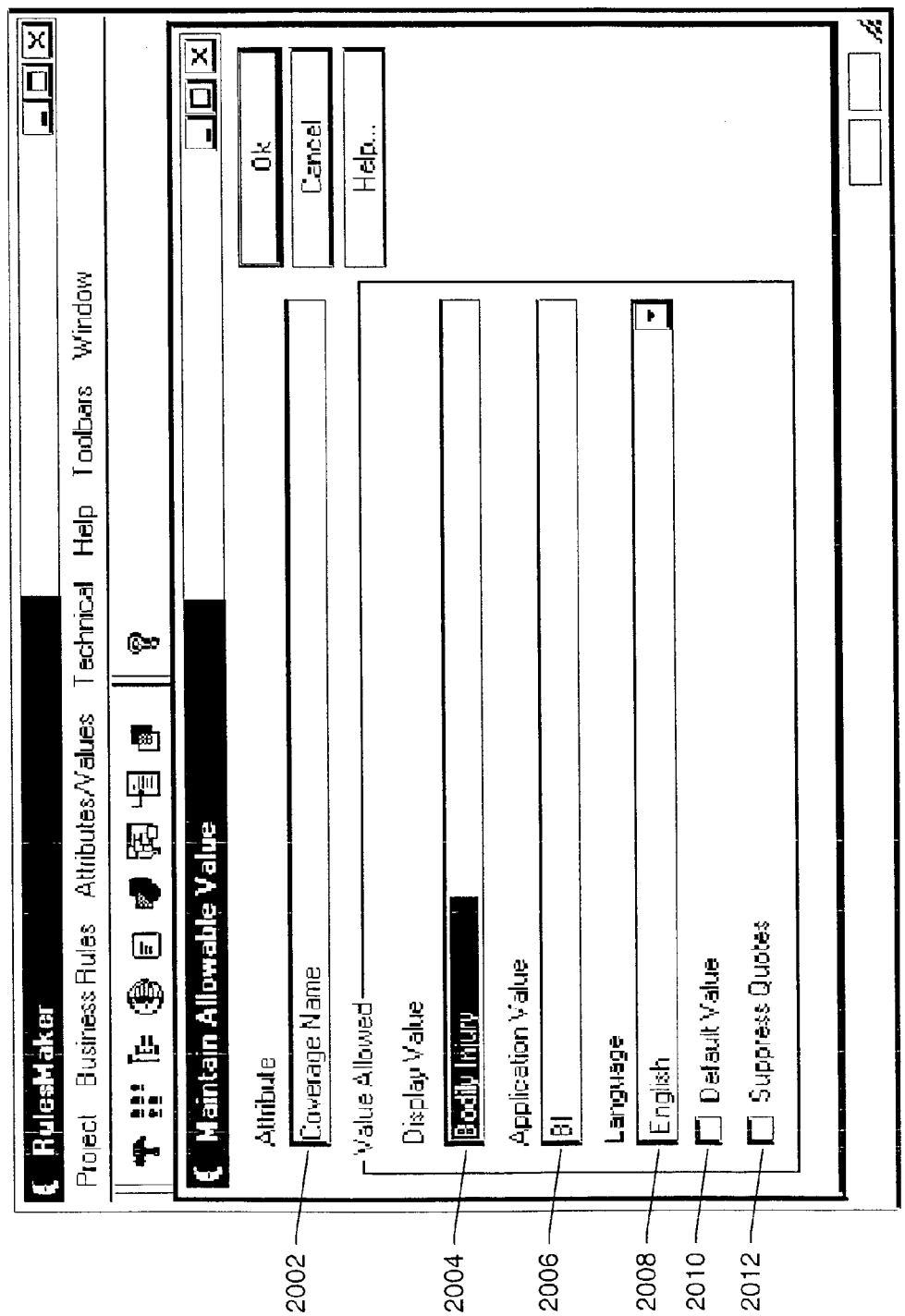
FIG. 20 depicts an example of a screen display for maintaining an allowable value of an attribute according to one embodiment.

Maintain attribute window 1900 may include a values area 1908. Values area 1908 may provide a listing of allowed values for the attribute (e.g., values that the attribute may take on). In instances where an insurance transaction processing system already exists, and a rules engine is being configured to replace the existing system, the existing insurance transaction processing system may include a data dictionary. It may be desirable for existing data definitions to be mapped to new attributes. For example, a data definitions area 1914, may allow existing data definitions to be associated with new attributes. A user may modify an allowable value by selecting the value in values area 1908 and selecting modify button 1910. Selecting modify button 1910 or create button 1912 may bring up maintain allowable value window 2000, as depicted in FIG. 20.

Maintain allowable value window 2000 may include names field 2002, display value field 2004, application value field 2006, and language field 2008. A display value may be a value assigned to the attribute to be displayed to a user. For example, the display value may be substituted for the attribute in a text report or a display screen including the attribute. The application value may be a value used within the computer system to represent the attribute value. A simple example which illustrates the difference between these attribute values may be a state abbreviation. For example, the State of New York may have a display value of "New York". However, the application value which refers to the State of New York may be "NY". Thus, a state attribute may have a value of NY within the computer system and a value of "New York" may be displayed to a user. Maintain allowable value window 2000 may also include a language field 2008. Language field 2008 may be used to differentiate attribute values to be used in regions having different primary languages. For example, an attribute value may have different display values for use in a German speaking country than a display value used in a primarily English speaking country. In addition, maintain allowable value window 2000 may include settings to designate an attribute value as the default value and/or to adjust display settings related to the value (e.g., to suppress display of quotation marks).

In an embodiment, if an attribute does not include all of the values desired by the user, the user may add values by selecting create button 1912, as shown on FIG. 19. Selecting create button 1912 may bring up maintain allowable value window 2000. The user may then fill in maintain allowable value window 2000 with information related to the new value. Similarly, a user may delete an allowable value of an attribute by selecting the value in values area 1908 and selecting delete button 1914.

If the user is unable to find a suitable attribute, the user may add a new attribute. Referring back to FIG. 18, the user may select create button 1812 in list attributes window 1800. In an embodiment, the user may type a proposed name for the new attribute in name field 1802 of list attributes window 1800 and select find button 1810, before creating a new attribute. This step may allow the user to ensure that the new attribute has a unique name. If no attribute is found having the same name as the proposed name for the new attribute, the user may select create button 1812. A new attribute having the proposed name may be created. The new attribute may then be modified, for example, to include desired allowable values, a desired type, etc.

In an embodiment, business rules may be created after attributes used by the business rules are present in the repository. In an alternate embodiment, a user may be permitted to define attributes while preparing a business rule. Since one business rule may refer to another business rule, the user may find that entering business rules is simplified if building block rules are entered first. As used herein, a "building block rule" refers to a rule whose output is used as input to another rule. For example, look up and derive type rules tend to be referred to by calculate type rules. Thus the user may enter look up and derive rules before entering calculate rules.

Figure 21:
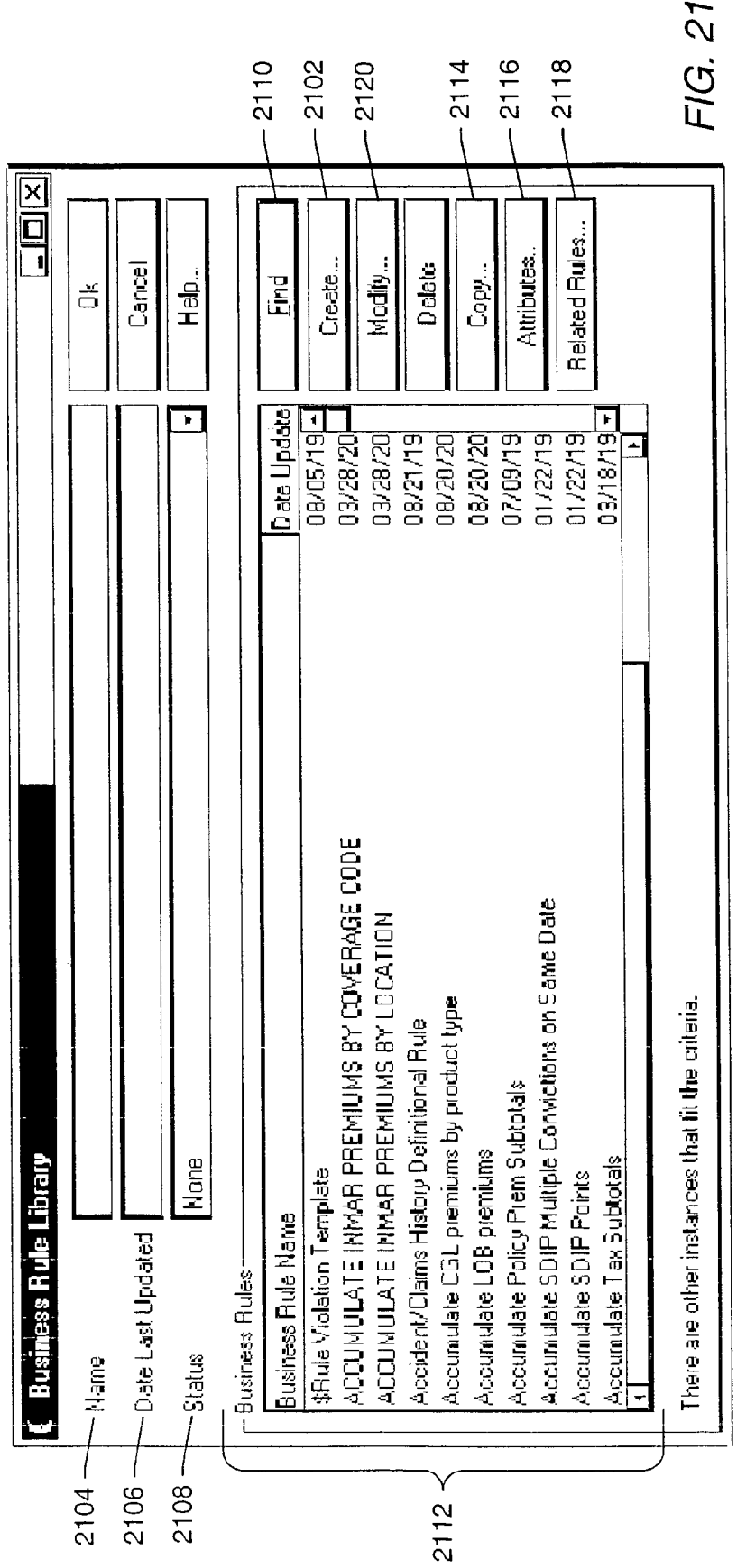
FIG. 21 depicts an example of a screen display that lists business rules available in a memory of a rule editor system according to one embodiment.

Effective dates may be associated with business rules. A business rule with an effective date earlier than the start date of a project may be used within that project. Thus, if a business rule is to be used with multiple projects, the effective date of the business rule should be at least as early as the earliest project. To ensure that the effective date of the business rule is appropriate, the user may set up the business rule within any project listed in project area 904, as shown in FIG. 11. After selecting the earliest desired project, the user may select product button 1112. List products window 1500 may be displayed. The user may select an icon or menu option to display business rules associated with the project. For example, business rule library window 2100 may be displayed, as depicted in FIG. 21.

To create a new business rule the user may select create button 2102. Alternately, a procedure similar to that discussed with regard to attributes may be performed. That is, the user may search for an existing business rule that may be used as is, or that may be modified to meet the user's needs. The user may search the available business rules by entering all or part of a business rule name in name field 2104, a date in date field 2106 and/or a status in status field 2108 and selecting find button 2110. If a suitable business rule is found, it may be used as is, modified, or copied and modified. To modify or copy a business rule, the user may select the business rule in rule area 2112 and select modify button 2120 or copy button 2114, as desired.

Figure 22:
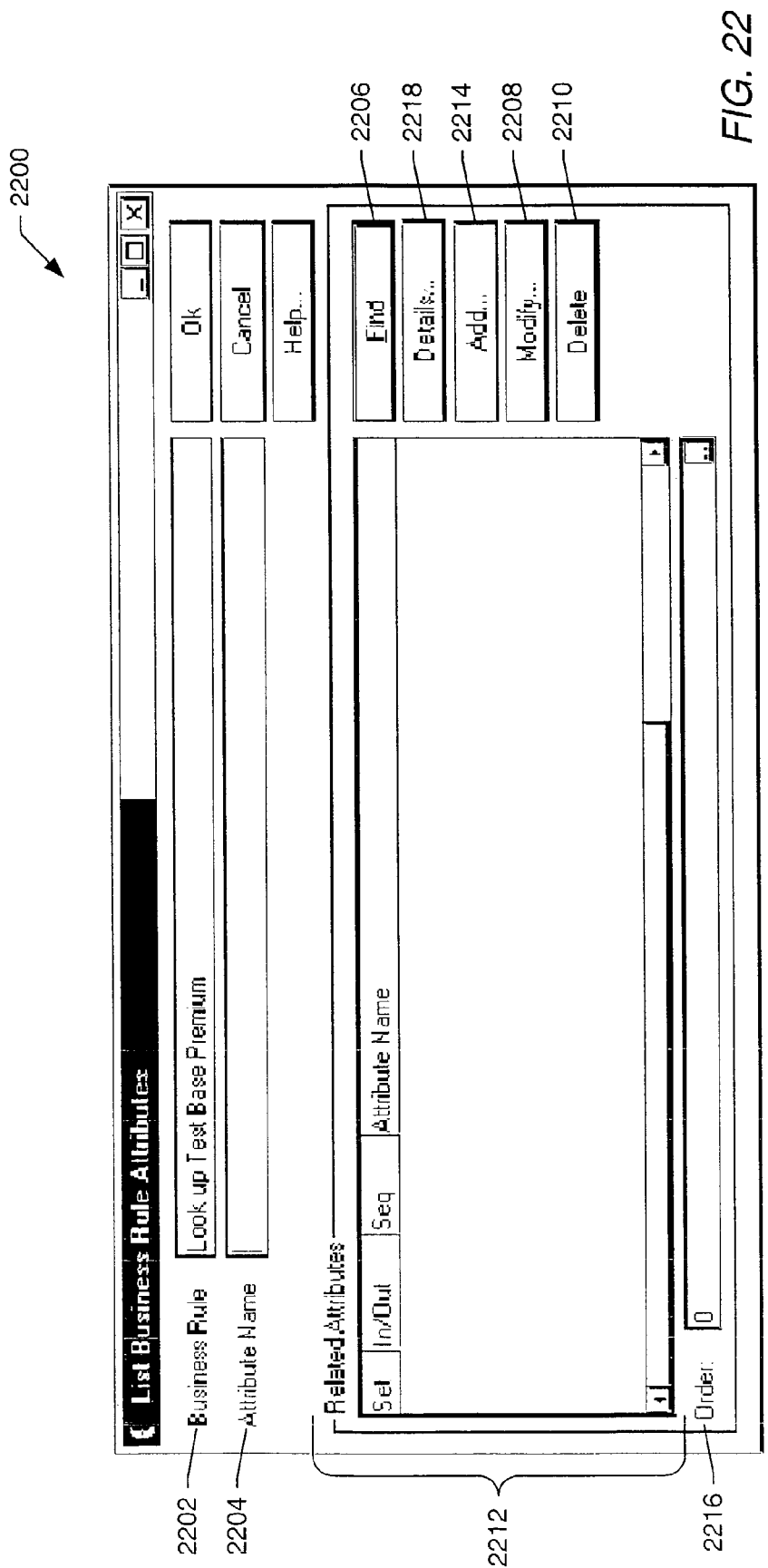
FIG. 22 depicts an example of a screen display that lists attributes related to a business rule according to one embodiment.

If no suitable business rule is identified, the user may create and name a new business rule. The new business rule may appear in rule area 2112. The user may select the new business rule and select attributes button 2116 to assign attributes to the business rule. When attributes button 2116 is selected, list business rule attributes window 2200 may be displayed, as depicted in FIG. 22. List business rule attributes window 2200 may include business rule name field 2202, attribute name field 2204, and a list of attributes and attribute sets related to the business rule in related attributes list 2212. Several functions with list business rule attributes window 2200 may be similar to functions previously described with regard to other windows. For example, the user may search for a desired attribute in related attributes list 2212 using find button 2206. The user may delete an attribute from the related attributes list by selecting the attribute and delete button 2210. The user may view details of an attribute or attribute set by selecting details button 2218. The user may relate an attribute to the business rule by selecting add button 2214. The display order of the attributes may be modified by selecting an attribute in related attributes list and changing the order number of the attribute in order field 2216.

Figure 23:
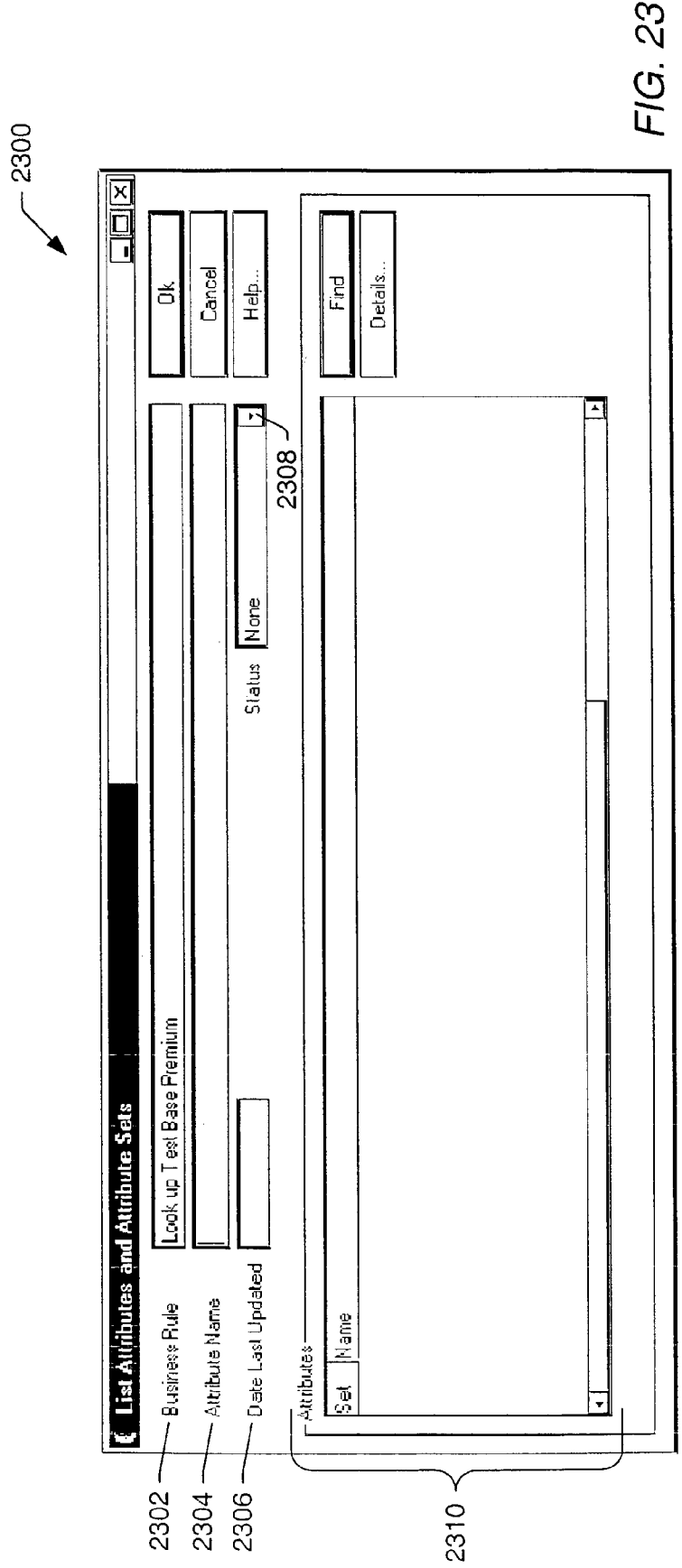
FIG. 23 depicts an example of a screen display that lists attributes and attribute sets according to one embodiment.

Selecting add button 2214 may cause list attributes and attribute sets window 2300 to be displayed, as depicted in FIG. 23. List attributes and attribute sets window 2300 may include business rule name field 2302, attribute name field 2304, date field 2306, status field 2308, and attribute list area 2310. Attribute list area 2310 may include a list of all attributes and attribute sets related to the business rule identified in business rule name field 2302. As with previous windows, the user may search for a desired attribute by at least partially identifying the desired attribute in attribute name field 2304, date field 2306 and/or status field 2308. When the desired attribute is found, the user may relate the attribute to the business rule (e.g., by selecting the attribute and selecting an okay button, or by double clicking the attribute). Once all of the desired attributes are related to the business rule, configuration of the business rule may proceed according to the type of business rule being prepared.

As previously mentioned, business rules may generally function to compute, look up and/or derive values. Each of these types of rules is discussed below, along with a description of how such a rule may be configured.

Look up type rules may be used to obtain a value from a data table. A look up rule may use an appropriate key or keys to access data in a specific table to determine a data element. Look up rules may include at least a standard minimum set of attributes. For example, as previously mentioned company, location, and one or more dates may be used as keys for each look up table. However, it is recognized that such a minimal set of keys may not be appropriate for all embodiments.

Referring back to FIG. 22, related attributes area 2212 may include a designation of how an attribute is related to a business rule. For example, when attributes are related to a business rule, they may be designated as input or output attributes of the business rule. In some embodiments, attributes related to a business rule may be designated as input attributes by default. In such embodiments, at least one of the attributes may be modified to ensure that at least one output attribute is designated.

In some embodiments, names of tables accessible by look up rules are included as allowable values of a table identification attribute. In such embodiments, to configure a look up rule to access a new table, the name of the new table may be added as an allowable value of the table identification attribute. If needed, the new table name may be added to the allowable values as previously described regarding adding values to an attribute.

Referring back to FIG. 21, a new look up business rule may be configured by selecting the new business rule name in rule area 2112 and selecting add button 2120. Add/maintain business rule window 2400 may be displayed, as depicted in FIG. 24. Add/maintain business rule screen 2400 may include one or more fields for selecting an appropriate business rule or business rule template. In such embodiments, several fields may be provided for selecting the business rule or business rule template. Business rules and/or business rule templates may be arranged in a hierarchy. Such an arrangement may aid a user in finding a desired or appropriate business rule or business rule template. A unique identifier such as a rule name may identify each item in the hierarchy. In alternate embodiments, add/maintain business rule screen 2400 may provide hierarchy related fields to identify the rule displayed. In such embodiments, one or more hierarchy related fields may not be user modifiable.

Fields may be provided that are associated with various levels of the hierarchy. For example, product field 2402 may display a product associated with the business rule and/or template. One or more categories may be displayed in category field 2404. Categories may narrow the hierarchy further toward individual business rules and/or templates. Additionally, a rule name field 2406 may be provided. Rule name field 2406 may be used to identify the selected business rule or template.

To add a new specification, the user may select add spec button 2410. Selecting add spec button 2410 may cause a choose specification type window to be displayed. The choose specification type window may include selections for all available specification types. Alternately, the choose specification type window may include a subset of available specification types that are relevant to look up business rules (e.g., data table reference specifications, conditional specifications, etc.).

A number of types of business rule specifications may be used to form a business rule. For example, the business rule depicted in the specification area 2408 of FIG. 24 includes a conditional specification 2412. As used here, a "conditional specification" refers to a business rule specification having a conditional structure. That is, execution of another specification is dependent on meeting a condition expressed in the conditional specification. In an embodiment, conditional specifications may have structure like: WHEN (Condition#1). For example, such a specification might state: "WHEN (state NOT=CA)." Each term in the configured business rule may be defined in the dictionary of terms. For example, the variable "state" may have allowable values that include states and/or territory of the United States of America. A conditional specification may also be configured to include multiple conditions. For example, a conditional specification may state WHEN ((state NOT=CA) AND (automobile manufacturer NOT=BMW) AND (insurance coverage amount NOT GE 300,000)). In this example, the conditions may include "state NOT=CA", "automobile manufacturer NOT=BMW", and "insurance coverage amount NOT GE 300,000".

Specifications field 2408 may display the current version of the business rule so that individual specifications of the business rule are easily distinguishable. For example, as depicted in FIG. 24, conditional specification 2412 is displayed in a hanging indentation format to distinguish it from other specifications. In an embodiment, the user may enter specifications directly in specifications area 2408. In an alternate embodiment, the user may be provided with a separate display screen and/or separate input fields to configure the specifications. For example, the user may select an "Add Spec" button 2410 to open a display screen for configuring a specification. A list of specification templates may be display by selecting template button 2430.

Add/maintain business rules screen may enable other business rule configuration functions as well. For example, the user may modify, copy or delete a specification by selecting the specification and selecting modify spec button 2414, copy spec button 2416 or delete spec button 2418, respectively. Additionally, a specification may be nested within another specification by selecting nest spec button 2420. The user may add a comment to a business rule or specification by selecting additional information button 2422. The order of one or more business rule specifications may be modified by selecting a specification and changing the order number in order field 2428.

In an embodiment, add/maintain business rules screen 2400 may simplify completing attributes by identifying and successively displaying specifications of the business rule which need allowable values assigned. Such functionality may be initiated by selecting complete button 2424. Once the attributes have been completed, the status of the business rule may be changed to complete in status field 2426. Alternately, the user may desire to leave the business rule status as incomplete. In an embodiment, only complete business rules may be used to form a software module. Thus, leaving the status incomplete may inhibit use of the rule. After configuring a business rule, the rule may be validated by selecting validate button 2432.

Figure 25:
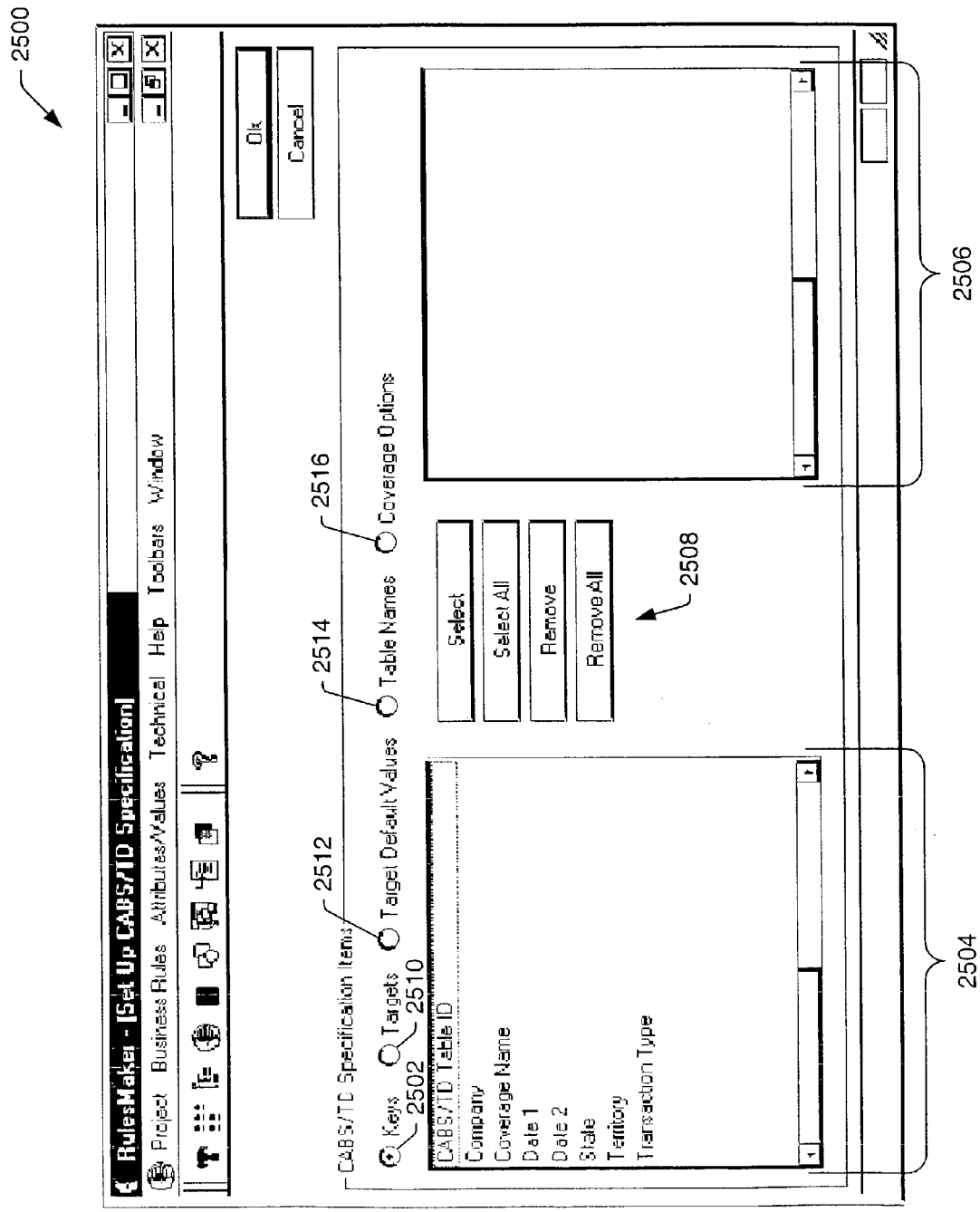
FIG. 25 depicts an example of a screen display for setting up a data table reference in a rule editor system according to one embodiment.

If a data table reference specification is selected, a setup data table reference window 2500 may be displayed, as shown in FIG. 25. The user may configure the data table reference specification using setup data table reference window 2500. For example, if keys button 2502 is selected, options field 2504 may display a list of attributes associated with the business rule that may be selected for use as data table keys. Attributes may be moved from options field 2504 to selections field 2506 by use of a number of selection buttons 2508, as is known in the art. The user may likewise select at least one output attribute by selecting target button 2510. A default value for the output attribute may be configured upon selecting target default button 2512. The user may select a table to reference by selecting table name button 2514. The user may also configure a coverage option by selection of coverage option button 2516.

Figure 26:
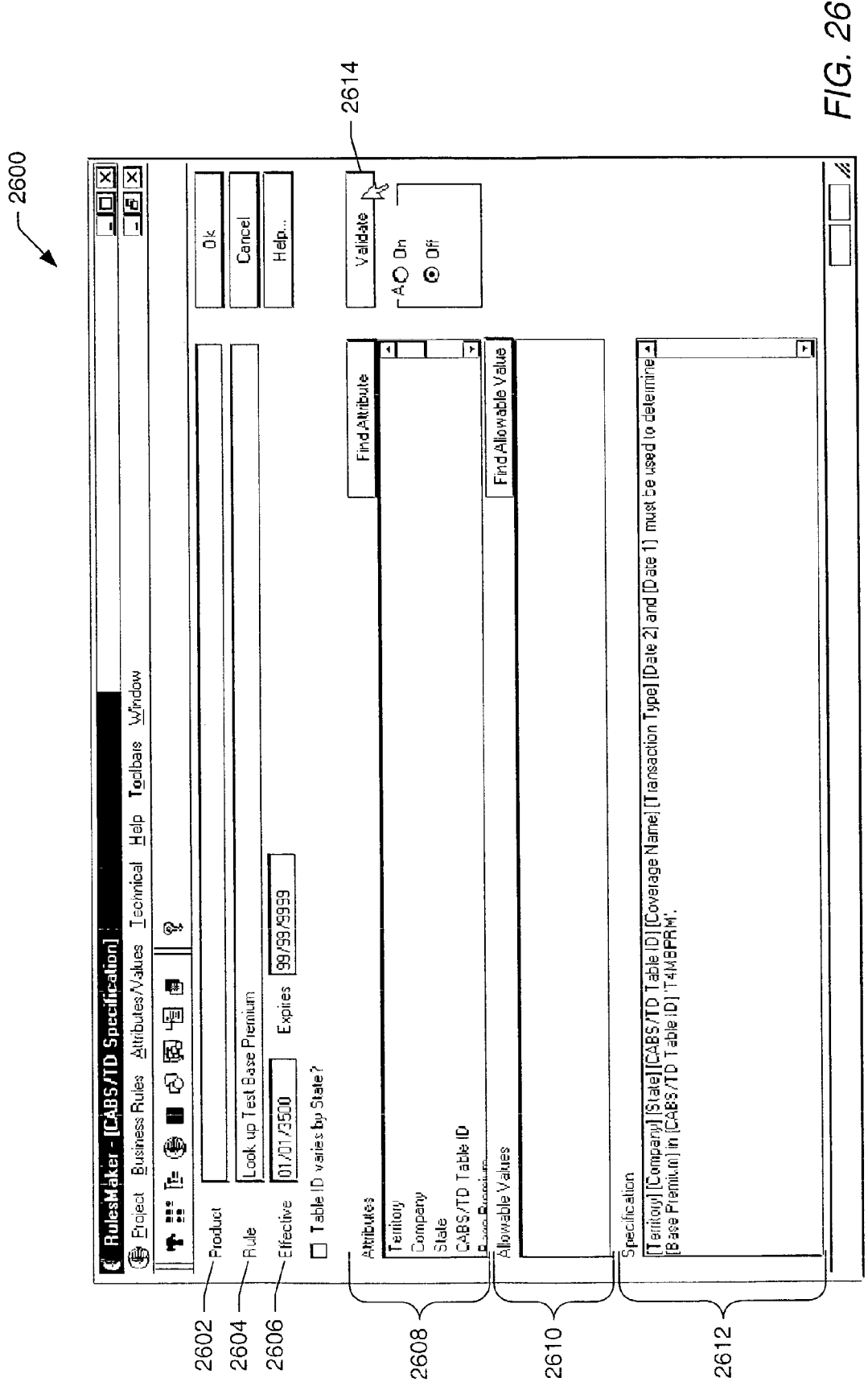
FIG. 26 depicts an example of a screen display for configuring a data reference specification according to one embodiment.

When the user has configured setup data table reference window 2500, data table reference specification window 2600 may be displayed, as depicted in FIG. 26. Data table reference specification window 2600 may include product field 2602, rule name field 2604 and date fields 2606. If the business rule is associated with a product, the associated product may be identified in product field 2602. Date fields 2606 may be used to configure effective and expiration dates for the business rule. Data table reference specification window 2600 may also include a number of fields used to configure functionality of the specification. For example, attributes field 2608 may list all of the attributes associated with the business rule. Additionally, in some embodiments, if an attribute is selected in attributes field 2608, allowable values of the selected attribute may be display in a values field 2610. An attribute selected in attributes field 2608 may be inserted into a business rule in business rule field 2612. In some embodiments, the user may enter information (e.g., commands, references to attributes and/or other business rules, etc.) directly into specification field 2612 by positioning the cursor in specification field 2612 and entering data through any conventional method (e.g., keyboard, voice recognition, etc.).

After configuring a business rule specification, the user may validate the specification by selecting validate button 2614. In some embodiments, the user may be inhibited from selecting an OK button of the data table reference specification window, or otherwise saving changes made in the data table reference specification window until the business rule specification has been validated. Validation may ensure that all commands and references in the configured business rule are recognized and reasonable (e.g., a numeric attribute is not equated to a alphanumeric attribute, etc.).

Derive type rules may be used to determine a value without accessing a data table. For example, derive type rules may be used when the data supplied is minimal, when the data and the derivation does not vary by location and/or when the derivation has little chance of changing. To configure a derive type rule, the user may create or copy a business rule as previously described, and associate one or more attributes with the business rule. The user may select to add one or more specifications appropriate for a derive type rule. The following example assumes that the configured derive type rule includes a conditional specification and a simple specification; however, other combinations are possible depending on the requirements of the business rule. For example, the user may add a conditional specification, an algorithm specification, a simple specification, a variable specification and/or a combination of specification types.

Figure 27:
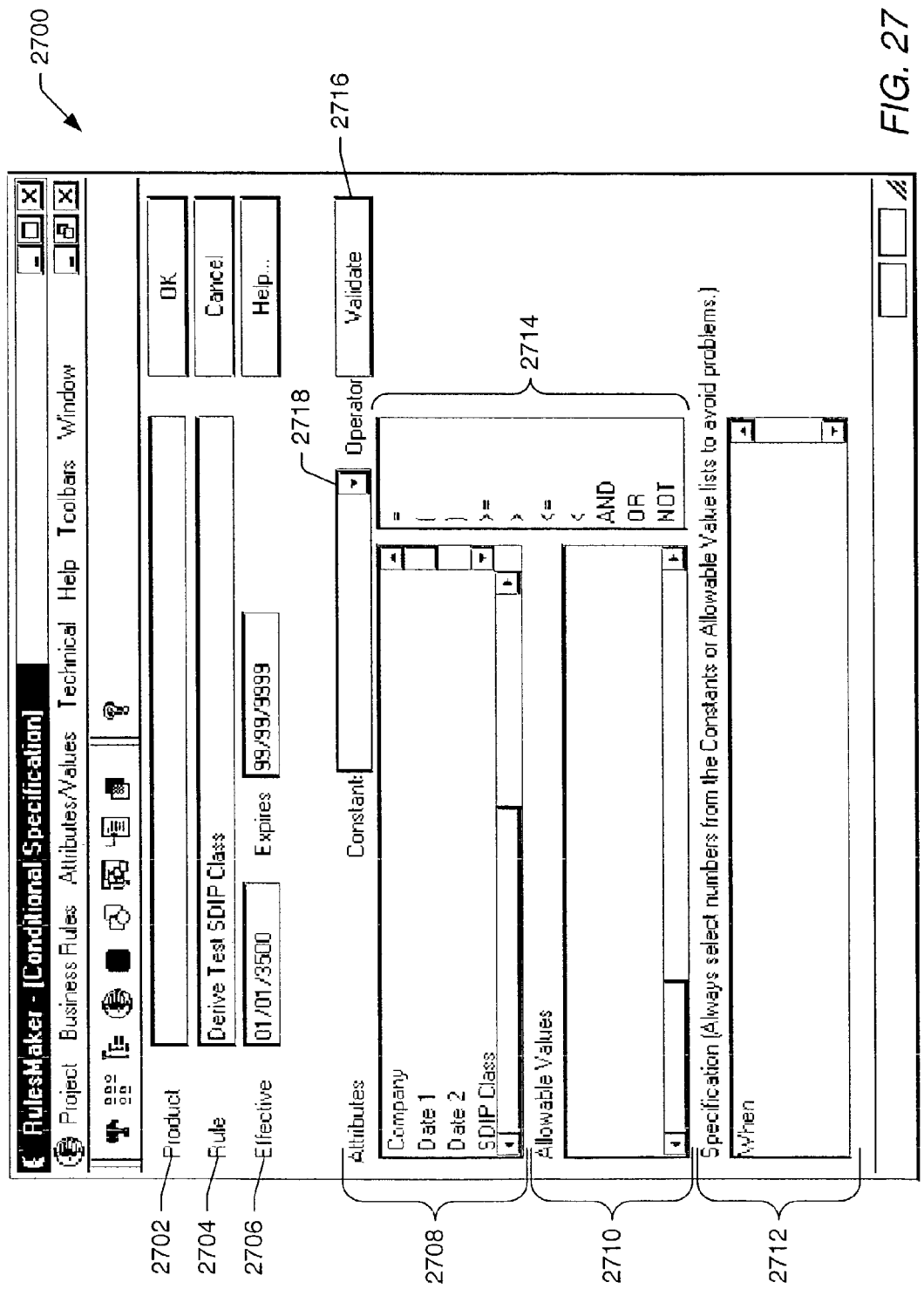
FIG. 27 depicts an example of a screen display for configuring a conditional specification according to one embodiment.

Referring to FIG. 24, in an embodiment, the user may select create spec button 2410 to display a choose specification type window. To configure a conditional specification, the user may select the conditional specification type as previously discussed. A conditional specification window 2700 may be displayed, as depicted in FIG. 27. Conditional specification window 2700 may include a product name field 2702 to display a product associated with the business rule, if appropriate. The rule name may be displayed in name field 2704, and the effective and expiration dates may be displayed in date fields 2706.

Conditional specification window 2700 may include a number of fields for configuring the specification. For example, conditional specification window 2700 may include an attributes field 2708 that includes a list of all attributes associated with the present business rule. If an attribute is selected in attributes field 2708, allowable values for the attribute may be displayed in values field 2710. Conditional specification window 2700 may also include an operator field 2714 and a constants field 2718. By selecting attributes from attribute field 2708, constants from constants field 2718 and/or operators from operator field 2714, the user may build a logical and/or mathematical relationship for the conditional specification in specification field 2712. In an embodiment, the user may also directly enter information into specifications field 2712.

In an alternate embodiment, attributes field in a conditional specification window may include a list of all attributes in the repository. In such an embodiment, an attribute may be associated with a business rule when it is selected for inclusion in a specification of the business rule.

After configuring the desired conditional specification, the user may select validate button 2716. Validate button 2716 may initiate a validation process to ensure that relationships and attributes in the configured specification are allowed. After validation, the user may select an OK or save changes button to return to add/maintain business rule window 2400. At add/maintain business rule window 2400, the user may add another specification by selecting create spec button 2410, and selecting the specification type. In this example, the specification type selected is a simple specification.

Figure 28:
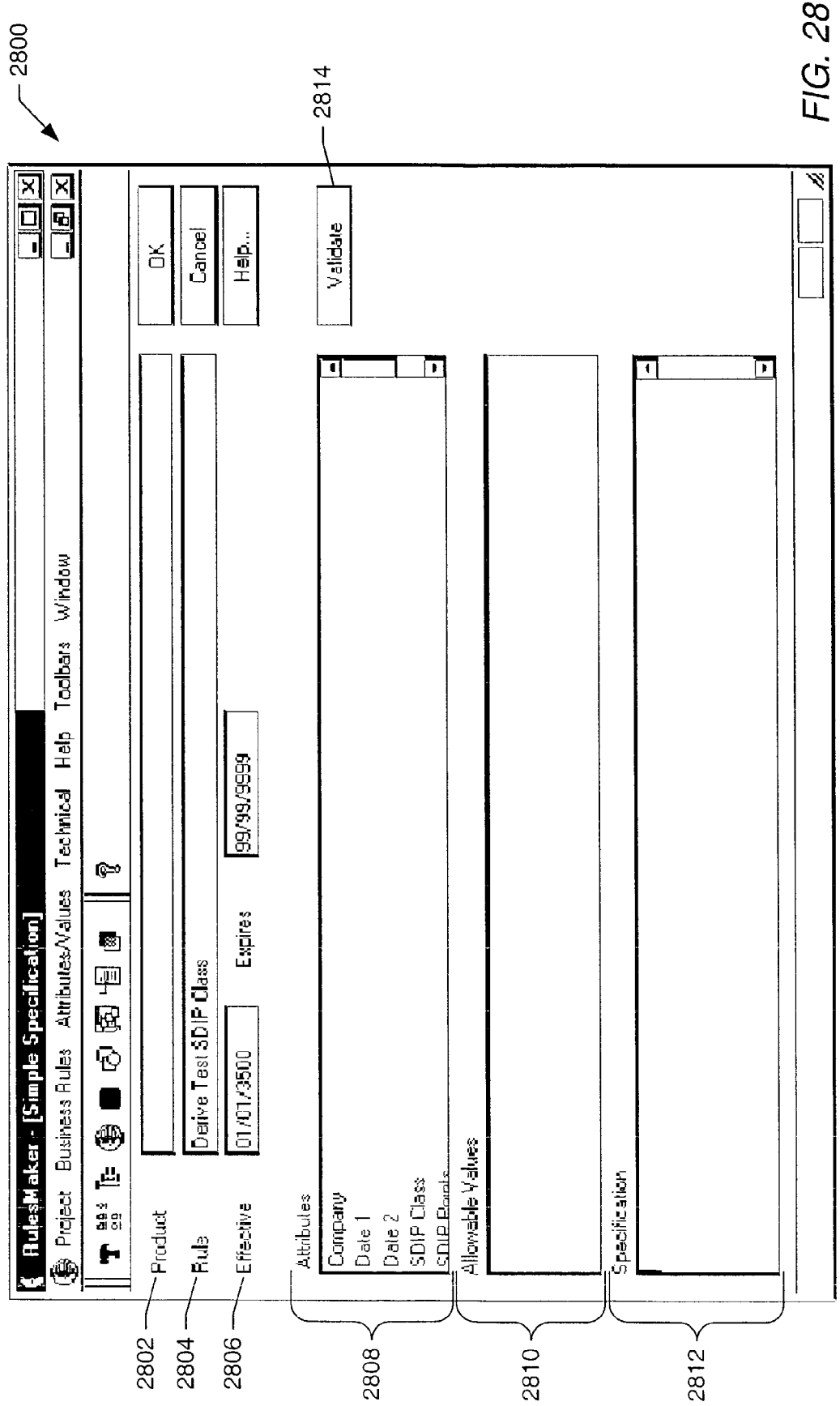
FIG. 28 depicts an example of a screen display for configuring a simple specification according to one embodiment.

Selecting to configure a simple specification may cause simple specification window 2800 to be displayed, as depicted in FIG. 28. Simple specification window 2800 may include a product name field 2802 to display a product associated with the business rule, if appropriate. The rule name may be displayed in name field 2804 and the effective and expiration dates may be displayed in date fields 2806.

Simple specification window 2800 may also include a number of fields for configuring the simple specification. For example, simple specification window 2800 may include an attributes field 2808 that includes a list of all attributes associated with the present business rule. Simple specification window 2800 may also include a values field 2810. Values field 2810 may display allowable values for an attribute selected in attributes field 2808. In an embodiment, the user may also directly enter information into specifications field 2812. Attributes and information directly entered into specification field 2812 may form the simple specification. In an embodiment not shown, a constants field and/or an operator field, as described with regard to conditional specification window 2700, may be included in simple specification window 2800. After forming the simple specification, the user may select validate button 2814. Validate button 2814 may perform functions as previously described.

In an alternate embodiment, an attributes field in a simple specification window may list all attributes available in a repository. In such an embodiment, an attribute may be automatically associated with a rule when it is selected for inclusion in a specification of the rule.

The user may save changes to the simple specification to return to add/maintain business rule window 2400. The user may continue adding specifications until the business rule includes the desired functionality. When all of the desired specifications have been added, the user may validate the entire business rule to ensure that relationships and references in the business rule are valid. The user may then save changes to the business rule.

Figure 29:
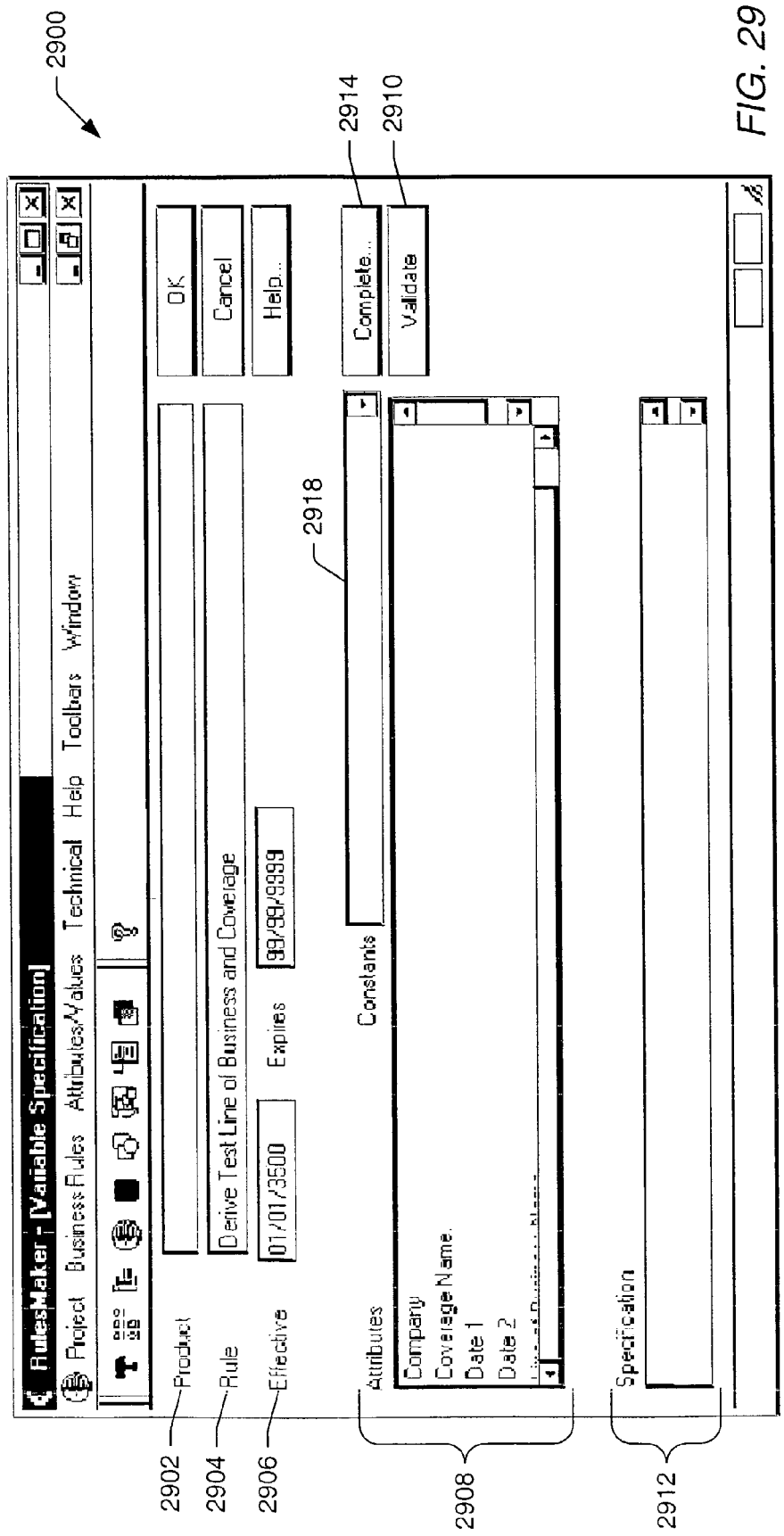
FIG. 29 depicts an example of a screen display configuring a variable specification according to one embodiment.

In another example, a derive type rule may include an attribute set defined by a variable specification. At add/maintain business rule window 2400 the user may select to add a variable specification. Variable specification window 2900 may be displayed, as depicted in FIG. 29. Variable specification window 2900 may include a product name field 2902 to display a product associated with the business rule, if appropriate. The rule name may be displayed in name field 2904 and the effective and expiration dates may be displayed in date fields 2906.

Variable specification window 2900 may include a number of fields for configuring the specification. For example, variable specification window 2900 may include an attributes field 2908 that includes a list of all attributes associated with the present business rule. Alternately, attributes field 2908 may include a list of all attributes related to the current rule. Variable specification window 2900 may also include a constants field 2918. By selecting attributes from attribute field 2908 and constants from constants field 2918, the user may build a logical and/or mathematical relationship for the variable specification in specification field 2912. The specification may relate two or more attributes to one another in a manner that defines an attribute set. In an embodiment, the user may also directly enter information into specifications field 2912. After forming the variable specification, the user may select validate button 2910. Validate button 2910 may perform functions as previously described.

As with the previous example, the user may save changes to the specification to return to add/maintain business rule window 2400. The user may continue adding specifications until the business rule includes the desired functionality. When all of the desired specifications have been added, the user may validate the entire business rule to ensure that relationships and references in the business rule are valid. The user may then save changes to the business rule.

Figure 30:
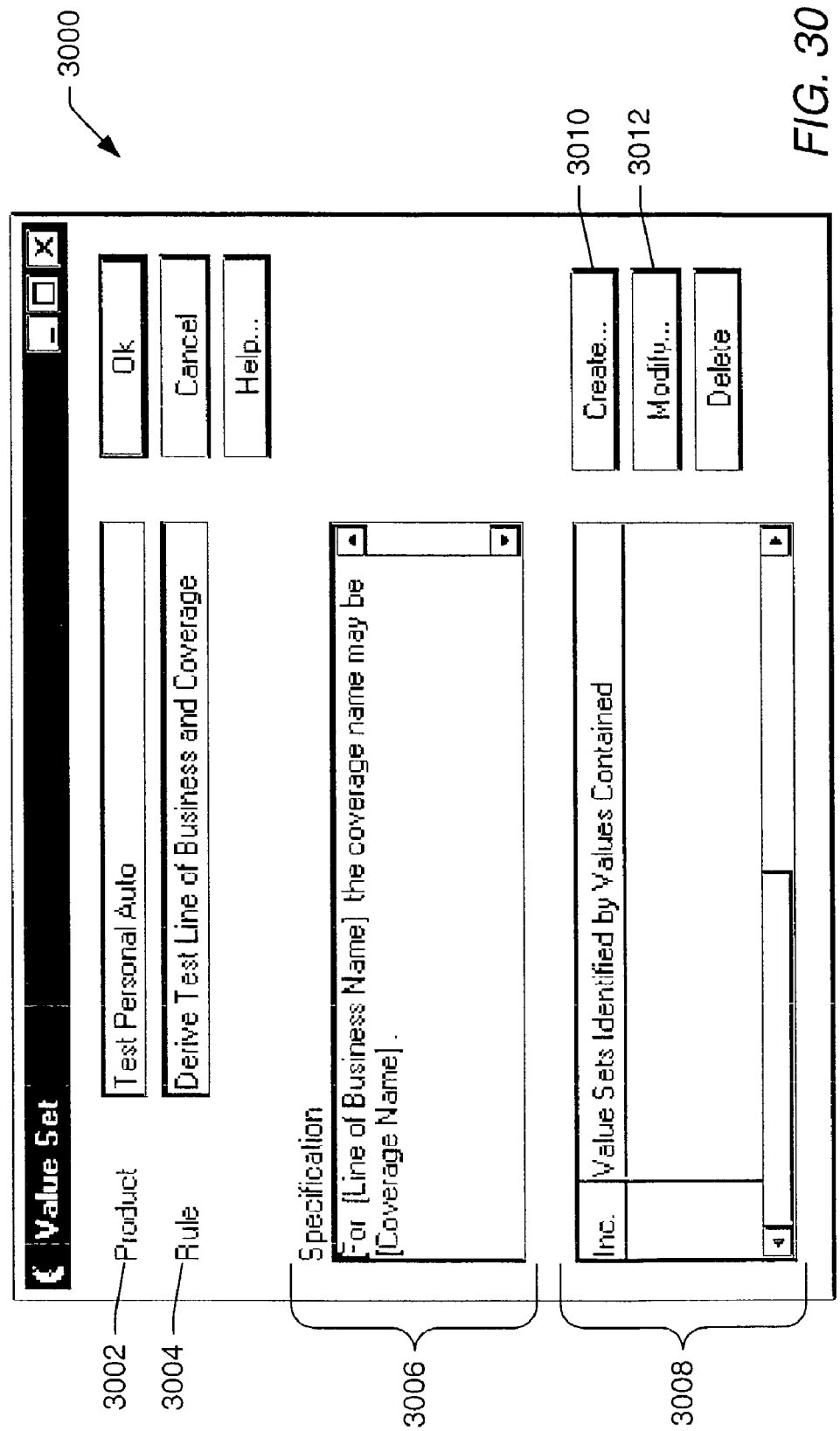
FIG. 30 depicts an example of a screen display that provides a listing of values associated with a business rule according to one embodiment.

After adding a variable specification to a business rule, the variable specification may need to be completed before the business rule may be used. With reference to attributes and/or attribute sets, completing refers to providing a list of allowable values for the attribute(s). To complete an attribute set defined by a variable specification displayed in variable specification window 2900, the user may select complete button 2914. Selecting complete button 2914 may cause value set window 3000 to be displayed, as depicted in FIG. 30. Referring to FIG. 24, the user may also complete one or more attributes or attributes sets by selecting complete button 2412. Selecting complete button 2412 may cause value set windows (e.g., window 3000) to be displayed sequentially for each variable specification associated with the rule that needs to be completed. Value set window 3000 may include product field 3002 and rule name field 3004, which identify a product and/or business rule, respectively, associated with the variable specification. Value set window 3000 may also include a specification field 3006, which displays a variable specification. Value sets defined by the variable specification may be displayed in value sets field 3008. A user may create or modify a value set by selecting create button 3010 or modify button 3012, respectively.

Calculate type rules may be used to perform calculations. For example, a calculate type rule may be used for determination of taxes. To configure a calculate type rule, the user may create or copy a business rule as previously described, and associate one or more attributes with the business rule. The user may select to add one or more specifications appropriate for a calculate type rule. For example, the user may add a conditional specification, an algorithm specification, a simple specification, a variable specification, a rating worksheet specification or a combination of specification types.

Figure 31:
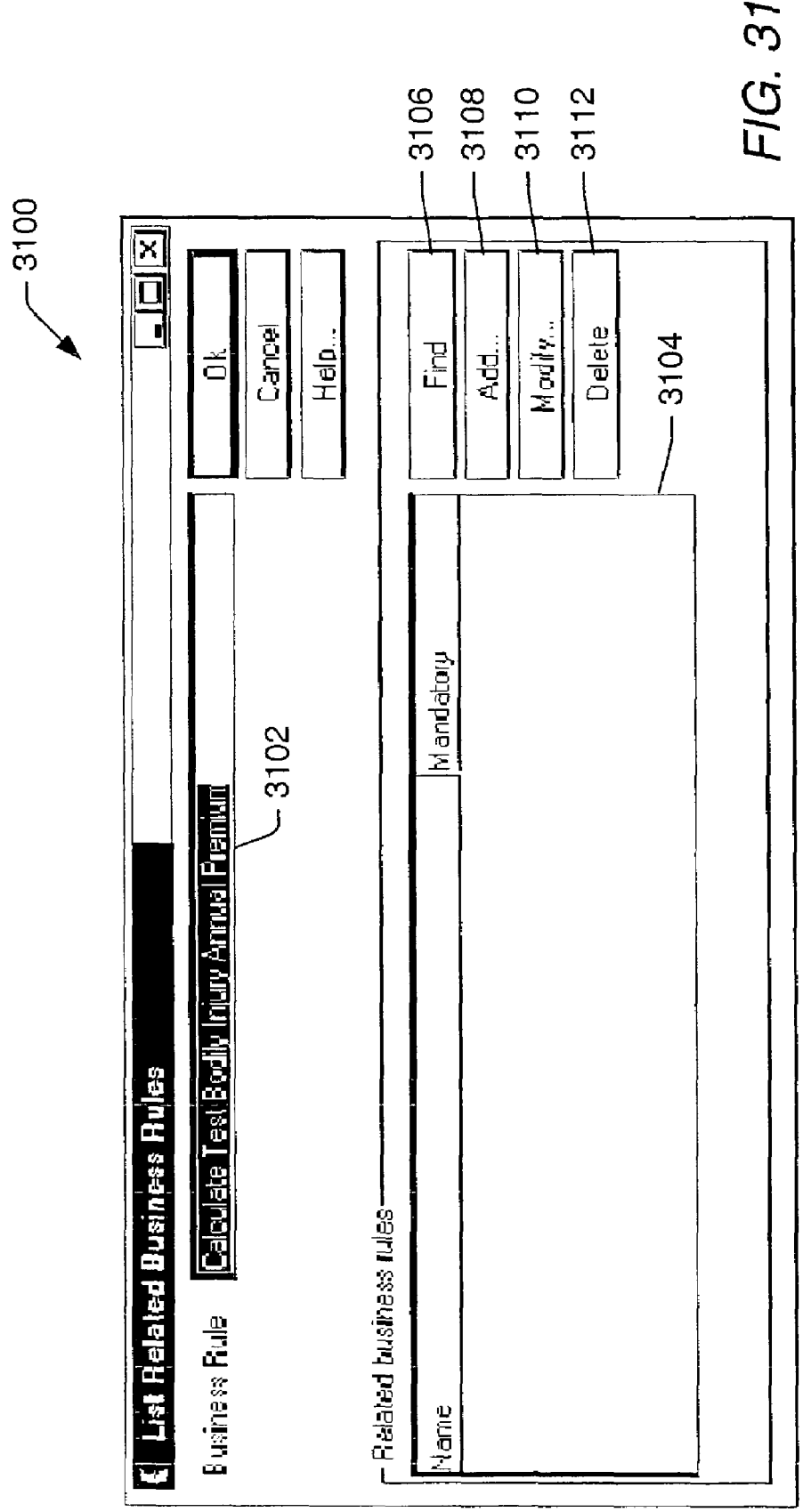
FIG. 31 depicts an example of a screen display that list business rules related to a particulate business rule according to one embodiment.

In an embodiment, calculate rules may differ from look up rules and derive rules in that calculate rules may reference other business rules. As with attributes, prior to reference in a business rule, a referenced business rule may be related to the business rule. For example, referring back to FIG. 21, the user may select the rule to be configured and select related rules button 2118. Selecting related rules button 2118 may cause list related business rules window 3100 to be displayed, as depicted in FIG. 31.

List related business rules window 3100 may include name field 3102. Additionally, list related business rules window 3100 may include related rule field 3104. In an embodiment, related rule field 3104 may only list rules related to the rule named in rule field 3102. In such an embodiment, find button 3106, add button 3108, modify button 3110 and/or delete button 3112 may be used to change the list of related business rules. Once the desired business rules have been related to the current business rule, the user may be returned to add/maintain business rule window 2400.

In an alternate embodiment, a related rules field may include a more extensive list of rules (e.g., all rules in the repository, all associated with a project, or with a product, etc.). In such an embodiment, the user may select rules to relate to the present rule by known selection methods, such as check boxes.

Figure 32:
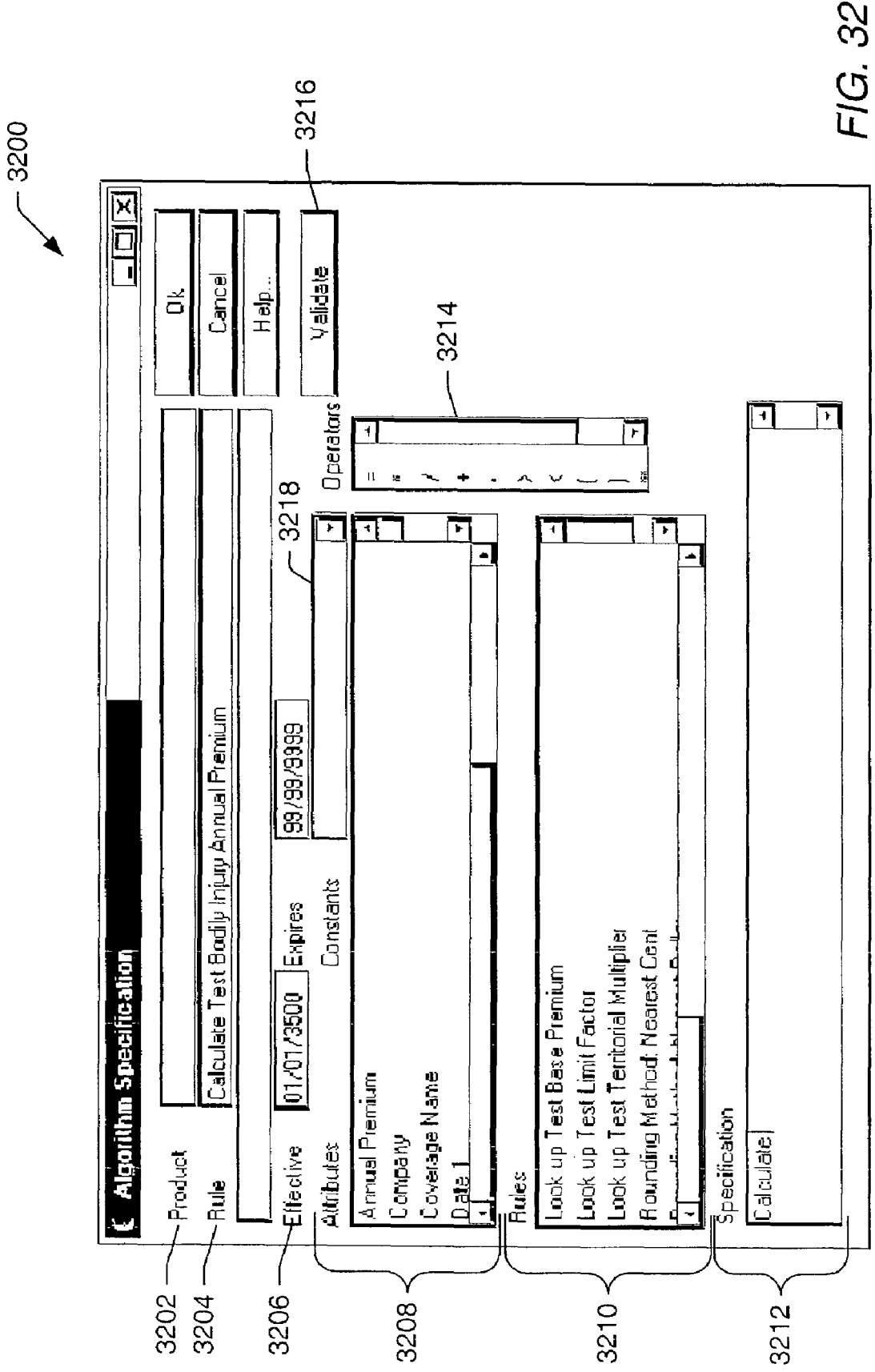
FIG. 32 depicts an example of a screen display for configuring an algorithm specification according to one embodiment.

In add/maintain business rule window 2400, the user may select create spec button 2410 to begin adding specifications to the business rule. For example, the user may add an algorithm specification. If the user selects to add an algorithm specification, algorithm specification window 3200 may be displayed, as depicted in FIG. 32.

Algorithm specification window 3200 may include a product name field 3202 to display a product associated with the business rule, if appropriate. The rule name may be displayed in name field 3204, and the effective and expiration dates may be displayed in date fields 3206.

Algorithm specification window 3200 may include a number of fields for configuring the specification. For example, algorithm specification window 3200 may include an attributes field 3208 that includes a list of all attributes and attribute sets associated with the present business rule. Additionally, algorithm specification window 3200 may include a list of rules associated with the present rule in rules field 3210. Algorithm specification window 3200 may also include an operator field 3214 and a constants field 3218. By selecting attributes from attribute field 3208, rules from rules field 3210, constants from constants field 3218 and/or operators from operator field 3214, the user may build a logical and/or mathematical relationship for the algorithm specification in specification field 3212. In an embodiment, the user may also directly enter information into specifications field 3212. After forming the algorithm specification, the user may select validate button 3216. Validate button 3216 may perform functions as previously described.

In an alternate embodiment, an attributes field may include a list of all attributes in the repository. Similarly, in an alternate embodiment, a rules field may include a list of all rules in the repository. In such embodiments, an attribute or rule may be associated with a business rule when it is selected for inclusion in a specification of the business rule.

A business rule may also include one or more additional information specification. As used herein, an "additional information specification" refers to a specification that does not include any program code or command. Typically, an additional information specification may include a comment used to document the program code. That is, a text description of the program code, embedded within the code. In an embodiment, an additional information specification may be added to a rule by selecting an information button 2414, as depicted in FIG. 24.

A model may have one or more levels. Each level corresponds to a PCP formed by the model during code generation. For example, in some instances, a model may have only one level. Such a model may form one software module. However, in some instances a model may have more than one level. For examples, if the model relates to a product which includes multiple types of insurance coverage, such as, but not limited to a product that provides insurance coverage for both a home and an automobile. Such a model may form a software module direct to each type of insurance coverage.

In an embodiment, a user may select a technical menu item 1514 on a list products/templates for project screen (as depicted in FIG. 15), then select a "models" entry from the pull down menu. This may bring up a list models screen (not shown). A variety of search options may be available to select a desired model as discussed previously regarding other data objects (e.g., business rules). On the list models screen, maintenance functions available may include, but are not limited to: creating a new model, updating a model, or deleting a model.

From the list models screen, a new model may be created by selecting a create model button. A pop-up window may state that "no implementation points were found for the requested search criteria." Selecting OK may bring up a maintain model screen. The user may complete a number of fields to associate the model. For example, the fields may include a model name, a code packet ID, a generation level, and a model number. To modify a model, the model may be selected from the list models screen. A modify button may be selected to bring up a maintain model screen. Changes that are to be made to the model may be made in the maintain model screen. Similarly, to delete a model, the model may be selected from the list models screen, a delete button may be selected. A model may be generated by selecting the model in the list models screen and selecting the modify button. This may bring up the maintain model screen. The user may then select a by model entry in the generate pull down menu. A version of the list products screen may be displayed. The user may highlight the appropriate product and click on the generate button to generate the model.

Implementation points may be maintained from the maintain model screen by selecting the model with which an implementation point is associated. Having selected a model, the user may create a new implementation point, modify an existing implementation point and/or delete an implementation point. To create a new implementation point, the user may select a create button from the maintain model screen. Selecting the create button may bring up a maintain implementation point screen. In the maintain implementation point screen the user may define the implementation point to be added. Similarly, to maintain an implementation point, the user may select an implementation point and select a maintain button on the maintain implementation point screen. The user may then modify parameters of the selected implementation point. To delete an implementation point, the user may select a delete button on the maintain implementation point screen. The user may also change the order of implementation points by select an implementation point and selecting a number in an order field the maintain implementation point screen. The sequence number may be changed to the desired sequence number. The user may then select a set button. The screen may refresh to show the modified order of implementation points.

Business rules associated with an implementation point may be resequenced on the maintain implementation point screen. The user may select a business rule in the list to be re-sequenced. A sequence number associated with the selected business rule may be displayed in an order field. The user may change the sequence number to the desired sequence number and select the set button. The screen may be refreshed to show the re-sequenced rules.

After the rules have been configured in the rules engine, it may be necessary to technically support them. As used herein, "technically supporting" a business rule refers to relating rules to the appropriate implementation point(s), mapping attributes to the correct field name in the target programming language and/or associating new rules with the correct code packets. Attributes may be mapped to a number of different field names. For example, in an embodiment where the final program is to be assembled in COBOL, attributes may be mapped to a standard COBOL field name, dictionary COBOL field name, or an override COBOL field name.

After a business rule has been configured, it may be tested. In an embodiment, a system for producing program code for an insurance transaction processing program may allow an individual business rule to be formed in an executable form for testing of the business rule. In such a system, one or more technical code packets may need to be formed and/or associated with the business rule in order for the business rule to generate program code and/or for the generated program code to be assembled. A technical user may prepare a business rule for testing by forming a test SPC. The test SPC may include all of the assembly commands and references to appropriate code packets needed to assemble the business rule into a software module.

In an embodiment, after a rule has been tested, information from the test SPC used to support the tested business rule may be back propagated. That is, information from the test SPC may be used to form technical code packets needed to integrate the business rule with the remainder of the software module with which the rule is associated. As used herein, backward propagating information from a test SPC is referred to as "loading" the test SPC.

A load test SPC application may be initiated from a maintain implementation point screen, by selecting an implementation point with which to associated the new business rule code packet. After selecting an implementation point, the user may select a Load Test SPC button. Selecting the Load Test SPC button may bring up a business rule test screen. As previously mentioned, a building block rule may need to be executed before another rule that references it. Thus, one or more building block rules may be associated with a tested business rule. Code packet ids of associated business rules may be entered on the business rule test screen. Selecting an OK button on the business rule test screen may cause a maintain implementation point screen to be displayed. On the maintain implementation point screen, a business rule may be selected. The user may select a modify button to display a business rule attribute and technical variable mappings screen. The business rule attribute and technical variable mappings screen may be used to map technical variables to corresponding business rule variables and parameters, such as, but not limited to: keys, business rule attribute targets, data tables.

On the maintain model screen for the model to be modified, an implementation point desired for placement of a business rule may be selected. Selecting a modify button may cause a maintain implementation point screen to be displayed. On the maintain implementation point screen, the user may select a desired placement for the rule and select a select rule/code packet button. Selecting the select rule/code packet button may cause a business rule library screen to be displayed. On the business rule library screen the user may select a rule to load or associate with the implementation point and select the OK button.

In an embodiment, an insurance transaction processing program may use a known technique or routine to call one program from another program. For example, a proprietary routine specific to the insurance processing program may be used. Alternately, other common routines and/or techniques as are known in the art (e.g., dynamic program calls) may be used. Logic used to set-up and call a program or software module from the insurance transaction processing program may be stored in a generic code packet. The rules engine may determine the program ID to call based on the model ID and the product line. In some cases, when a new software module is created, a new navigation module for the insurance transaction processing program may also be formed. The new navigation module may link existing or unchanged portions of the insurance transaction processing program to the new software module.

Several code packets may be used to generate navigation software modules. For example, such code packets may include, but are not limited to are: a navigation program control code packet, a navigation program control code packet SPC, a product navigation program control code packet, and a product navigation program control code packet SPC. To produce such code packets, the user may select a navigation option from the list products/templates for project screen. Selecting the navigation option may cause the code packets and a report to be generated.

Navigation program control code packets may define product codes generated by the rules engine and the product navigation program control code packets generated for each product. Additionally, navigation program control code packets may define models and model generation levels. Product code information may be used to determine product specific navigation control programs to call. Model information may be used for editing input requests.

In an embodiment, portions of the navigation program control code packets may access the repository. For example, the navigation process may access a product code and/or a product program id. for use in the navigation code packet. In another example, the navigation process may access a model id. and/or a generation level of the model. Other information that may be accessed from the repository to generate the navigation program control code packet may include the product code for products that reside in repository on a certain date. The product program id. may also be accessed to generate the navigation program control code packet. A model number, provided by a user, may be accessed to create the navigation program control code packet. In addition, the navigation program control code packet may access the generation level of the model. The navigation program control code packet SPC may include a SPC based on the navigation program control code packet.

The product navigation program control code packet may identify the: product, product line, coverage, unit at risk and/or product line subsidiary database maintenance utility. A product navigation program control code packet may be created for each product, product technical code packets and/or product code set created for a product navigation program control code packet process. The contents of the product navigation program control code packet may depend upon the generation levels of the models that are used by the product, product technical code packets and/or product code set. The information contained in the product navigation program control code packet may be found in two lists created in the navigation control process. The technical code packets may be copied into the product navigation program control code packet based on the generation level of the model. After generating the product navigation program control code packets, the system may create a product navigation program control SPC for each product navigation program control code packet.

In an embodiment, a driver code packet may include a number of sections into which code may be inserted. For example a driver code packet may include, but is not limited to: a data definition section and a logic section. In such an embodiment, data fields may be inserted into the data definition section using assembly variables and/or assembly commands. The data definition section may be divided into different groups. These groups may represent the logical data groupings (e.g., switches, work data, literals). The code packets may insert data into the respective group depending on the type of data being generated. In the logic section, code may be inserted to implementation points by the using the assembly variables and/or assembly commands. A number of commands may be used by the code assembler for the insertion and/or modification of code. For example, an assembly command may be used to define a new assembly variable. The assembly command may also be used to change the order of an internal list of recognized program code assembly variables. Program code assembly variables may be used to control the order of output code. Logic section headers may be assembly variables. In another example, a group command may be used in conjunction with the assembly command. A group may represent a subdivision of an assembly variable. In an embodiment, there may be up to 26 groups (A-Z) associated with an assembly variable using the group command. Groups may allow code to be sequenced at a particular assembly variable. In yet another example, a break/insert command may be used. A break/insert command may allow a code packet to modify code in a code packet that is copied.

As previously mentioned, program code assembly variables may be used to control the order of output code. Assembly variables may be used in code section headers. Assembly variables are used to insert code into the driver code packet. New assembly variables may be created for code insertion. Each new assembly variable to be added in the logic section may be added to the assembly variables list in the code assembler header area.

When program code is generated, a PCP may be created on a memory coupled to the computer system. A report may also be created on a memory coupled to the computer system. The report may include a text document. This report may show any errors or warnings incurred during the generation of the program code.

A user may be allowed to access an insurance transaction processing program and/or a rule editor program via a network. The user may be charged a fee for the access according to a pricing model. Various pricing models may be used with various embodiments. The pricing model may include a fee for each of a plurality of modification sessions conducted by the user. The pricing model may include a fee for each fixed period of access time by the user. For example, the fixed period of access time may include an hourly multiple, a weekly multiple, a monthly multiple, a yearly multiple, or a multiple of minutes. The pricing model may include a fee that varies directly with an amount of time spent accessing the insurance transaction processing program and/or a rule editor program.

The user may include an insurance organization having a particular size, and the pricing model may vary according to the size of the user. The size of the user may include a function of a quantity of employees of the user, a function of revenue of the user over a period of time, and/or a function of a quantity of consultation sessions conducted by the user over a period of time. The method may further include charging additional users for access to the insurance transaction processing program and/or a rule editor program according to a same or different pricing model.

Various embodiments further include receiving or storing instructions and/or data implemented in accordance with the foregoing description upon a carrier medium. Suitable carrier media include storage media or memory media such as magnetic or optical media, e.g., disk or CD-ROM, as well as signals such as electrical, electromagnetic, or digital signals, conveyed via a communication medium such as networks and/or a wireless link.

While the embodiments described herein are generally related to insurance products, it is recognized that the methods and systems described may be used to implement any business process that can be implemented using business rules. Although the system and method of the present invention have been described in connection with several embodiments, the invention is not intended to be limited to the specific forms set forth herein, but on the contrary, it is intended to cover such alternatives, modifications, and equivalents as can be reasonably included within the spirit and scope of the invention as defined by the appended claims.

What is claimed is:

1. A system comprising:
   at least one computer system;
   at least one memory coupled to at least one computer system;
   a plurality of code packets in at least one memory;
   at least one rules engine in at least one memory, wherein at least one rules engine is executable to generate assembly instructions for at least one software module; and
   at least one code assembler, wherein at least one code assembler is configured to assemble two or more code packets according to assembly instructions to form at least one software module, wherein the at least one software module and one or more other software modules form an insurance transaction processing program that implements one or more business rules, wherein the assembly instructions comprise references to placements with the at least one software module for two or more code packets and wherein assembling two or more code packets according to the assembly instructions comprises sorting portions of two or more packets into a desired placement order;
   wherein the plurality of code packets comprises two or more product-specific navigation program control code packets, wherein each of at least two of the product-specific navigation program control code packets corresponds to and identifies a particular insurance product,
   wherein the at least one memory comprises program instructions executable to:
   access at least one product code or product program id associated with an insurance product;
   determine, using at least one product code or product program id, at least one product-specific navigation program control code packet to call from among the two or more product-specific navigation program control code packets; and
   generate, using the at least one determined product-specific navigation program control code packet, a navigation software module configured to link at least one unchanged portion of the insurance transaction processing program to the at least one software module, and wherein the navigation software module directs other software modules to the formed at least one software module,
   wherein the at least one memory comprises program instructions executable to segment the insurance transaction processing program into a static portion and a plurality of dynamic code packets.

2. The system of claim 1, wherein at least one code packet comprises at least one business rule specification.

3. The system of claim 1, wherein at least one code packet comprises a code template.

4. The system of claim 1, wherein at least one code packet comprises at least one technical specification.

5. The system of claim 1, further comprising at least one test application, wherein at least one test application is operable generate assembly instructions for at least one software module based on test assembly instructions used to assemble one or more test software modules.

6. The system of claim 1, wherein the product-specific navigation program control code packet further identifies a product line and a coverage.

7. The system of claim 1, wherein the at least one memory comprises program instructions executable to arrange at least two control packets into a hierarchy, wherein the at least one program control packet comprises instructions to copy code packets from the hierarchy.

8. The system of claim 1, wherein the at least one memory comprises program instructions executable to:
provide one or more assembly variables in the insurance transaction processing program, wherein the one or more assembly variables provide locations to plug dynamic code packets generated by a rules engine into the static portion,
wherein the static portion comprises traditional business logic, wherein the dynamic code packets implement one or more business rules.

9. The system of claim 1, wherein at least one of the plurality of dynamic code packets varies from region-to-region or varies from product line-to-product line.

10. A system comprising:
at least one computer system;
at least one memory coupled to at least one computer system;
a plurality of code packets, wherein at least one code packets is configured to implement at least one business requirement of an insurance organization;
a rules engine in at least one memory, wherein the rules engine comprises program instructions which are executable to implement a method comprising:
configuring at least one code packet; and
forming software module assembly instructions for a software module for an insurance transaction processing program that includes functionality of at least one configured code packet, wherein the software module and one or more other software modules form an insurance transaction processing program that implements one or more business rules, wherein the assembly instructions comprise references to placements with the software module for two or more code packets and wherein assembling two or more code packets according to the assembly instructions comprises sorting portions of two or more packets into a desired placement order;
wherein the plurality of code packets comprises two or more product-specific navigation program control code packets, wherein each of at least two of the product-specific navigation program control code packets corresponds to and identifies a particular insurance product,
wherein the at least one memory comprises program instructions executable to:
access at least one product code or product program id associated with an insurance product;
determine, using at least one product code or product program id, at least one product-specific navigation program control code packet to call from among the two or more product-specific navigation program control code packets; and
generate, using the at least one determined product-specific navigation program control code packet, a navigation software module configured to link at least one unchanged portion of the insurance transaction processing program to the software module, and wherein the navigation software module directs other software modules to the formed software module,
wherein the at least one memory comprises program instructions executable to segment the insurance transaction processing program into a static portion and a plurality of dynamic code packets.

11. The system of claim 10, further comprising at least one data table, wherein the rules engine is configured access to information in at least one data table to form the software module assembly instructions.

12. The system of claim 10, wherein the rules engine is further executable to receive input from and to configure at least one code packet based on the received input.

13. The system of claim 10, wherein at least one code packet comprises a business rule specification.

14. The system of claim 10, wherein at least one code packet comprises a code template.

15. The system of claim 10, wherein at least one code packet comprises a technical specification.

16. The system of claim 10, wherein the rules engine is further executable to provide a graphical interface, wherein the graphical interface is configured to display at least a portion of at least one business rule, wherein at least one business rule corresponds to at least one code packet.

17. The system of claim 10, wherein the rules engine is further executable to validate the configuration of a code packet.

18. The system of claim 10, wherein the rules engine is further executable select one or more code packet for inclusion in a software module from the plurality of code packets.

19. A computer readable physical storage medium comprising
program instructions for at least one rules engine, wherein at least one rules engine is computer-executable to generate assembly instructions for at least one software module;
program instructions for at least one code assembler, wherein at least code assembler is computer executable to assemble two or more code packets according to assembly instructions to form at least one software module, wherein the at least one software module and one or more other software modules form an insurance transaction processing program that implements one or more business rules, wherein the assembly instructions comprise references to placements with the at least one software module for two or more code packets and wherein assembling two
or more code packets according to the assembly instructions comprises sorting portions of two or more packets into a desired placement order;
program instructions computer-executable to:
access two or more product-specific navigation program control code packets, wherein each of at least two of the product-specific navigation program control code packets corresponds to and identifies a particular insurance product;
access at least one product code or product program id associated with an insurance product;
determine, using at least one product code or product program id, at least one product-specific navigation program control code packet to call from among the two or more product-specific navigation program control code packets; and
generate, using the at least one determined product-specific navigation program control code packet, a navigation software module configured to link at least one unchanged portion of the insurance transaction processing program to the at least one software module, and wherein the navigation software module directs other software modules to the formed at least one software module, and program instructions executable to segment the insurance transaction processing program into a static portion and a plurality of dynamic code packets.

20. A system comprising:

at least one computer system;

at least one memory coupled to at least one computer system;

a plurality of code packets in at least one memory;

at least one rules engine in at least one memory, wherein at least one rules engine is executable to generate assembly instructions for at least one software module; and at least one code assembler, wherein at least one code assembler is configured to assemble two or more code packets according to assembly instructions to form at least one software module, wherein the at least one software module and one or more other software modules form an insurance transaction processing program that implements one or more business rules, wherein the assembly instructions comprise references to placements with the at least one software module for two or more code packets and wherein assembling two or more code packets according to the assembly instructions comprises sorting portions of two or more packets into a desired placement order;

wherein the plurality of code packets comprises two or more product-specific navigation program control code packets, wherein each of at least two of the product-specific navigation program control code packets corresponds to and identifies a particular insurance product, wherein the at least one memory comprises program instructions executable to:

access at least one product code or product program id associated with an insurance product;

determine, using at least one product code or product program id, at least one product-specific navigation program control code packet to call from among the two or more product-specific navigation program control code packets; and generate, using the at least one determined product-specific navigation program control code packet, a navigation software module configured to link at least one unchanged portion of the insurance transaction processing program to the at least one software module, and wherein the navigation software module directs other software modules to the formed at least one software module, wherein the at least one memory comprises program instructions executable to segment the insurance transaction processing program into a static portion and a plurality of dynamic code packets, wherein the at least one memory further comprises program instructions configured to access a generation level of a model used by an insurance product, wherein the contents of at least one of the product-specific navigation program control code packets depends on the generation level of the model for the insurance product associated with the product-specific navigation program control code packet.

21. A system comprising:

at least one computer system;

at least one memory coupled to at least one computer system;

a plurality of code packets in at least one memory;

at least one rules engine in at least one memory, wherein at least one rules engine is executable to generate assembly instructions for at least one software module; and at least one code assembler, wherein at least one code assembler is configured to assemble two or more code packets according to assembly instructions to form at least one software module, wherein the at least one software module and one or more other software modules form an insurance transaction processing program that implements one or more business rules, wherein the assembly instructions comprise references to placements with the at least one software module for two or more code packets and wherein assembling two or more code packets according to the assembly instructions comprises sorting portions of two or more packets into a desired placement order;

wherein the plurality of code packets comprises two or more product-specific navigation program control code packets, wherein each of at least two of the product-specific navigation program control code packets corresponds to and identifies a particular insurance product, wherein the at least one memory comprises program instructions executable to:

access at least one product code or product program id associated with an insurance product;

determine, using at least one product code or product program id, at least one product-specific navigation program control code packet to call from among the two or more product-specific navigation program control code packets; and generate, using the at least one determined product-specific navigation program control code packet, a navigation software module configured to link at least one unchanged portion of the insurance transaction processing program to the at least one software module, and wherein the navigation software module directs other software modules to the formed at least one software module, wherein the at least one memory further comprises program instructions executable to:

generate one or more specifications code packets, wherein at least one of the specifications code packet comprises software module assembly instructions and references to two or more code packets, wherein at least one of the one or more specifications code packets comprises at least one environment/configuration code packet and at least one program control code packet, wherein the at least one memory comprises program instructions executable to segment the insurance transaction processing program into a static portion and a plurality of dynamic code packets.

* * * * *